US011376534B2

(12) United States Patent
Yung et al.

(10) Patent No.: US 11,376,534 B2
(45) Date of Patent: *Jul. 5, 2022

(54) POLYAMIDE NANOFIBER NONWOVENS FOR FILTERS

(71) Applicant: Ascend Performance Materials Operations LLC, Houston, TX (US)

(72) Inventors: Wai-Shing Yung, Pensacola, FL (US); Scott E. Osborn, Pensacola, FL (US); Chris E. Schwier, Pensacola, FL (US); Vikram Gopal, The Woodlands, TX (US); Albert Ortega, Pensacola, FL (US); Joseph L. Menner, Pinehurst, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 46 days.

This patent is subject to a terminal disclaimer.

(21) Appl. No.: 16/864,769

(22) Filed: May 1, 2020

(65) Prior Publication Data
US 2020/0254371 A1   Aug. 13, 2020

Related U.S. Application Data

(63) Continuation-in-part of application No. 16/003,528, filed on Jun. 8, 2018, now Pat. No. 10,662,561.
(Continued)

(51) Int. Cl.
*B01D 39/16* (2006.01)
*B32B 5/02* (2006.01)
(Continued)

(52) U.S. Cl.
CPC ............ *B01D 39/163* (2013.01); *A62B 23/02* (2013.01); *B32B 5/022* (2013.01); *B32B 5/26* (2013.01);
(Continued)

(58) Field of Classification Search
CPC ............... A62B 23/02; D06M 2101/34; D10B 2505/04; B01D 2239/0618;
(Continued)

(56) References Cited

U.S. PATENT DOCUMENTS 3,016,599 A   1/1962  Perry, Jr.
3,704,198 A   11/1972 Prentice
(Continued)

FOREIGN PATENT DOCUMENTS

EP   2202337   6/2010
JP   0673652   3/1994
(Continued)

OTHER PUBLICATIONS

U.S. Appl. No. 16/003,528 , Final Office Action, dated Mar. 17, 2020, 9 pages.
(Continued)

*Primary Examiner* — Camie S Thompson
(74) *Attorney, Agent, or Firm* — Cozen O'Connor

(57) ABSTRACT

A filter comprising a nanofiber nonwoven product is disclosed which comprises a polyamide with a relative viscosity from 2 to 330, spun into nanofibers with an average diameter of less than 1000 nanometers (1 micron). In general, the inventive products are prepared by: (a) providing a polyamide composition, wherein the polyamide has a relative viscosity from 2 to 330; (b) melt spinning the polyamide composition into a plurality of nanofibers having an average fiber diameter of less than 1 micron, followed by (c) forming the nanofibers into the product.

19 Claims, 6 Drawing Sheets

Related U.S. Application Data

(60) Provisional application No. 62/841,485, filed on May 1, 2019, provisional application No. 62/516,867, filed on Jun. 8, 2017, provisional application No. 62/518,769, filed on Jun. 13, 2017.

(51) Int. Cl.
  *B32B 5/26* (2006.01)
  *A62B 23/02* (2006.01)

(52) U.S. Cl.
  CPC .......... *B01D 2239/025* (2013.01); *B01D 2239/0442* (2013.01); *B01D 2239/0618* (2013.01); *B01D 2239/0622* (2013.01); *B01D 2239/0654* (2013.01); *B01D 2239/1233* (2013.01); *B01D 2239/1258* (2013.01); *B32B 2262/0261* (2013.01); *B32B 2535/00* (2013.01)

(58) Field of Classification Search
  CPC ........ B01D 2239/10; B01D 2239/1233; B01D 2239/025; B01D 2239/0654; B01D 2239/1258; D01D 461/456; D01D 5/00; D04H 1/4334; D04H 1/56; D04H 1/4282; D04H 1/552; B32B 2250/20; B32B 2262/0261; B32B 2307/724; B32B 5/022; B32B 5/08; D01F 6/60; D01F 6/90; D01F 6/605; B82Y 40/00; C08L 77/00; C08L 77/06; C08L 77/02; C08L 2203/12; C08J 5/005; Y10T 428/249921; Y10T 428/2904; Y10T 428/2913; Y10T 428/298
  USPC .............. 428/340, 903, 221, 364, 401, 359; 264/290.5; 442/340, 381
  See application file for complete search history.

(56) References Cited

U.S. PATENT DOCUMENTS

| | | | |
|---|---|---|---|
| 3,755,527 | A | 8/1973 | Keller et al. |
| 3,849,241 | A | 11/1974 | Butin et al. |
| 3,978,185 | A | 8/1976 | Buntin et al. |
| 4,100,324 | A | 7/1978 | Anderson et al. |
| 4,118,531 | A | 10/1978 | Hauser |
| 4,663,220 | A | 5/1987 | Wisneski et al. |
| 4,760,129 | A | 7/1988 | Haering et al. |
| 5,411,710 | A | 5/1995 | Iwasyk |
| 5,504,185 | A | 4/1996 | Toki et al. |
| 5,543,495 | A | 8/1996 | Anolick et al. |
| 5,698,658 | A | 12/1997 | Dujari et al. |
| 5,913,993 | A | 6/1999 | Ortega et al. |
| 6,011,134 | A | 1/2000 | Marks et al. |
| 6,136,947 | A | 10/2000 | Wiltzer et al. |
| 6,169,162 | B1 | 1/2001 | Bush et al. |
| 7,138,482 | B2 | 11/2006 | Tanaka et al. |
| 7,300,272 | B1 | 11/2007 | Haggard |
| 7,381,788 | B2 | 6/2008 | Tsujii et al. |
| 8,277,711 | B2 | 10/2012 | Huang et al. |
| 8,658,067 | B2 | 2/2014 | Peno et al. |
| 8,668,854 | B2 | 3/2014 | Marshall et al. |
| 8,747,723 | B2 | 6/2014 | Marshall et al. |
| 8,759,475 | B2 | 6/2014 | Thierry et al. |
| 8,777,599 | B2 | 7/2014 | Peno et al. |
| 10,662,561 | B2 | 5/2020 | Yung et al. |
| 2002/0059868 | A1 | 5/2002 | Gogins et al. |
| 2008/0315464 | A1 | 12/2008 | Smithies et al. |
| 2011/0232653 | A1 | 9/2011 | Imashiro et al. |
| 2012/0178332 | A1 | 7/2012 | Uchida et al. |
| 2012/0244333 | A1 | 9/2012 | Aksay et al. |
| 2013/0112625 | A1 | 5/2013 | Bahukudumbi et al. |
| 2014/0097558 | A1 | 4/2014 | Lustenberger |
| 2015/0107457 | A1 | 4/2015 | Huang et al. |
| 2015/0111019 | A1 | 4/2015 | Huang et al. |
| 2015/0145175 | A1 | 5/2015 | Lustenberger |
| 2019/0194847 | A1 | 6/2019 | Schools et al. |
| 2020/0283937 | A1* | 9/2020 | Yung .................. D04H 1/43838 |

FOREIGN PATENT DOCUMENTS

| | | |
|---|---|---|
| JP | 08144166 | 6/1996 |
| JP | 2011031362 | 2/2011 |
| WO | 2010014986 | 2/2010 |
| WO | 2012109251 | 8/2012 |
| WO | 2014074818 | 5/2014 |
| WO | 2015003170 | 1/2015 |
| WO | 2015153477 | 10/2015 |
| WO | 2017214085 | 12/2017 |
| WO | 2018227069 | 12/2018 |

OTHER PUBLICATIONS

U.S. Appl. No. 16/003,528, Non-Final Office Action, dated Dec. 3, 2019, 10 pages.
U.S. Appl. No. 16/003,528, Notice of Allowance, dated Apr. 16, 2020, 12 pages.
Bresee et al., "Fiber Formation During Melt Blowing", International Nonwovens Journal, vol. 12, No. 2, 2003, pp. 21-28.
Ellison et al., "Melt Blown Nanofibers: Fiber Diameter Distributions and Onset of Fiber Breakup", Polymer, vol. 48, No. 11, May 21, 2007, pp. 3306-3316.
Glasscock et al., "High Performance Polyamides Fulfill Demanding Requirements for Automotive Thermal Management Components", (DuPont), Available online at http://www2.dupont.com/Automotive/en_US/assets/downloads/knowledg e%20center/HTN-whitepaper-R8.pdf available online, Jun. 10, 2016, pp. 1-9.
Guerrini et al., "Electrospinning and Characterization of Polyamide 66 Nanofibers with Different Molecular Weights", Materials Research, vol. 12, No. 2, Apr.-Jun. 2009, pp. 181-190.
Hassan et al., "Fabrication of Nanofiber Meltblown Membranes and Their Filtration Properties", Journal of Membrane Science, vol. 427, Jan. 15, 2013, pp. 336-344.
Kirk-Othmer, "Encyclopedia of Chemical Technology", vol. 18, 3rd Edition, 1982, pp. 328-371.
U.S. Serial Application No. PCT/US2018/036637, International Preliminary Report on Patentability, dated Dec. 19, 2019, 8 pages.
U.S. Serial Application No. PCT/US2018/036637, International Search Report and Written Opinion, dated Sep. 14, 2018, 12 pages.
U.S. Serial Application No. PCT/US2020/031038, International Search Report and Written Opinion, dated Jul. 17, 2020, 10 pages.

\* cited by examiner

POLYAMIDE NANOFIBER NONWOVENS FOR FILTERS

CROSS REFERENCE TO RELATED APPLICATION

This application claims priority to U.S. Prov. App. No. 62/841,485, filed on May 1, 2019, and is a continuation-in-part application of U.S. application Ser. No. 16/003,528, filed Jun. 8, 2018, which claims priority to US Prov. App. Nos. 62/516,867, filed Jun. 8, 2017, and 62/518,769, filed Jun. 13, 2017, which are incorporated herein by reference in their entireties.

TECHNICAL FIELD

The present disclosure relates to polyamide nanofiber nonwovens that may be useful for air and liquid filtration, and in particular polyamide nanofiber nonwovens made from a meltblown process.

BACKGROUND

Polymer membranes, including nanofiber and microfiber nonwovens are known in the art and are used for a variety of purposes, including in connection with filtration media and apparel. Known techniques for forming finely porous polymer structures include xerogel and aerogel membrane formation, electrospinning, melt-blowing, as well as centrifugal-spinning with a rotating spinneret, and two-phase polymer extrusion through a thin channel using a propellant gas. These techniques are either expensive or do not form nanofibers, e.g., polyamide nanofibers, with acceptable fiber diameter distributions. Electrospinning, in particular, is a relatively expensive process, and current melt-blowing techniques, while less expensive, are unable attain the nanofiber size that electrospinning can attain.

As one example, US Pub. No. 2014/0097558 A1 relates generally to methods of manufacture of a filtration media, such as a personal protection equipment mask or respirator, which incorporates an electrospinning process to form nanofibers onto a convex mold, which may, for example, be in the shape of a human face. US Pub. No. 2015/0145175 A1 provides similar disclosure.

WO 2014/074818 A2 discloses nanofibrous meshes and xerogels used for selectively filtering target compounds or elements from a liquid. Also described are methods for forming nanofibrous meshes and xerogels, methods for treating a liquid using nanofibrous meshes and xerogels, and methods for analyzing a target compound or element using nanofibrous meshes and xerogels. The nanofibers are comprised of polysiloxanes.

WO 2015/003170 A2 relates to nonwoven textiles consisting of webs of superfine fibers, e.g., fibers with diameters in nanoscale or micron scale ranges, for use in articles that have, for example a predetermined degree of waterproofness with breathability, or windproofness with breathability. The fibers may comprise polyurethane-based material or polytetrafluoroethylene.

WO 2015/153477 A1 relates to a fiber construct suitable for use as a fill material for insulation or padding, comprising: a primary fiber structure comprising a predetermined length of fiber; a secondary fiber structure, the secondary fiber structure comprising a plurality of relatively short loops spaced along a length of the primary fiber. Among the techniques enumerated for forming the fiber structures include electrospinning, melt-blowing, melt-spinning and centrifugal-spinning. The products are reported to mimic goose-down, with fill power in the range of 550 to 900.

Despite the variety of techniques and materials proposed, conventional products have much to be desired in terms of manufacturing costs, processability, and product properties.

SUMMARY

In some embodiments, the present disclosure is directed to filter product comprising one or more layers, e.g., three or more layers, of a nanofiber nonwoven product comprising polyamide nanofibers, wherein the product has a relative viscosity from 2 to 330, e.g., from 4 to 330, and wherein the nanofibers have an average diameter from 100 to 1000 nanometers, e.g., from 100 to 950 nanometers. The melt point of the product may be 225° C. or greater. In some aspects, no more than 20% of the nanofibers have a diameter of greater than 700 nanometers. The polyamide may comprise nylon 66 or nylon 6/66. In some aspects, the polyamide is a high temperature nylon. In some aspects, the polyamide comprises N6, N66, N6T/66, N612, N6/66, N6I/66, N66/6I/6T, N11, and/or N12, wherein "N" means Nylon. The nanofiber nonwoven product may have an Air Permeability Value of less than 600 CFM/ft$^2$. The product may have a basis weight of 150 GSM or less. The nanofiber nonwoven product may have a basis weight of 150 GSM or less. The nanofiber nonwoven product may have a TDI of at least 20 ppm. The nanofiber nonwoven product may have an ODI of at least 1 ppm. In some aspects, the product is free of solvent. In other aspects, the nanofiber nonwoven product comprises less than 5000 ppm solvent. In one embodiment, the filter product further comprises a scrim layer and/or support layer. The filter product may be an air filter, an oil filter, a bag filter, a liquid filter, or a breathing filter. In one embodiment, the nanofiber nonwoven product may comprise from 1 wppm to 30,000 wppm of zinc, optionally from a zinc compound, and less than or equal to 1 wt. % of a phosphorus compound.

In some embodiments, the present disclosure is directed to a breathing filter product comprising a support layer, and one or more layers of a nanofiber nonwoven product disposed on the support layer, wherein the nanofiber nonwoven product comprises polyamide nanofibers, wherein the nanofibers have an average diameter from 100 to 950 nanometers, and wherein the nanofiber nonwoven product has a TDI of at least 20 ppm and an ODI of at least 1 ppm. In one embodiment, the pressure drop of the nanofiber nonwoven product is from 0.5 to 10 mm H$_2$O. In one embodiment, the nanofiber nonwoven product comprising a polyamide which is spun into nanofibers with an average diameter from 100 to 1000 nanometers, e.g., from 100 to 950 nanometers or from 300 to 700 nanometers, and formed into said nonwoven product, wherein the polyamide has a relative viscosity from 2 to 330, e.g., from 4 to 330. The melt point of the product may be 225° C. or greater. In some aspects, no more than 20% of the nanofibers have a diameter of greater than 700 nanometers. The polyamide may comprise nylon 66 or nylon 6/66. In some aspects, the polyamide is a high temperature nylon. In some aspects, the polyamide comprises N6, N66, N6T/66, N612, N6/66, N6I/66, N66/6I/6T, N11, and/or N12, wherein "N" means Nylon. The product may have an Air Permeability Value of less than 600 CFM/ft$^2$. The product may have a basis weight of 150 GSM or less. The product may have a basis weight of 150 GSM or less. The product may have a TDI of at least 20 ppm. The product may have an ODI of at least 1 ppm. In some aspects, the product is free of solvent. In other aspects, the product comprises less than 5000 ppm solvent.

In some embodiments, the present disclosure is directed to a nanofiber nonwoven product comprising a nylon 66 polyamide which is melt spun into nanofibers and formed into said nonwoven product, wherein the product has a TDI of at least 20 ppm and an ODI of at least 1 ppm. The product may have an Air Permeability Value of less than 600 CFM/ft$^2$. The product may have a basis weight of 150 GSM or less. In some aspects, the product is free of solvent. In other aspect, the product comprises less than 5000 ppm solvent. In some aspects, no more than 20% of the nanofibers have a diameter of greater than 700 nanometers. The nylon 66 polyamide may have an RV from 2 to 330. The product may have an RV from 2 to 330.

In some embodiments, the present disclosure is directed to a nanofiber nonwoven product comprising a nylon 66 polyamide which is melt spun into nanofibers and formed into said nonwoven product, wherein no more than 20% of the nanofibers have a diameter of greater than 700 nanometers. The product may have an Air Permeability Value of less than 600 CFM/ft$^2$. The product may have a basis weight of 150 GSM or less. The product may have a basis weight of 150 GSM or less. The product may have a TDI of at least 20 ppm. The product may have an ODI of at least 1 ppm. In some aspects, the product is free of solvent. In other aspects, the product comprises less than 5000 ppm solvent. The nylon 66 polyamide may have an RV from 2 to 330. The product may have an RV from 2 to 330.

In some embodiments, the present disclosure is directed to a method of making a nanofiber nonwoven product, the method comprising: (a) providing a polyamide composition, wherein the polyamide has a relative viscosity from 2 to 330; (b) spinning the polyamide composition into a plurality of nanofibers having an average fiber diameter from 100 to 1000 nanometers; and (c) forming the nanofibers into the nanofiber nonwoven product, wherein the polyamide nanofiber layer has an average nanofiber diameter from 100 to 1000 nanometers and a relative viscosity from 2 to 330. In some aspects, the polyamide composition is melt spun by way of melt-blowing through a die into a high velocity gaseous stream. In some aspects, the polyamide composition is melt-spun by 2-phase propellant-gas spinning, including extruding the polyamide composition in liquid form with pressurized gas through a fiber-forming channel. The product may be formed by collecting the nanofibers on a moving belt. The polyamide nanofiber layer may have a basis weight of 150 GSM or less. In some aspects, the relative viscosity of the polyamide in the nanofiber nonwoven product is reduced as compared to the polyamide composition prior to spinning and forming the product. In some aspects, the relative viscosity of the polyamide in the nanofiber nonwoven product is the same or increased as compared to the polyamide composition prior to spinning and forming the product.

BRIEF DESCRIPTION OF DRAWINGS

The disclosure is described in detail below with reference to the drawings wherein like numerals designate similar parts and wherein.

DETAILED DESCRIPTION

Overview

Figure 1:
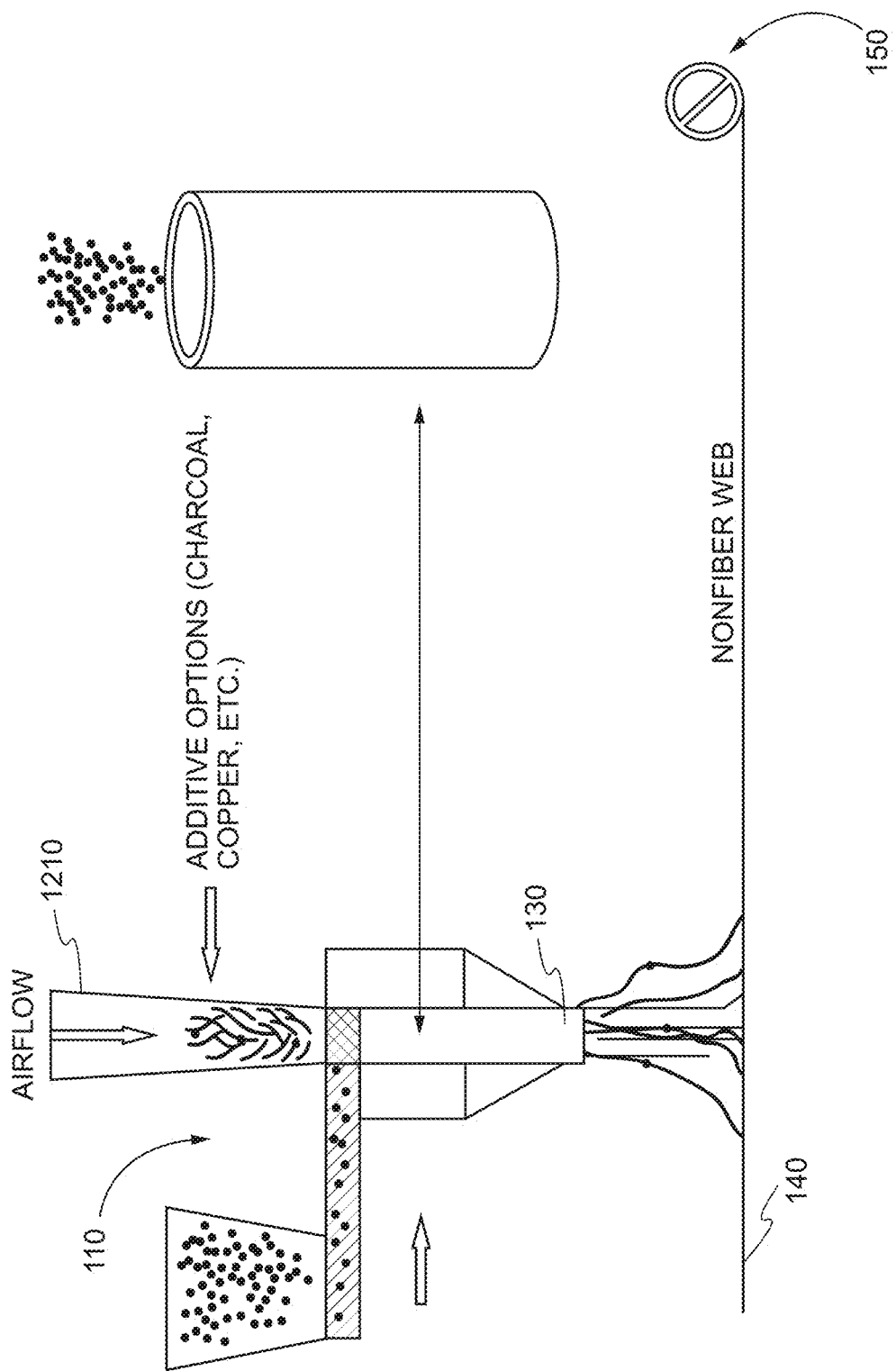
FIG. 1 and FIG. 2 are separate schematic diagrams of a 2-phase propellant-gas spinning system useful in connection with the present disclosure.

The present disclosure is directed, in part, to a nanofiber nonwoven product formed from a (precursor) polyamide composition. The product may have a Relative Viscosity (RV) from 2 to 330, e.g., from 2 to 300, from 2 to 275, from 2 to 250, from 2 to 225, from 2 to 200, 2 to 100, from 2 to 60, from 2 to 50, from 2 to 40, from 10 to 40, or from 15 to 40 (additional RV ranges and limits are provided herein). The polyamide composition may be spun or melt blown into fibers, e.g., nanofibers. The polyamide nanofibers may have an average diameter of less than 1000 nanometers (1 micron) and may be formed into the nonwoven product, such as an air or liquid filter. Traditional melt spinning/melt blowing techniques have been unable to form fibers having low average diameters, e.g., nanofibers. Typical melt spun/ melt blown fiber average diameters are at least 1 micron and cannot achieve the surface area to volume ratio that a nanofiber can achieve. Such an increased surface area to volume ratio is beneficial in many applications.

The inventors have found that by utilizing a particular precursor polyamide having specific characteristics in a particular (melt) spinning process, nonwoven nanofibers having synergistic features are formed. Without being bound by theory, it is postulated that the use of a polyamide composition having an RV of 330 or less leads to fibers having small diameters, previously unachievable by conventional solvent-free processes. As an additional benefit, the production rate is advantageously improved, for example, on a per meter basis, over processes such as electrospinning and solution spinning. Such improvements may be by at least 5%, e.g., by at least 10%, by at least 15%, by at least 20%, by at least 25%, or by at least 30%.

Also, the inventors have found that the disclosed processes, techniques, and/or precursors, yield nanofibers having reduced oxidative degradation and thermal degradation indices as compared to nonwoven products prepared from other precursors and by other processes. These improvements advantageously result in products with improved durability.

Additionally, the process may be conducted in the absence of solvents, e.g., does not use solvents, such as formic acid and others described herein, which reduces environmental concerns with disposing of the solvents and handling of the solvents during preparation of the solutions. Such solvents are used in solution spinning and the solution spinning process therefore requires additional capital investment to dispose of the solvents. Additional costs may be incurred due to the need for a separate solvent room and a scrubber area. There are also health risks associated with some solvents. Accordingly, the nanofiber nonwoven product may be free of residual solvents, e.g., as are necessarily present in solution spun products. For example, residual solvent from 2.2 to 5 wt. % may be found in solution spun processes, as disclosed by L. M. Guerrini, M. C. Branciforti, T Canova, and R. E. S. Bretas, Materials Research, Vol. 12, No. 2, pp 181-190 (2009).

In some aspects, no adhesives are included in the nanofiber nonwoven product. Such adhesives are often included to adhere electrospun fibers to scrims. Although the nanofiber nonwoven product described herein may be blown onto a scrim, no such adhesives are necessary.

In some embodiments, the nanofiber nonwoven product is produced by: (a) providing a (spinnable) polyamide composition, wherein the polyamide composition has the RV discussed herein; (b) spinning the polyamide composition into a plurality of nanofibers having an average fiber diameter of less than 1 micron, e.g., by way of a process directed to 2-phase propellant-gas spinning, including extruding the polyamide composition in liquid form with pressurized gas through a fiber-forming channel, and (c) forming the nanofibers into the nanofiber nonwoven product. The general process is illustrated in FIGS. 1 and 2.

Particularly preferred polyamides include nylon 66, as well as copolymers, blends, and alloys of nylon 66 with nylon 6. Other embodiments include nylon derivatives, copolymers, terpolymers, blends and alloys containing or prepared from nylon 66 or nylon 6, copolymers or terpolymers with the repeat units noted above including but not limited to: N6T/66, N612, N6/66, N6I/66, N11, and N12, wherein "N" means Nylon. Another preferred embodiment includes High Temperature Nylons ("HTN") as well as blends, derivatives, copolymers or terpolymers containing them. Furthermore, another preferred embodiment includes long chain aliphatic polyamide made with long chain diacids as well as blends, derivatives or copolymers containing them.

Figure 2:
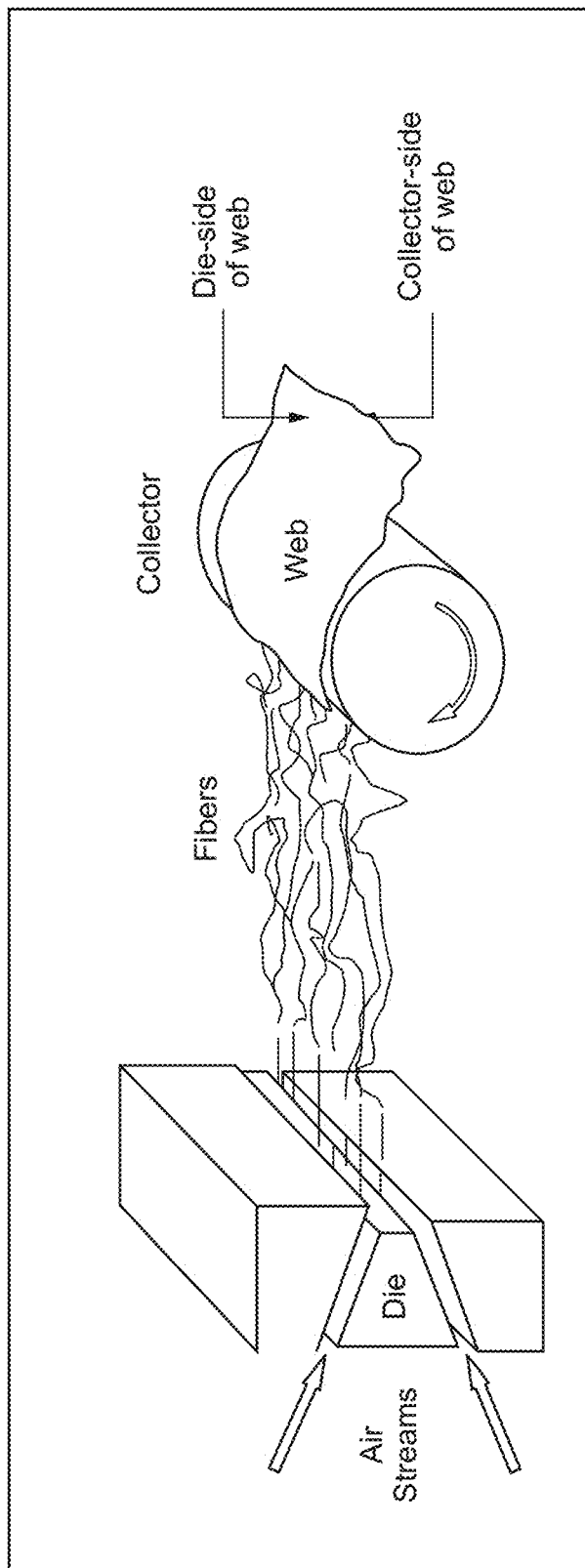

FIG. 1 illustrates an exemplary technique wherein a 2 phase propellant gas spinning process may be used for making the nanofiber. FIG. 2 illustrates a general melt blowing technique.

In particular, disclosed herein is an embodiment wherein a method of making a nanofiber nonwoven product wherein the nonwoven fabric is melt-spun by way of melt-blowing through a spinneret into a high velocity gaseous stream. More particularly, in one embodiment, the nonwoven fabric is melt-spun by 2-phase propellant-gas spinning, including extruding the polyamide composition in liquid form with pressurized gas through a fiber-forming channel.

Definitions and Test Methods

Terminology used herein is given its ordinary meaning consistent with the definitions set forth below; gsm refers to basis weight in grams per square meter, and RV refers to Relative Viscosity and so forth.

Spinning, as used herein, refers to the steps of melting a polyamide composition and forming the polyamide composition into fibers. Examples of spinning include centrifugal spinning, melt blowing, spinning through a spinneret (e.g., a spinneret without a charge) or die, and "island-in-the sea" geometry.

Percentages and parts per million (ppm) refer to weight percent or parts per million by weight based on the weight of the respective composition unless otherwise indicated.

Some typical definitions and test methods are further recited in US Pub. Nos. 2015/0107457 and 2015/0111019, which are incorporated herein by reference. The term "nanofiber nonwoven product" for example, refers to a web of a multitude of essentially randomly oriented nanofibers where no overall repeating structure can be discerned by the naked eye in the arrangement of nanofibers. The nanofibers can be bonded to each other and/or entangled to impart strength and integrity to the web. In some cases the nanofibers are not bonded to one another and may or may not be entangled. The nanofibers can be staple nanofibers or continuous nanofibers, and can comprise a single material or a multitude of materials, either as a combination of different nanofibers or as a combination of similar nanofibers each comprising of different materials. The nanofiber nonwoven product is constructed predominantly of nanofibers. "Predominantly" means that greater than 50% of the fibers in the web are nanofibers. The term "nanofiber" refers to fibers having a number average diameter less than 1000 nm (1 micron). In the case of nonround cross-sectional nanofibers, the term "diameter" as used herein refers to the greatest cross-sectional dimension.

To the extent not indicated otherwise, test methods for determining average fiber diameters, are as indicated in Hassan et al., J 20 Membrane Sci., 427, 336-344, 2013, unless otherwise specified.

Basis Weight may be determined by ASTM D-3776 and reported in g (g/m$^2$).

"Consisting essentially of" refers to the recited components and excludes other ingredients which would substantially change the basic and novel characteristics of the composition or article. Unless otherwise indicated or readily apparent, a composition or article consists essentially of the recited or listed components when the composition or article includes 90% or more by weight of the recited or listed components. That is, the terminology excludes more than 10% unrecited components.

Air permeability is measured using an Air Permeability Tester, available from Precision Instrument Company, Hagerstown, Md. Air permeability is defined as the flow rate of air at 23±1° C. through a sheet of material under a specified pressure head. It is usually expressed as cubic feet per minute per square foot at 0.50 in. (12.7 mm) water pressure, in cm$^3$ per second per square cm or in units of elapsed time for a given volume per unit area of sheet. The instrument referred to above is capable of measuring permeability from 0 to approximately 5000 cubic feet per minute per square foot of test area. For purposes of comparing permeability, it is convenient to express values normalized to 5 GSM basis weight. This is done by measuring Air Permeability Value and basis weight of a sample (@ 0.5" H$_2$O typically), then multiplying the actual Air Permeability Value by the ratio of actual basis weight in GSM to 5. For example, if a sample of 15 GSM basis weight has a Value of 10 CFM/ft$^2$, its Normalized 5 GSM Air Permeability Value is 30 CFM/ft$^2$.

Polyamide

As used herein, polyamide composition and like terminology refers to compositions containing polyamides including copolymers, terpolymers, polymer blends, alloys and derivatives of polyamides. Further, as used herein, a "polyamide" refers to a polymer, having as a component, a polymer with the linkage of an amino group of one molecule and a carboxylic acid group of another molecule. In some aspects, the polyamide is the component present in the greatest amount. For example, a polyamide containing 40 wt. % nylon 6, 30 wt. % polyethylene, and 30 wt. % polypropylene is referred to herein as a polyamide since the nylon 6 component is present in the greatest amount. Additionally, a polyamide containing 20 wt. % nylon 6, 20 wt. % nylon 66, 30 wt. % polyethylene, and 30 wt. % polypropylene is also referred to herein as a polyamide since the nylon 6 and nylon 66 components, in total are the components present in the greatest amount.

Exemplary polyamides and polyamide compositions are described in Kirk-Othmer, Encyclopedia of Chemical Technology, Vol. 18, pp. 328371 (Wiley 1982), the disclosure of which is incorporated by reference.

Briefly, polyamides are generally known as compounds that contain recurring amide groups as integral parts of the main polymer chains. Linear polyamides are of particular interest and may be formed from condensation of bifunctional monomers. Polyamides are frequently referred to as nylons. Although they generally are considered as condensation polymers, polyamides also are formed by addition polymerization. This method of preparation is especially important for some polymers in which the monomers are cyclic lactams, e.g., Nylon 6. Particular polymers and copolymers and their preparation are seen in the following patents: U.S. Pat. Nos. 4,760,129; 5,504,185; 5,543,495; 5,698,658; 6,011,134; 6,136,947; 6,169,162; 7,138,482; 7,381,788; and 8,759,475.

There are numerous advantages of using polyamides, specifically nylons, in commercial applications. Nylons are generally chemical and temperature resistant, resulting in superior performance to other particles. They are also known to have improved strength, elongation, and abrasion resistance as compared to other polymers. Nylons are also very versatile, allowing for their use in a variety of applications.

A class of polyamides particularly preferred for some applications includes High Temperature Nylons (HTN's) as are described in Glasscock et al., High Performance Polyamides Fulfill Demanding Requirements for Automotive Thermal Management Components, (DuPont), http://www2.dupont.com/Automotive/en_US/assets/downloads/knowledge%20center/HTN-whitepaper-R8.pdf available online Jun. 10, 2016. Such polyamides typically include one or more of the structures seen in the following:

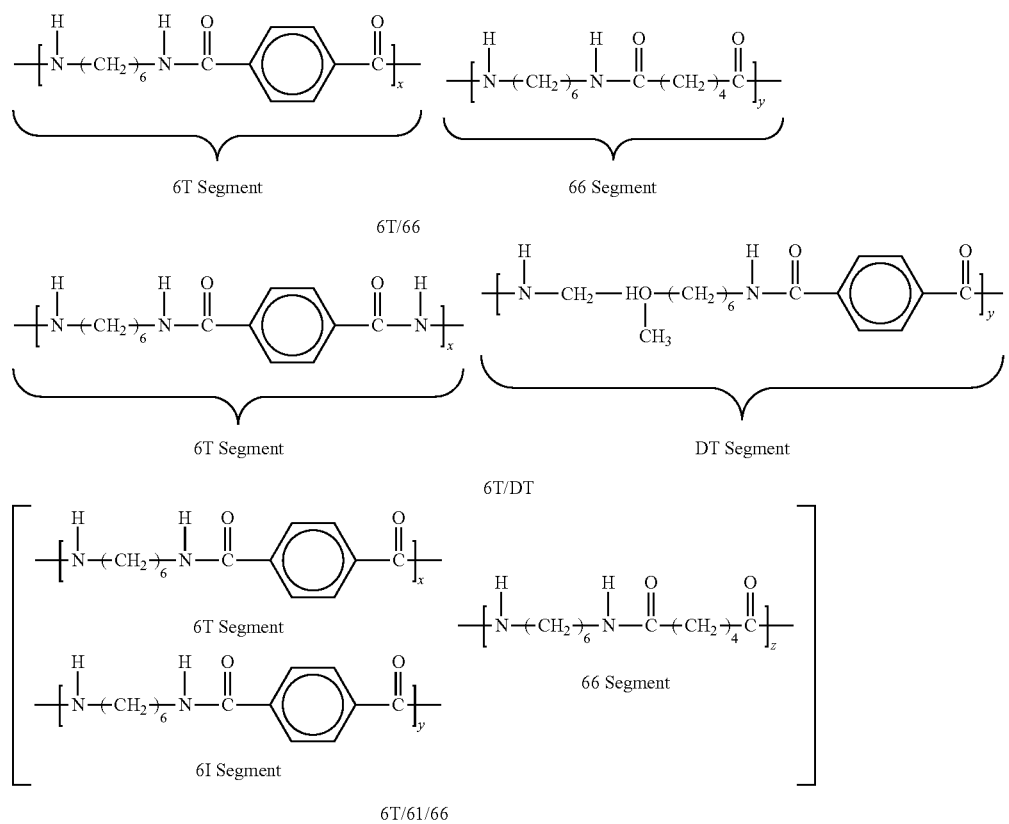

Non-limiting examples of polymers included in the polyamides include polyamides, polypropylene and copolymers, polyethylene and copolymers, polyesters, polystyrenes, polyurethanes, and combinations thereof. Thermoplastic polymers and biodegradable polymers are also suitable for melt blowing or melt spinning into nanofibers of the present disclosure. As discussed herein, the polymers may be melt spun or melt blown, with a preference for melt spinning or melt blowing by 2-phase propellant-gas spinning, including extruding the polyamide composition in liquid form with pressurized gas through a fiber-forming channel.

Melt points of nylon nanofiber products described herein, including copolymers and terpolymers, may be between 223° C. and 390° C., e.g., from 223 to 380, or from 225° C. to 350° C. Additionally, the melt point may be greater than that of conventional nylon 66 melt points depending on any additional polymer materials that are added.

Other polymer materials that can be used in the polyamide nanofiber nonwovens of the disclosure include both addition polymer and condensation polymer materials such as polyolefin, polyacetal, polyamide (as previously discussed), polyester, cellulose ether and ester, polyalkylene sulfide, polyarylene oxide, polysulfone, modified polysulfone polymers and mixtures thereof. Preferred materials that fall within these generic classes include polyamides, polyethylene, polybutylene terephthalate (PBT), polypropylene, poly (vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Addition polymers tend to be glassy (a Tg greater than room temperature). This is the case for polyvinylchloride and polymethylmethacrylate, polystyrene polymer compositions or alloys or low in crystallinity for polyvinylidene fluoride and polyvinylalcohol materials. Nylon copolymers embodied herein, can be made by combining various diamine compounds, various diacid compounds and various cyclic lactam structures in a reaction mixture and then forming the nylon with randomly positioned monomeric materials in a polyamide structure. For example, a nylon 66-6,10 material is a nylon manufactured from hexamethylene diamine and a C6 and a C10 blend of diacids. A nylon 6-66-6,10 is a nylon manufactured by copolymerization of epsilon-aminocaproic acid, hexamethylene diamine and a blend of a C6 and a C10 diacid material.

In some embodiments, such as that described in U.S. Pat. No. 5,913,993, a small amount of polyethylene polymer can be blended with a nylon compound used to form a nanofiber nonwoven fabric with desirable characteristics. The addition of polyethylene to nylon enhances specific properties such as softness. The use of polyethylene also lowers cost of production, and eases further downstream processing such as bonding to other fabrics or itself. The improved fabric can be made by adding a small amount of polyethylene to the nylon feed material used in producing a nanofiber melt blown fabric. More specifically, the fabric can be produced by forming a blend of polyethylene and nylon 66, extruding the blend in the form of a plurality of continuous filaments, directing the filaments through a die to melt blow the filaments, depositing the filaments onto a collection surface such that a web is formed.

The polyethylene useful in the process of this embodiment of the subject disclosure preferably may have a melt index between about 5 grams/10 min and about 200 grams/10 min and, e.g., between about 17 grams/10 min and about 150 grams/10 min. The polyethylene should preferably have a density between about 0.85 grams/cc and about 1.1 grams/cc and, e.g., between about 0.93 grams/cc and about 0.95 grams/cc. Most preferably, the melt index of the polyethylene is about 150 and the density is about 0.93.

The polyethylene used in the process of this embodiment of the subject disclosure can be added at a concentration of about 0.05% to about 20%. In a preferred embodiment, the concentration of polyethylene will be between about 0.1% and about 1.2%. Most preferably, the polyethylene will be present at about 0.5%. The concentration of polyethylene in the fabric produced according to the method described will be approximately equal to the percentage of polyethylene added during the manufacturing process. Thus, the percentage of polyethylene in the fabrics of this embodiment of the subject disclosure will typically range from about 0.05% to about 20% and will preferably be about 0.5%. Therefore, the fabric will typically comprise between about 80 and about 99.95 percent by weight of nylon. The filament extrusion step can be carried out between about 250° C. and about 325° C. Preferably, the temperature range is about 280° C. to about 315° C. but may be lower if nylon 6 is used.

The blend or copolymer of polyethylene and nylon can be formed in any suitable manner. Typically, the nylon compound will be nylon 66; however, other polyamides of the nylon family can be used. Also, mixtures of nylons can be used. In one specific example, polyethylene is blended with a mixture of nylon 6 and nylon 66. The polyethylene and nylon polymers are typically supplied in the form of pellets, chips, flakes, and the like. The desired amount of the polyethylene pellets or chips can be blended with the nylon pellets or chips in a suitable mixing device such as a rotary drum tumbler or the like, and the resulting blend can be introduced into the feed hopper of the conventional extruder or the melt blowing line. The blend or copolymer can also be produced by introducing the appropriate mixture into a continuous polymerization spinning system.

Further, differing species of a general polymeric genus can be blended. For example, a high molecular weight styrene material can be blended with a low molecular weight, high impact polystyrene. A Nylon-6 material can be blended with a nylon copolymer such as a Nylon-6; 66; 6,10 copolymer. Further, a polyvinylalcohol having a low degree of hydrolysis such as a 87% hydrolyzed polyvinylalcohol can be blended with a fully or superhydrolyzed polyvinylalcohol having a degree of hydrolysis between 98 and 99.9% and higher. All of these materials in admixture can be crosslinked using appropriate crosslinking mechanisms. Nylons can be crosslinked using crosslinking agents that are reactive with the nitrogen atom in the amide linkage. Polyvinyl alcohol materials can be crosslinked using hydroxyl reactive materials such as monoaldehydes, such as formaldehyde, ureas, melamine-formaldehyde resin and its analogues, boric acids and other inorganic compounds, dialdehydes, diacids, urethanes, epoxies and other known crosslinking agents. Crosslinking technology is a well-known and understood phenomenon in which a crosslinking reagent reacts and forms covalent bonds between polymer chains to substantially improve molecular weight, chemical resistance, overall strength and resistance to mechanical degradation.

One preferred mode is a polyamide comprising a first polymer and a second, but different polymer (differing in polymer type, molecular weight or physical property) that is conditioned or treated at elevated temperature. The polymer blend can be reacted and formed into a single chemical specie or can be physically combined into a blended composition by an annealing process. Annealing implies a physical change, like crystallinity, stress relaxation or orientation. Preferred materials are chemically reacted into a single polymeric specie such that a Differential Scanning calorimeter (DSC) analysis reveals a single polymeric material to yield improved stability when contacted with high temperature, high humidity and difficult operating conditions. Preferred materials for use in the blended polymeric systems include nylon 6; nylon 66; nylon 6,10; nylon (6-66-6,10) copolymers and other linear generally aliphatic nylon compositions.

A suitable polyamide may include for example, 20% nylon 6, 60% nylon 66 and 20% by weight of a polyester. The polyamide may include combinations of miscible polymers or combinations of immiscible polymers.

In some aspects, the polyamide may include nylon 6. In terms of lower limits, the polyamide may include nylon 6 in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 6 in an amount of 99.9 wt. % or less, 99 wt. % or less, 95 wt. % or less, 90 wt. % or less, 85 wt. % or less, or 80 wt. % or less. In terms of ranges, the polyamide may comprise nylon 6 in an amount from 0.1 to 99.9 wt. %, e.g., from 1 to 99 wt. %, from 5 to 95 wt. %, from 10 to 90 wt. %, from 15 to 85 wt. %, or from 20 to 80 wt. %.

In some aspects, the polyamide may include nylon 66. In terms of lower limits, the polyamide may include nylon 66 in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 66 in an amount of 99.9 wt. % or less, 99 wt. % or less, 95 wt. % or less, 90 wt. % or less, 85 wt. % or less, or 80 wt. % or less. In terms of ranges, the polyamide may comprise nylon 66 in an amount from 0.1 to 99.9 wt. %, e.g., from 1 to 99 wt. %, from 5 to 95 wt. %, from 10 to 90 wt. %, from 15 to 85 wt. %, or from 20 to 80 wt. %.

In some aspects, the polyamide may include nylon 6I. In terms of lower limits, the polyamide may include nylon 6I in an amount of at least 0.1 wt. %, e.g., at least 0.5 wt. %, at least 1 wt. %, at least 5 wt. %, at least 7.5 wt. %, or at least 10 wt. %. In terms of upper limits, the polyamide may include nylon 6I in an amount of 50 wt. % or less, 40 wt. % or less, 35 wt. % or less, 30 wt. % or less, 25 wt. % or less, or 20 wt. % or less. In terms of ranges, the polyamide may comprise nylon 6I in an amount from 0.1 to 50 wt. %, e.g., from 0.5 to 40 wt. %, from 1 to 35 wt. %, from 5 to 30 wt. %, from 7.5 to 25 wt. %, or from 10 to 20 wt. %.

In some aspects, the polyamide may include nylon 6T. In terms of lower limits, the polyamide may include nylon 6T in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 6T in an amount of 50 wt. % or less, 47.5 wt. % or less, 45 wt. % or less, 42.5 wt. % or less, 40 wt. % or less, or 37.5 wt. % or less. In terms of ranges, the polyamide may comprise nylon 6T in an amount from 0.1 to 50 wt. %, e.g., from 1 to 47.5 wt. %, from 5 to 45 wt. %, from 10 to 42.5 wt. %, from 15 to 40 wt. %, or from 20 to 37.5 wt. %.

Block copolymers are also useful in the process of this disclosure. With such copolymers the choice of solvent swelling agent is important. The selected solvent is such that both blocks were soluble in the solvent. One example is an ABA (styrene-EP-styrene) or AB (styrene-EP) polymer in methylene chloride solvent. If one component is not soluble in the solvent, it will form a gel. Examples of such block copolymers are Kraton® type of styrene-b-butadiene and styrene-b-hydrogenated butadiene (ethylene propylene), Pebax® type of e-caprolactam-b-ethylene oxide, Sympatex® polyester-b-ethylene oxide and polyurethanes of ethylene oxide and isocyanates.

Addition polymers like polyvinylidene fluoride, syndiotactic polystyrene, copolymer of vinylidene fluoride and hexafluoropropylene, polyvinyl alcohol, polyvinyl acetate, amorphous addition polymers, such as poly(acrylonitrile) and its copolymers with acrylic acid and methacrylates, polystyrene, poly(vinyl chloride) and its various copolymers, poly(methyl methacrylate) and its various copolymers, are known to be solution spun with relative ease because they are soluble at low pressures and temperatures. It is envisioned these can be melt spun per the instant disclosure as one method of making nanofibers.

There is a substantial advantage to forming polymeric compositions comprising two or more polymeric materials in polymer admixture, alloy format or in a crosslinked chemically bonded structure. We believe such polymer compositions improve physical properties by changing polymer attributes such as improving polymer chain flexibility or chain mobility, increasing overall molecular weight and providing reinforcement through the formation of networks of polymeric materials.

In one embodiment of this concept, two related polymer materials can be blended for beneficial properties. For example, a high molecular weight polyvinylchloride can be blended with a low molecular weight polyvinylchloride. Similarly, a high molecular weight nylon material can be blended with a low molecular weight nylon material.

RV of Polyamide and of Nanofiber Nonwoven Product

RV of polyamides (and resultant products) is generally a ratio of solution or solvent viscosities measured in a capillary viscometer at 25° C. (ASTM D 789) (2015). For present purposes the solvent is formic acid containing 10% by weight water and 90% by weight formic acid. The solution is 8.4% by weight polymer dissolved in the solvent.

The RV ($\eta_r$) as used with respect to the disclosed polymers and products is the ratio of the absolute viscosity of the polymer solution to that of the formic acid:

$$\eta_r = (\eta_p/\eta_f) = (f_r \times d_p \times t_p)/\eta_f$$

where: $d_p$=density of formic acid-polymer solution at 25° C., $t_p$=average efflux time for formic acid-polymer solution, $\eta_f$=absolute viscosity of formic acid, kPa×s(E+6 cP) and $f_r$=viscometer tube factor, mm$^2$/s (cSt)/s=$\eta_r/t_3$.

A typical calculation for a 50 RV specimen:

$$\eta r = (fr \times dp \times tp)/\eta f$$

where:
fr=viscometer tube factor, typically 0.485675 cSt/s
dp=density of the polymer—formic solution, typically 1.1900 g/ml
tp=average efflux time for polymer—formic solution, typically 135.00 s
$\eta f$=absolute viscosity of formic acid, typically 1.56 cP giving an RV of $\eta r$=(0.485675 cSt/s×1.1900 g/ml×135.00 s)/1.56 cP=50.0. The term t3 is the efflux time of the S-3 calibration oil used in the determination of the absolute viscosity of the formic acid as required in ASTM D789 (2015).

In some embodiments, the RV of the (precursor) polyamide has a lower limit of at least 2, e.g., at least 3, at least 4, or at least 5. In terms of upper limits, the polyamide has an RV of at 330 or less, 300 or less, 275 or less, 250 or less, 225 or less, 200 or less, 150 or less, 100 or less, or 60 or less. In terms of ranges, the polyamide may have an RV of 2 to 330, e.g., from 2 to 300, from 2 to 275, from 2 to 250, from 2 to 225, from 2 to 200, 2 to 100, from 2 to 60, from 2 to 50, from 2 to 40, from 10 to 40, or from 15 to 40 and any values in between.

In some embodiments, the RV of the nanofiber nonwoven product has a lower limit of at least 2, e.g., at least 3, at least 4, or at least 5. In terms of upper limits, the nanofiber nonwoven product has an RV of at 330 or less, 300 or less, 275 or less, 250 or less, 225 or less, 200 or less, 150 or less, 100 or less, or 60 or less. In terms of ranges, the nanofiber nonwoven product may have an RV of 2 to 330, e.g., from 2 to 300, from 2 to 275, from 2 to 250, from 2 to 225, from 2 to 200, 2 to 100, from 2 to 60, from 2 to 50, from 2 to 40, from 10 to 40, or from 15 to 40, and any values in between.

The relationship between the RV of the (precursor) polyamide composition and the RV of the nanofiber nowoven product may vary. In some aspects, the RV of the nanofiber nonwoven product may be lower than the RV of the polyamide composition. Reducing the RV conventionally has not been a desirable practice when spinning nylon 66. The inventors, however, have discovered that, in the production of nanofibers, it is an advantage. It has been found that the use of lower RV polyamide nylons, e.g., lower RV nylon 66, in a melt spinning process has surprisingly been found to yield nanofiber filaments having unexpectedly small filament diameters.

The method by which the RV is lowered may vary widely. In some cases, process temperature may be raised to lower the RV. In some embodiments, however, the temperature raise may only slightly lower the RV since temperature affects the kinetics of the reaction, but not the reaction equilibrium constant. The inventors have discovered that, beneficially, the RV of the polyamide, e.g., the nylon 66, may be lowered by depolymerizing the polymer with the addition of moisture. Up to 5% moisture, e.g., up to 4%, up to 3%, up to 2%, or up to 1%, may be included before the polyamide begins to hydrolyze. This technique provides a surprising advantage over the conventional method of adding other polymers, e.g., polypropylene, to the polyamide (to reduce RV).

In some aspects, the RV may be raised, e.g., by lowering the temperature and/or by reducing the moisture. Again, temperature has a relatively modest effect on adjusting the RV, as compared to moisture content. The moisture content may be reduced to as low as 1 ppm or greater, e.g., 5 ppm or greater, 10 ppm or greater, 100 ppm or greater, 500 ppm or greater, 1000 ppm or greater, or 2500 ppm or greater. Reduction of moisture content is also advantageous for decreasing TDI and ODI values, discussed further herein. Inclusion of a catalyst may affect the kinetics, but not the actual K value.

In some aspects, the RV of the nanofiber nonwoven product is at least 20% less than the RV of the polyamide prior to spinning, e.g., at least 25% less, at least 30% less, at least 35% less, at least 40% less, at least 45% less, or at least 90% less.

In other aspects, the RV of the nanofiber nonwoven product is at least 5% greater than the RV of the polyamide prior to spinning, e.g., at least 10% greater, at least 15% greater, at least 20% greater, at least 25% greater, at least 30% greater, or at least 35% greater.

In still further aspects, the RV of the polyamide and the RV of the nanofiber nonwoven product may be substantially the same, e.g., within 5% of each other.

An additional embodiment of the present disclosure involves production of a layer of filter media comprising polyamide nanofibers having an average fiber diameter of less than 1 micron, and having an RV of from 2 to 330. In this alternate embodiment, preferable RV ranges include: 2 to 330, e.g., from 2 to 300, from 2 to 275, from 2 to 250, from 2 to 225, from 2 to 200, 2 to 100, from 2 to 60, from 2 to 50, from 2 to 40, from 10 to 40, or from 15 to 40. The nanofibers are subsequently converted to nonwoven web. As the RV increases beyond about 20 to 30, operating temperature becomes a greater parameter to consider. At an RV above the range of about 20 to 30, the temperature must be carefully controlled so as the polymer melts for processing purposes. Methods or examples of melt techniques are described in U.S. Pat. No. 8,777,599 (incorporated by reference herein), as well as heating and cooling sources which may be used in the apparatuses to independently control the temperature of the fiber producing device. Non limiting examples include resistance heaters, radiant heaters, cold gas or heated gas (air or nitrogen), or conductive, convective, or radiation heat transfer mechanisms.

Fiber Dimensions and Distributions

The fibers disclosed herein are nanofibers, e.g., fibers having an average fiber diameter of less than 1000 nm.

In the case of polyamides having an RV above 2 and less than 330, the average fiber diameter of the nanofibers in the fiber layer of the nonwoven may be less than 1 micron, e.g., less than 950 nanometers, less than 925 nanometers, less than 900 nanometers, less than 800 nanometers, less than 700 nanometers, less than 600 nanometers, or less than 500 nanometers. In terms of lower limits, the average fiber diameter of the nanofibers in the fiber layer of the nonwoven may have an average fiber diameter of at least 100 nanometers, at least 110 nanometers, at least 115 nanometers, at least 120 nanometers, at least 125 nanometers, at least 130 nanometers, at least 150 nanometers, or at least 300 nanometers or at least 350 nanometers. In terms of ranges, the average fiber diameter of the nanofibers in the fiber layer of the nonwoven may be from 100 to 1000 nanometers, e.g., from 110 to 950 nanometers, from 115 to 925 nanometers, from 120 to 900 nanometers, from 125 to 800 nanometers, from 125 to 700 nanometers, from 130 to 600 nanometers, or from 150 to 500 nanometers. In other embodiments, the average fiber diameter of the nanofibers may be from 300 to 700 nanometers, e.g., from 350 to 700 nanometers. Such average fiber diameters differentiate the nanofibers formed by the spinning processes disclosed herein from nanofibers formed by electrospinning processes. Electrospinning processes typically have average fiber diameters of less than 100 nanometers, e.g., from 50 up to less than 100 nanometers. Without being bound by theory, it is believed that such small nanofiber diameters may result in reduced strength of the fibers and increased difficulty in handling the nanofibers.

The use of the disclosed process and precursors leads to a specific and beneficial distribution of fiber diameters. For example, less than 20% of the nanofibers may have a fiber diameter from greater than 700 nanometers, e.g., less than 17.5%, less than 15%, less than 12.5%, or less than 10%. In terms of lower limits, at least 1% of the nanofibers have a fiber diameter of greater than 700 nanometers, e.g., at least 2%, at least 3%, at least 4%, or at least 5%. In terms of ranges, from 1 to 20% of the nanofibers have a fiber diameter of greater than 700 nanometers, e.g., from 2 to 17.5%, from 3 to 15%, from 4 to 12.5%, or from 5 to 10%. Such a distribution differentiates the nanofiber nonwoven products described herein from those formed by electrospinning (which have a smaller average diameter (50-100 nanometers) and a much narrower distribution) and from those formed by non-nanofiber melt spinning (which have a much greater distribution). For example, a non-nanofiber centrifugally spun nonwoven is disclosed in WO 2017/214085 and reports fiber diameters of 2.08 to 4.4 microns but with a very broad distribution reported in FIG. 10A of WO 2017/214085.

In an embodiment, advantages are envisioned having two related polymers with different RV values (both less than 330 and having an average fiber diameter less than 1 micron) blended for a desired property. For example, the melting point of the polyamide may be increased, the RV adjusted, or other properties adjusted.

In some embodiments, the resultant nanofibers contain small amounts, if any, of solvent. Accordingly, in some aspects, the resultant nanofibers are free of solvent. It is believed that the use of the melt spinning process advantageously reduces or eliminates the need for solvents. This reduction/elimination leads to beneficial effects such as environmental friendliness and reduced costs. Fibers formed via solution spinning processes, which are entirely different from melt spinning processes described herein, require such solvents. In some embodiments, the nanofibers comprise less than 1 wt. % solvent, less than 5000 ppm, less than 2500 ppm, less than 2000 ppm, less than 1500 ppm, less than 1000 ppm, less than 500 ppm, less than 400 ppm, less than 300 ppm, less than 200 ppm, less than 100 ppm, or less than a detectable amount of solvent. Solvents may vary depending on the components of the polyamide but may include formic acid, sulfuric acid, toluene, benzene, chlorobenzene, xylene/chlorohexanone, decalin, paraffin oil, ortho dichlorobenzene, and other known solvents. In terms of ranges, when small amounts of solvent are included, the resultant nanofibers may have at least 1 ppm, at least 5 ppm, at least 10 ppm, at least 15 ppm, or at least 20 ppm solvent. In some aspects, non-volatile solvents, such as formic acid, may remain in the product and may require an additional extraction step. Such an additional extraction step may add to production costs.

In some cases, the nanofiber may be made of a polyamide material that optionally includes an additive. Examples of suitable additives include oils (such as finishing oils, e.g., silicone oils), waxes, solvents (including formic acid as described herein), lubricants (e.g., paraffin oils, amide waxes, and stearates), stabilizers (e.g., photostabilizers, UV stabilizers, etc.), delusterants, antioxidants, colorants, pigments, and dyes. The additives may be present in a total amount of up to 49 wt. % of the nanofiber nonwoven product, e.g., up to 40 wt. %, up to 30 wt. %, up to 20 wt. %, up to 10 wt. %, up to 5 wt. %, up to 3 wt. %, or up to 1 wt. %. In terms of lower limits, the additives may be present in the nanofiber product in an amount of at least 0.01 wt. %, e.g., at least 0.05 wt. %, at least 0.1 wt. %, at least 0.25 wt. %, or at least 0.5 wt. %. In terms of ranges, the additives may be present in the nanofiber product in an amount from 0.01 to 49 wt. %, e.g., from 0.05 to 40 wt. %, from 0.1 to 30 wt. %, from 0.25 to 20 wt. %, from 0.5 to 10 wt. %, from 0.5 to 5 wt. %, or from 0.5 to 1 wt. %. In some aspects, monomers and/or polymers may be included as additives. For example, nylon 6I and/or nylon 6T may be added as an additive.

Antioxidants suitable for use in conjunction with the nanofiber nonwoven product described herein may, in some embodiments, include, but are not limited to, anthocyanin, ascorbic acid, glutathione, lipoic acid, uric acid, resveratrol, flavonoids, carotenes (e.g., beta-carotene), carotenoids, tocopherols (e.g., alpha-tocopherol, beta-tocopherol, gamma-tocopherol, and delta-tocopherol), tocotrienols, ubiquinol, gallic acids, melatonin, secondary aromatic amines, benzofuranones, hindered phenols, polyphenols, hindered amines, organophosphorus compounds, thioesters, benzoates, lactones, hydroxylamines, and the like, and any combination thereof. In some embodiments, the antioxidant may be selected from the group consisting of stearyl3-(3,5-di-tert-butyl-4-hydroxyphenyl) propionate, bis(2,4-dicumylphenyl)pentaerythritol diphosphite, tris(2,4-di-tert-butylphenyl)phosphite, bisphenol A propoxylate diglycidyl ether, 9,10-dihydroxy-9-oxa-10-phosphaphenanthrene-10-oxide and mixtures thereof.

Colorants, pigments, and dyes suitable for use in conjunction with the nanofiber nonwoven product described herein may, in some embodiments, include, but are not limited to, plant dyes, vegetable dyes, titanium dioxide (which may also act as a delusterant), carbon black, charcoal, silicon dioxide, tartrazine, E102, phthalocyanine blue, phthalocyanine green, quinacridones, perylene tetracarboxylic acid di-imides, dioxazines, perinones disazo pigments, anthraquinone pigments, metal powders, iron oxide, ultramarine, nickel titanate, benzimidazolone orange gl, solvent orange 60, orange dyes, calcium carbonate, kaolin clay, aluminum hydroxide, barium sulfate, zinc oxide, aluminum oxide, CARTASOL® dyes (cationic dyes, available from Clariant Services) in liquid and/or granular form (e.g., CARTASOL Brilliant Yellow K-6G liquid, CARTASOL Yellow K-4GL liquid, CARTASOL Yellow K-GL liquid, CARTASOL Orange K-3GL liquid, CARTASOL Scarlet K-2GL liquid, CARTASOL Red K-3BN liquid, CARTASOL Blue K-5R liquid, CARTASOL Blue K-RL liquid, CARTASOL Turquoise K-RL liquid/granules, CARTASOL Brown K-BL liquid), FASTUSOL® dyes (an auxochrome, available from BASF) (e.g., Yellow 3GL, Fastusol C Blue 74L), and the like, any derivative thereof, and any combination thereof. In some embodiments, solvent dyes may be employed.

Method of Forming the Nanofibers

As described herein, the nanofiber nonwoven product is formed by spinning to form a spun product. "Island-in-the-sea" refers to fibers forming by extruding at least two polymer components from one spinning die, also referred to as conjugate spinning. As used herein, spinning specifically excludes solution spinning and electrospinning.

In some aspects, the polyamide nanofiber is melt blown. Melt blowing is advantageously less expensive than electrospinning. Melt blowing is a process type developed for the formation of nanofibers and nonwoven webs; the nanofibers are formed by extruding a molten thermoplastic polymeric material, or polyamide, through a plurality of small holes. The resulting molten threads or filaments pass into converging high velocity gas streams which attenuate or draw the filaments of molten polyamide to reduce their diameters. Thereafter, the melt blown nanofibers are carried by the high velocity gas stream and deposited on a collecting surface, or forming wire, to form a nonwoven web of randomly disbursed melt blown nanofibers. The formation of nanofibers and nonwoven webs by melt blowing is well known in the art. See, by way of example, U.S. Pat. Nos. 3,016,599; 3,704,198; 3,755,527; 3,849,241; 3,978,185; 4,100,324; 4,118,531; and 4,663,220.

As is well known, electrospinning has many fabrication parameters that may limit spinning certain materials. These parameters include: electrical charge of the spinning material and the spinning material solution; solution delivery (often a stream of material ejected from a syringe); charge at the jet; electrical discharge of the fibrous membrane at the collector; external forces from the electrical field on the spinning jet; density of expelled jet; and (high) voltage of the electrodes and geometry of the collector. In contrast, the aforementioned nanofibers and products are advantageously formed without the use of an applied electrical field as the primary expulsion force, as is required in an electrospinning process. Thus, the polyamide is not electrically charged, nor are any components of the spinning process. Importantly, the dangerous high voltage necessary in electrospinning processes, is not required with the presently disclosed processes/products. In some embodiments, the process is a non-electrospin process and resultant product is a non-electrospun product that is produced via a non-electrospin process.

An embodiment of making the inventive nanofiber nonwovens is by way of 2-phase spinning or melt blowing with propellant gas through a spinning channel as is described generally in U.S. Pat. No. 8,668,854. This process includes two phase flow of polymer or polymer solution and a pressurized propellant gas (typically air) to a thin, preferably converging channel. The channel is usually and preferably annular in configuration. It is believed that the polymer is sheared by gas flow within the thin, preferably converging channel, creating polymeric film layers on both sides of the channel. These polymeric film layers are further sheared into nanofibers by the propellant gas flow. Here again, a moving collector belt may be used and the basis weight of the nanofiber nonwoven is controlled by regulating the speed of the belt. The distance of the collector may also be used to control fineness of the nanofiber nonwoven. The process is better understood with reference to FIG. 1.

Beneficially, the use of the aforementioned polyamide precursor in the melt spinning process provides for significant benefits in production rate, e.g., at least 5% greater, at least 10% greater, at least 20% greater, at least 30% greater, at least 40% greater. The improvements may be observed as an improvement in area per hour versus a conventional process, e.g., an electrospin process or a process that does not employ the features described herein. In some cases, the production increase over a consistent period of time is improved. For example, over a given time period, e.g., one hour, of production, the disclosed process produces at least 5% more product than a conventional process or an electrospin process, e.g., at least 10% more, at least 20% more, at least 30% more, or at least 40% more.

FIG. 1 illustrates schematically operation of a system for spinning a nanofiber nonwoven including a polyamide feed assembly 110, an air feed 1210 a spinning cylinder 130, a collector belt 140 and a take up reel 150. During operation, polyamide melt or solution is fed to spinning cylinder 130 where it flows through a thin channel in the cylinder with high pressure air, shearing the polyamide into nanofibers. Details are provided in the aforementioned U.S. Pat. No. 8,668,854. The throughput rate and basis weight is controlled by the speed of the belt. Optionally, functional additives such as charcoals, copper or the like can be added with the air feed, if so desired.

In an alternate construction of the spinneret used in the system of FIG. 1, particulate material may be added with a separate inlet as is seen in U.S. Pat. No. 8,808,594.

Still yet another methodology which may be employed is melt blowing the polyamide nanofiber webs disclosed herein (FIG. 2). Melt blowing involves extruding the polyamide into a relatively high velocity, typically hot, gas stream. To produce suitable nanofibers, careful selection of the orifice and capillary geometry as well as the temperature is required as is seen in: Hassan et al., J Membrane Sci., 427, 336-344, 2013 and Ellison et al., Polymer, 48 (11), 3306-3316, 2007, and, International Nonwoven Journal, Summer 2003, pg 21-28.

U.S. Pat. No. 7,300,272 discloses a fiber extrusion pack for extruding molten material to form an array of nanofibers that includes a number of split distribution plates arranged in a stack such that each split distribution plate forms a layer within the fiber extrusion pack, and features on the split distribution plates form a distribution network that delivers the molten material to orifices in the fiber extrusion pack. Each of the split distribution plates includes a set of plate segments with a gap disposed between adjacent plate segments. Adjacent edges of the plate segments are shaped to form reservoirs along the gap, and sealing plugs are disposed in the reservoirs to prevent the molten material from leaking from the gaps. The sealing plugs can be formed by the molten material that leaks into the gap and collects and solidifies in the reservoirs or by placing a plugging material in the reservoirs at pack assembly. This pack can be used to make nanofibers with a melt blowing system described in the patents previously mentioned.

Additional Product Characteristics

The spinning processes described herein can form a polyamide nanofiber nonwoven product having a relatively low oxidative degradation index ("ODI") value. A lower ODI indicates less severe oxidative degradation during manufacture. In some aspects, the ODI may range from 10 to 150 ppm. ODI may be measured using gel permeation chromatography (GPC) with a fluorescence detector. The instrument is calibrated with a quinine external standard. 0.1 grams of nylon is dissolved in 10 mL of 90% formic acid. The solution is then analyzed by GPC with the fluorescence detector. The detector wavelengths for ODI are 340 nm for excitation and 415 nm for emission. In terms of upper limits, the ODI of the polyamide nanofiber nonwoven may be 200 ppm or less, e.g., 180 ppm or less, 150 ppm or less, 125 ppm or less, 100 ppm or less, 75 ppm or less, 60 ppm or less, or 50 ppm or less. In terms of the lower limits, the ODI of the polyamide nanofiber nonwoven may be 1 ppm or greater, 5 ppm or greater, 10 ppm or greater, 15 ppm or greater, 20 ppm or greater, or 25 ppm or greater. In terms of ranges, the ODI of the polyamide nanofiber nonwoven may be from 1 to 200 ppm, from 1 to 180 ppm, from 1 to 150 ppm, from 5 to 125 ppm, from 10 to 100 ppm, from 1 to 75 ppm, from 5 to 60 ppm, or from 5 to 50 ppm.

Additionally, the spinning processes as described herein can result in a relatively low thermal degradation index ("TDI"). A lower TDI indicates a less severe thermal history of the polyamide during manufacture. TDI is measured the same as ODI, except that the detector wavelengths for TDI are 300 nm for excitation and 338 nm for emission. In terms of upper limits, the TDI of the polyamide nanofiber nonwoven may be 4000 ppm or less, e.g., 3500 ppm or less, 3100 ppm or less, 2500 ppm or less, 2000 ppm or less, 1000 ppm or less, 750 ppm or less, or 700 ppm or less. In terms of the lower limits, the TDI of the polyamide nanofiber nonwoven may be 20 ppm or greater, 100 ppm or greater, 125 ppm or greater, 150 ppm or greater, 175 ppm or greater, 200 ppm or greater, or 210 ppm or greater. In terms of ranges, the TDI of the polyamide nanofiber nonwoven may be from 20 to 400 ppm, 100 to 4000 ppm, from 125 to 3500 ppm, from 150 to 3100 ppm, from 175 to 2500 ppm, from 200 to 2000 ppm, from 210 to 1000 ppm, from 200 to 750 ppm, or from 200 to 700 ppm.

TDI and ODI test methods are also disclosed in U.S. Pat. No. 5,411,710. Lower TDI and/or ODI values are beneficial because they indicate that the nanofiber nonwoven product is more durable than products having greater TDI and/or ODI. As explained above, TDI and ODI are measures of degradation and a product with greater degradation would not perform as well. For example, such a product may have reduced dye uptake, lower heat stability, lower life in a filtration application where the fibers are exposed to heat, pressure, oxygen, or any combination of these, and lower tenacity in industrial fiber applications.

One possible method that may be used in forming a nanofiber nonwoven product with a lower TDI and/or ODI would be to include additives as described herein, especially antioxidants. Such antioxidants, although not necessary in conventional processes, may be used to inhibit degradation. An example of useful antioxidants include copper halides and Nylostab® S-EED® available from Clariant.

The spinning methods as described herein may also result in a nanofiber nonwoven product having an Air Permeability Value of less than 600 CFM/ft$^2$, e.g., less than 590 CFM/ft$^2$, less than 580 CFM/ft$^2$, less than 570 CFM/ft$^2$, less than 560 CFM/ft$^2$, or less than 550 CFM/ft$^2$. In terms of lower limits, the nanofiber nonwoven product may have an Air Permeability Value of at least 50 CFM/ft², at least 75 CFM/ft², at least 100 CFM/ft², at least 125 CFM/ft², at least 150 CFM/ft², or at least 200 CFM/ft². In terms of ranges, the nanofiber nonwoven product may have an Air Permeability Value from 50 to 600 CFM/ft², from 75 to 590 CFM/ft², from 100 to 580 CFM/ft², from 125 to 570 CFM/ft², from 150 to 560 CFM/ft², or from 200 to 550 CFM/ft².

The spinning methods as described herein may also result in a nanofiber nonwoven product having a filtration efficiency, as measured by a TSI 3160 automated filter tester from 1 to 99.999%, e.g., from 1 to 95%, from 1 to 90%, from 1.5 to 85%, or from 2 to 80%. The TSI 3160 Automated Filter Tester is used to test the efficiency of filter materials. Particle penetration and pressure drop are the two important parameters measured using this instrument. Efficiency is 100%—penetration. A challenge solution with known particle size is used. The TSI 3160 is used to measure Hepa filters and uses a DOP solution. It combines an Electrostatic Classifier with dual Condensation Particle Counters (CPCs) to measure most penetrating particle size (MPPS) from 15 to 800 nm using monodisperse particles. And can test efficiencies up to 99.999999%.

Applications

The inventive nanofiber nonwovens are useful in a variety of applications due to their high temperature resistance, barrier, permeability properties, and, processability. The products may be used in multilayer structures including laminates in many cases.

Thus, the products are used in air or liquid filtration in the following sectors: transportation; industrial; commercial and residential.

The products are likewise suitable for barrier applications in breathable fabrics, surgical nonwovens, baby care, adult care, apparel, composites, construction and acoustics. The compositions are useful for sound dampening in automotive, electronic and aircraft applications which may require composites of different fiber sizes for best performance. At higher basis weights, the products are used in connection with beverages, food packaging, transportation, chemical processing and medical applications such as wound dressings or medical implants.

The unique characteristics of the nonwovens of the disclosure provide functionality and benefits not seen in conventional products, for example, the nonwovens of the disclosure can be used as packaging for smoked meats.

Filter Media Layers

Filter media generally comprise several layers with each layer providing different filtration characteristics. One such layer is a scrim layer, e.g., a reinforcing layer. In some aspects, the scrim layer is selected to have a sizeable filtration capacity and efficiency. In other aspects, however, the scrim layer may have little or no filtration capacity or efficiency. The scrim layer may have a thickness from 0.1 to 0.81 mm, e.g., from 0.2 to 0.3 mm, or about 0.25 mm. The basis weight of the scrim layer may be from 5 to 203 gsm, e.g., from 5 to 60 gsm, from 15 to 45 gsm, or any values in between. The fibers of the scrim layer may have a median fiber diameter from 1 to 1000 micrometers, e.g., from 1 to 500 micrometers, from 1 to 100 micrometers, or any values in between. The thickness, basis weight, and median fiber diameter may be chosen based on the type of filter media in which the scrim is used. Generally, the scrim may have a Frazier air permeability at a differential pressure of 0.5 inch of water between 111 CFM and 1675 CFM, e.g., from 450 to 650 CFM, from 500 to 600 CFM, from 550 to 1675 or any values in between. Filtration efficiency of the scrim layer can be characterized by comparing the number of dust particulates with the particle size ranging from 0.3 μm to 10 μm on the upstream and downstream sides of the scrim measured using PALAS MFP-2000 (Germany) equipment. In one embodiment the filtration efficiency of a scrim selected for the scrim layer is measured using ISO Fine dust having 70 mg/m³ dust concentration, a sample testing size of 100² cm, and face velocity of 20 cm/s. A suitable scrim may be selected from generally commercially available scrims, or formed via spun bonding process or carding process or batting process or another process using a suitable polymer. A suitable polymer for the scrim includes but not limited to polyester, polypropylene, polyethylene and polyamide, e.g., a nylon or a combination of two or more of these polymers. For example, scrim suitable for the scrim layer is available in various thicknesses from suppliers including among others Berry Plastics formerly Fiberweb Inc, of Old Hickory, Tenn. or Cerex Advanced Fabrics, Inc. of Cantonment, Fla. More than one scrim layer may be incorporated into the filter media.

An additional layer in the filter media is the polyamide nanofiber layer. In some aspects, this layer is spun or melt blown directly onto the scrim layer or scrim layers. In some embodiments, the polyamide nanofiber layer has a thickness of at least 1 mm, typically between 1.0 mm and 6.0 mm, preferably between 0.07 mm and 3 mm, and in one embodiment about 0.13 mm. One or more additional layers may then be deposited on top of the polyamide nanofiber layer, e.g., two more layers, three more layers, four more layers, or five or more layers.

In another aspect of the invention, one or more layers can be combined to create a filter media with higher thickness. The additional layers also increase the dirt holding capacity of the media. Interestingly, the efficiency of the fabrics does not increase much as more layers are added. This is because the mean flow pore size does not change substantially with the addition of layers and the smaller particles that pass through the first layer continue to pass through the other layers. Layering the fabrics will provide a thicker media increasing the dirt holding capacity of the media but not dramatically increasing the filtration efficiency. A gradient filter can be created by adding another layer with higher filtration efficiency. This gradient filter will provide higher filtration efficiency.

Although the above description applies generally to various uses of filter media, further description of specific types of filters is provided below.

Air Filters

As described herein the polyamide nanofiber layer may be used in air filters. Air filters may be useful in application including air circulation systems in buildings, vehicles, vacuum cleaners, respirator filters, and other applications requiring filtered air. Fluid streams such as air and gas streams often carry particulate material therein. The removal of some or all of the particulate material from the fluid stream is needed. For example, air intake streams to the cabins of motorized vehicles, air in computer disk drives, HVAC air, clean room ventilation and applications using filter bags, barrier fabrics, woven materials, air to engines for motorized vehicles, or to power generation equipment; gas streams directed to gas turbines; and, air streams to various combustion furnaces, often include particulate material therein. In the case of cabin air filters, it is desirable to remove the particulate matter for comfort of the passengers and/or for aesthetics. With respect to air and gas intake streams to engines, gas turbines and combustion furnaces, removal of the particulate material is needed because particulate can cause substantial damage to the internal workings to the various mechanisms involved. In other instances, production gases or off gases from industrial processes or engines may contain particulate material therein. Before such gases can be, or should be, discharged through various downstream equipment to the atmosphere, it may be desirable to obtain a substantial removal of particulate material from those streams.

A general understanding of some of the basic principles and problems of air filter design can be understood by consideration of the following types of filter media: surface loading media; and, depth media. Each of these types of media has been well studied, and each has been widely utilized. Certain principles relating to them are described, for example, in U.S. Pat. Nos. 5,082,476; 5,238,474; and 5,364,456. The complete disclosures of these three patents are incorporated herein by reference.

In some aspects, the polyamide nanofibers may be formed on and adhered to a filter substrate. Natural fiber and synthetic fiber substrates, like spun bonded fabrics, non-woven fabrics of synthetic fiber and non-wovens made from the blends of cellulosics, synthetic and glass fibers, non-woven and woven glass fabrics, plastic screen like materials both extruded and hole punched, UF and MF membranes of organic polymers can be used. Sheet-like substrate or cellulosic non-woven web can then be formed into a filter structure that is placed in a fluid stream including an air stream or liquid stream for the purpose of removing suspended or entrained particulate from that stream. The shape and structure of the filter material is up to the design engineer. One important parameter of the filter elements after formation is its resistance to the effects of heat, humidity or both. An important aspect of the filter media of the invention is the ability of the filter media to survive contact with warm humid air. In contact with such hot humid air streams, the polyamide nanofibers should retain greater than 50% of the fiber unchanged for filtration purposes after being exposed to air having a temperature of 60° C. and 100% relative humidity for 16 hours. One aspect of the filter media of the invention is a test of the ability of the filter media to survive immersion in warm water for a significant period of time. The immersion test can provide valuable information regarding the ability of the polyamide nanofibers to survive hot humid conditions and to survive the cleaning of the filter element in aqueous solutions that can contain substantial proportions of strong cleaning surfactants and strong alkalinity materials. Preferably, the polyamide nanofibers of the invention can survive immersion in hot water while retaining at least 50% or even at least 75% of the fine fiber formed on the surface of the substrate as an active filter component. Retention of at least 50% of the polyamide nanofibers can maintain substantial fiber efficiency without loss of filtration capacity or increased back pressure. The thickness of the typical polyamide nanofiber filtration layer ranges from 0.001 to 5 microns, e.g., from 0.01 to 3 microns with a polyamide nanofibers basis weight ranging from about 0.01 to 240 micrograms/cm$^2$. The polyamide nanofiber layer formed on the substrate in the filters should be substantially uniform in both filtering performance and fiber location. Substantial uniformity means that the fiber has sufficient coverage of the substrate to have at least some measurable filtration efficiency throughout the covered substrate. Adequate filtration can occur with a wide variation in fiber add-on. Accordingly, the polyamide nanofiber layers may vary in fiber coverage, basis weight, layer thickness or other measurement of fiber add-on and still remain well within the bounds of the invention. Even a relatively small add-on of fine fiber may add efficiency to the overall filter structure.

The "lifetime" of a filter is typically defined according to a selected limiting pressure drop (delta P) across the filter. In one embodiment, the delta P may be from 0.5 to 10 mm H$_2$O, e.g., from 0.5 to 5 mm H$_2$O or from 0.5 to 3 mm H$_2$O. The pressure buildup across the filter defines the lifetime at a defined level for that application or design. Since this buildup of pressure is a result of load, for systems of equal efficiency a longer life is typically directly associated with higher capacity. Efficiency is the propensity of the media to trap, rather than pass, particulates. Typically the more efficient a filter media is at removing particulates from a gas flow stream, in general, the more rapidly the filter media will approach the "lifetime" pressure differential (assuming other variables to be held constant). In this application the term "unchanged for filtration purposes" refers to maintaining sufficient efficiency to remove particulate from the fluid stream as is necessary for the selected application.

Paper filter elements are widely used forms of surface loading media. In general, paper elements comprise dense mats of cellulose, synthetic or other fibers oriented across a gas stream carrying particulate material. The paper is generally constructed to be permeable to the gas flow, and to also have a sufficiently fine pore size and appropriate porosity to inhibit the passage of particles greater than a selected size therethrough. As the gases (fluids) pass through the filter paper, the upstream side of the filter paper operates through diffusion and interception to capture and retain selected sized particles from the gas (fluid) stream. The particles are collected as a dust cake on the upstream side of the filter paper. In time, the dust cake also begins to operate as a filter, increasing efficiency. This is sometimes referred to as "seasoning," i.e. development of an efficiency greater than initial efficiency.

A simple filter design such as that described above is subject to at least two types of problems. First, a relatively simple flaw, i.e. rupture of the paper, results in failure of the system. Secondly, particulate material rapidly builds up on the upstream side of the filter, as a thin dust cake or layer, increasing the pressure drop. Various methods have been applied to increase the "lifetime" of surface-loaded filter systems, such as paper filters. One method is to provide the media in a pleated construction, so that the surface area of media encountered by the gas flow stream is increased relative to a flat, non-pleated construction. While this increases filter lifetime, it is still substantially limited. For this reason, surface loaded media has primarily found use in applications wherein relatively low velocities through the filter media are involved, generally not higher than about 20-30 feet per minute and typically on the order of about 10 feet per minute or less. The term "velocity" in this context is the average velocity through the media (i.e. flow volume per media area).

In general, as air flow velocity is increased through a pleated paper media, filter life is decreased by a factor proportional to the square of the velocity. Thus, when a pleated paper, surface loaded, filter system is used as a particulate filter for a system that requires substantial flows of air, a relatively large surface area for the filter media is needed. For example, a typical cylindrical pleated paper filter element of an over-the-highway diesel truck will be about 9-15 inches in diameter and about 12-24 inches long, with pleats about 1-2 inches deep. Thus, the filtering surface area of media (one side) is typically 30 to 300 square feet.

In many applications, especially those involving relatively high flow rates, an alternative type of filter media, sometimes generally referred to as "depth" media, is used. A typical depth media comprises a relatively thick tangle of fibrous material. Depth media is generally defined in terms of its porosity, density or percent solids content. For example, a 2-3% solidity media would be a depth media mat of fibers arranged such that approximately 2-3% of the overall volume comprises fibrous materials (solids), the remainder being air or gas space.

Another useful parameter for defining depth media is fiber diameter. If percent solidity is held constant, but fiber diameter (size) is reduced, pore size or interfiber space is reduced, i.e. the filter becomes more efficient and will more effectively trap smaller particles.

A typical conventional depth media filter is a deep, relatively constant (or uniform) density, media, i.e. a system in which the solidity of the depth media remains substantially constant throughout its thickness. By "substantially constant" in this context, it is meant that only relatively minor fluctuations in density, if any, are found throughout the depth of the media. Such fluctuations, for example, may result from a slight compression of an outer engaged surface, by a container in which the filter media is positioned.

Gradient density depth media arrangements have been developed. Some such arrangements are described, for example, in U.S. Pat. Nos. 4,082,476; 5,238,474; and 5,364,456. In general, a depth media arrangement can be designed to provide "loading" of particulate materials substantially throughout its volume or depth. Thus, such arrangements can be designed to load with a higher amount of particulate material, relative to surface loaded systems, when full filter lifetime is reached. However, in general the tradeoff for such arrangements has been efficiency, since, for substantial loading, a relatively low solidity media is desired. Gradient density systems such as those in the patents referred to above, have been designed to provide for substantial efficiency and longer life. In some instances, surface loading media is utilized as a "polish" filter in such arrangements.

A filter media construction according to the present invention includes a first layer of permeable coarse fibrous media or substrate having a first surface. A first layer of polyamide nanofiber media is secured to the first surface of the first layer of permeable coarse fibrous media and a second layer of polyamide nanofiber is secured to the substrate. Preferably the first layer of permeable coarse fibrous material comprises fibers having an average fiber diameter of at least 10 microns, typically and preferably about 12 (or 14) to 30 microns. Also preferably the first and second layer of permeable coarse fibrous material comprises a media having a basis weight of no greater than about 200 gsm (grams/meter$^2$ or g/m$^2$), preferably about 0.50 to 150 gsm, and most preferably at least 8 gsm. Preferably the first layer of permeable coarse fibrous media is at least 0.0005 inch (12 microns) thick, and typically and preferably is about 0.001 to 0.030 inch (25-800 microns) thick.

In some arrangements, the first layer of permeable coarse fibrous material comprises a material which, if evaluated separately from a remainder of the construction by the Frazier permeability test, would exhibit a permeability of at least 1 meter(s)/min, and typically and preferably about 2-900 meters/min (about 0.03-15 m-sec$^{-1}$). Herein when reference is made to efficiency, unless otherwise specified, reference is meant to efficiency when measured according to ASTM-1215-89, with 0.78p, monodisperse polystyrene spherical particles, at 20 fpm (6.1 meters/min) as described herein.

In some aspects, the layer of polyamide nanofiber secured to the first surface of the layer of permeable coarse fibrous media is a layer of nano- and microfiber media wherein the fibers have average fiber diameters of no greater than about 2 microns, generally and preferably no greater than about 1 micron as described herein, and in one embodiment may have average fiber diameters from 100 to 1000 nanometers, e.g., from 110 to 950 nanometers, from 115 to 925 nanometers, from 120 to 900 nanometers, from 125 to 800 nanometers, from 125 to 700 nanometers, from 130 to 600 nanometers, or from 150 to 500 nanometers. Also, preferably the first layer of fine fiber material secured to the first surface of the first layer of permeable coarse fibrous material has an overall thickness that is no greater than about 30 microns, more preferably no more than 20 microns, most preferably no greater than about 10 microns, and typically and preferably that is within a thickness of about 1-8 times (and more preferably no more than 5 times) the fine fiber average fiber diameter of the layer.

Certain aspects include filter media as generally defined, in an overall filter construction. Some preferred arrangements for such use comprise the media arranged in a cylindrical, pleated configuration with the pleats extending generally longitudinally, i.e. in the same direction as a longitudinal axis of the cylindrical pattern. For such arrangements, the media may be imbedded in end caps, as with conventional filters. Such arrangements may include upstream liners and downstream liners if desired, for typical conventional purposes.

In some applications, media according to the present invention may be used in conjunction with other types of media, for example conventional media, to improve overall filtering performance or lifetime. For example, media according to the present invention may be laminated to conventional media, be utilized in stack arrangements; or be incorporated (an integral feature) into media structures including one or more regions of conventional media. It may be used upstream of such media, for good load; and/or, it may be used downstream from conventional media, as a high efficiency polishing filter.

Certain arrangements according to the present invention may also be utilized in liquid filter systems, i.e. wherein the particulate material to be filtered is carried in a liquid. In specific applications such as hot fluids, the melt point of nylon nanofiber fabrics provides an advantage. Melt points of nylon nanofiber fabrics may be from 223° C. to 360° C., e.g., from 225° C. to 350° C. Also, certain arrangements according to the present invention may be used in mist collectors, for example arrangements for filtering fine mists from air.

Various filter designs are shown in patents disclosing and claiming various aspects of filter structure and structures used with the filter materials. U.S. Pat. No. 4,720,292, disclose a radial seal design for a filter assembly having a generally cylindrical filter element design, the filter element being sealed by a relatively soft, rubber-like end cap having a cylindrical, radially inwardly facing surface. U.S. Pat. No. 5,082,476, disclose a filter design using a depth media comprising a foam substrate with pleated components combined with the microfiber materials of the invention. U.S. Pat. No. 5,104,537, relate to a filter structure useful for filtering liquid media. Liquid is entrained into the filter housing, passes through the exterior of the filter into an interior annular core and then returns to active use in the structure. Such filters are highly useful for filtering hydraulic fluids. U.S. Pat. No. 5,613,992, show a typical diesel engine air intake filter structure. The structure obtains air from the external aspect of the housing that may or may not contain entrained moisture. The air passes through the filter while the moisture can pass to the bottom of the housing and can drain from the housing. U.S. Pat. No. 5,820,646, disclose a Z filter structure that uses a specific pleated filter design involving plugged passages that require a fluid stream to pass through at least one layer of filter media in a "Z" shaped path to obtain proper filtering performance. The filter media formed into the pleated Z shaped format can contain the fine fiber media of the invention. U.S. Pat. No. 5,853,442 discloses a bag house structure having filter elements that can contain the fine fiber structures of the invention. U.S. Pat. No. 5,954,849 shows a dust collector structure useful in processing typically air having large dust loads to filter dust from an air stream after processing a workpiece generates a significant dust load in an environmental air. Lastly, U.S. Design Pat. No. 425,189, discloses a panel filter using the Z filter design.

The media can be a polyester synthetic media, a media made from cellulose, or blends of these types of materials. One example of usable cellulose media is: a basis weight of about 45-55 lbs./3000 ft² (84.7 g/m²), for example, 48-54 lbs./3000 ft²; a thickness of about 0.005-0.015 in, for example about 0.010 in. (0.25 mm); frazier permeability of about 20-25 ft/min, for example, about 22 ft/min (6.7 m/min); pore size of about 55-65 microns, for example, about 62 microns; wet tensile strength of at least about 7 lbs/in, for example, 8.5 lbs./in (3.9 kg/in); burst strength wet off of the machine of about 15-25 psi, for example, about 23 psi (159 kPa). The cellulose media can be treated with fine fiber, for example, fibers having a size (diameter) of 5 microns or less, and in some instances, submicron. A variety of methods can be utilized for application of the fine fiber to the media, if it is desired to use fine fiber. Some such approaches are characterized, for example, in U.S. Pat. No. 5,423,892, column 32, at lines 48-60. More specifically, such methods are described in U.S. Pat. Nos. 3,878,014; 3,676,242; 3,841,953; and 3,849,241, incorporated herein by reference. Enough fine fiber typically would be applied until the resulting media construction would have the individual test between 50 to 90%, tested according to SAE J726C, using SAE fine dust, and an overall efficiency of greater than 90%.

Example of usable filter constructions are described in U.S. Pat. No. 5,820,646. In another example embodiment the fluted construction (not shown) includes tapered flutes. By "tapered," it is meant that the flutes enlarge along their length such that the downstream opening of the flutes is larger than the upstream opening. Such filter constructions are described in U.S. application Ser. No. 08/639,220, herein incorporated by reference in its entirety. Details about fine fiber and its materials and manufacture is disclosed in U.S. application Ser. No. 09/871,583, herein incorporated by reference.

Various filter designs are shown in patents disclosing and claiming various aspects of filter structure and structures used with the filter materials. U.S. Pat. No. 7,008,465 discloses filter designs which may be used in a wet-dry vacuum. U.S. Pat. No. 4,720,292 discloses a radial seal design for a filter assembly having a generally cylindrical filter element design, the filter element being sealed by a relatively soft, rubber-like end cap having a cylindrical, radially inwardly facing surface. U.S. Pat. No. 5,082,476 discloses a filter design using a depth media comprising a foam substrate with pleated components combined with the microfiber materials of the invention. U.S. Pat. No. 5,104,537 relates to a filter structure useful for filtering liquid media. Liquid is entrained into the filter housing, passes through the exterior of the filter into an interior annular core and then returns to active use in the structure. Such filters are highly useful for filtering hydraulic fluids. U.S. Pat. No. 5,613,992 shows a typical diesel engine air intake filter structure. The structure obtains air from the external aspect of the housing that may or may not contain entrained moisture. The air passes through the filter while the moisture can pass to the bottom of the housing and can drain from the housing. U.S. Pat. No. 5,820,646 discloses a Z filter structure that uses a specific pleated filter design involving plugged passages that require a fluid stream to pass through at least one layer of filter media in a "Z" shaped path to obtain proper filtering performance. The filter media formed into the pleated Z shaped format can contain the fine fiber media of the invention. U.S. Pat. No. 5,853,442, disclose a bag house structure having filter elements that can contain the fine fiber structures of the invention. Berkhoel et al., U.S. Pat. No. 5,954,849, show a dust collector structure useful in processing typically air having large dust loads to filter dust from an air stream after processing a workpiece generates a significant dust load in an environmental air. Lastly, Gillingham, U.S. Design Pat. No. 425,189, discloses a panel filter using the Z filter design.

Oil Filters

Oil filters intended for use in combustion engines conventionally comprise filter media with fibers obtained from wood pulp. Such wood pulp fibers are typically 1 to 7 millimeters long and 15 to 45 microns in diameter. Natural wood pulp has largely been the preferred raw material for producing filtration media due to its relatively low cost, processability, various mechanical and chemical properties, and durability in the end application. The filter media are pleated to increase filtration surface area transversally to the direction of the oil flow.

U.S. Pat. No. 3,288,299 discloses a dual type of oil filter cartridge wherein part of the flow is through a surface type of filter element, such as pleated paper, and the rest of the flow is through a depth type of filter element such as a thick fibrous mass. An oil filter and adapter is disclosed in U.S. Pat. No. 3,912,631.

A typical oil filter includes pleated filter media (or filtration media) a backing structure. A conventional filter media exhibits low stiffness and has poor mechanical strength in terms of tensile strength and burst strength. The filter media is therefore used together with a metal mesh or other type of pleat shape when used in the end application.

Nevertheless, in view of the low mechanical strength the filter media tend to burst over time on exposure to engine oil at the temperatures encountered in a combustion engine, such as 125 to 135° C.

Although filter media products that are produced largely with wood pulp are still an excellent choice for most automotive and heavy duty oil filtration applications, there is a growing market demand for oil filtration products that exhibit increased strength and durability over time as the media is exposed to the various chemical, thermal, and mechanical stresses of the end application environment. This demand stems from both harsher end application conditions that the media is exposed to as well as increasing demand for filter media that can be safely used in the end application for increasingly longer amounts of time without rupturing or failing.

The long-standing and widely applied solution to this demand has been to incorporate some minor quantity of synthetic fiber, typically PET polyester, in the amount of about 5-20%. The result of fortifying the fiber furnish in this way is higher media strength as well as enhanced chemical and mechanical durability when the media is exposed to the end application environment, due to the superior chemical, thermal, and mechanical durability of the synthetic fibers themselves.

For air filters there are alternative technical solutions primarily based on non-natural fibers described in the art. U.S. Pat. No. 7,608,125 discloses a MERV filter composed of a wet laid fibrous mat comprising about 20-60 wt. % of glass fibers, about 15-60 wt. % of polymer fibers, and about 15-40 wt. % of a binder for bonding of the fibers. The binder of this disclosure is latex modified with melamine formaldehyde.

U.S. Pub. No. 2012/0175298 discloses a HEPA filter comprising a nonwoven web of two different fiber components. The first fiber component is formed by fibers of polyesters, polyamides, polyolefin, polylactide, cellulose esters, polycaprolactone, up at least 20% of the weight of web. The second fiber can be composed of either cellulosic fibres (Lyocell) or glass or combination of the two. There is further a binder component formed by acrylic polymers, styrenic polymers, vinyl polymers polyurethanes, and combinations thereof.

U.S. Pub. No. 2013/0233789 discloses a glass-free nonwoven fuel filtration media that is comprised of a blend of a staple synthetic fibers and fibrillated cellulosic fibers.

U.S. Pat. Nos. 7,488,365, 8,236,082 and 8,778,047 disclose further filtration media containing 50 to 100% of synthetic fibers of the weight of the fibrous web. In fact, the known filtration media containing a high percentage of synthetic fibers are not pleateable or self-supporting as such, and they have to be co-pleated and reinforced with some sort of additional mechanical support layer, such as a plastic or wire mesh backing.

Media made with high levels of synthetic fiber typically tend to exhibit drape and they lack sufficient stiffness and rigidity causing the pleats to collapse without an additional support. A 100% synthetic media as disclosed in the art cannot maintain a grooving pattern like corrugation or a pleated structure due to the thermal and mechanical properties of the synthetic fibers. The fibrous media according to the present invention is readily groovable, i.e. corrugatable, and pleatable. And the material is capable of maintaining most of its original groove depth (or corrugation depth) even after long exposure times in hot engine oil having e.g. a temperature of 140° C. This feature also contributes to extended operation life of the present fibrous media.

Some oil filters are able to omit expensive backing materials, allowing for more easily groovable (or corrugatable) and pleatable filters. The end result is the ability to produce a filter with the present fibrous media without a support backing material while also achieving significantly higher burst strength than possible with traditional style oil filtration media that contain wood pulps, excellent resistance to glycol assisted disintegration and excellent dust filtration capacity and particle removal efficiency.

By incorporating a polyamide nanofiber layer into oil filters, several of the above described problems may be alleviated due to the aforementioned benefits of the polyamide nanofiber layer.

As with other filter media described herein, the oil filter is typically a multi-layer filter. Exemplary thermoplastic fibers suitable for additional layers in an oil filter include polyesters (e.g., polyalkylene terephthalates such as polyethylene terephthalate (PET), polybutylene terephthalate (PBT) and the like), polyalkylenes (e.g., polyethylenes, polypropylenes and the like), polyacrylonitriles (PAN), and additional polyamide layers (nylons, for example, nylon-6, nylon 6,6, nylon-6,12, and the like). Preferred are PET fibers which exhibit good chemical and thermal resistance which are properties of importance for the use of the media as oil filters.

In an embodiment, the thermoplastic synthetic fibers are selected from fibers having an average fiber diameter from 0.1 µm to 15 µm, such as 0.1 µm to 10 µm, and an average length from 1 to 50 mm, such as 1 to 20 mm. In general, fibers having a length greater than 5 mm, in particular greater than 10 mm, are preferred for good burst strength. In the present context, "silicacious fibers" primarily stands for "glass" fibers such as microglass fibers.

Such fibers generally have an aspect ratio (ratio of length to diameter) of 1,000 to 1. In one embodiment, the glass fibers have an average fiber diameter from 0.1 µm to 5 µm, and an aspect ratio of 1,000 to 1. In particular, the glass fibers may have an average fiber diameter of 0.4 to 2.6 µm. Glass fibers are preferably included in a sufficient amount to improve efficiency of the fibrous media as a filter. In one embodiment, the synthetic fibers comprise up to 30 wt. %, preferably up to 20 wt. %, based on the total weight of the fibers, of glass fibers. Although the synthetic fibers comprise only up to 30 wt. % or up to 20 wt. % of glass fibers, based on the total weight of the fibers, this amount is sufficient to prepare a fibrous media for filter examples. Typically, synthetic filter media of the prior art include a high amount of glass fibers for achieving a sufficient filtration efficiency of a gas or a liquid, even under high temperature conditions such as e.g. 150° C. However, by using less glass fibers in the fibrous media as set forth in the claims, fibrous media may be provided that have excellent filtration properties in terms of particle removal efficiency and hot oil burst strength. In particularly preferred embodiments, there are at least two kinds of glass fibers present, viz. a first group of fibers having an average fiber diameter of less than 1 µm and a second group which having an average fiber diameter of 2 µm or more. The weight ratio of the two groups of fibers is typically 1:100 to 100:1, in particular about 1:10 to 10:1. The synthetic fibers may also include up to 40% by weight, preferably up to 30% by weight, based on the total weight of the fibers, of a regenerated cellulosic material, such as Lyocell or viscose or combinations thereof.

The filter media may be contained in a canister, including a single or dual canister. Each canister may have an inlet and an outlet for introducing oil flow and removing filter oil, respectively. The filter media in each canister may differ to allow for different filtration capacities. For example, a first canister would contain a filter housing for a full-flow path filtration while a second canister would contain a filter housing for a reduced-flow path filtration. U.S. Pub. No. 2008/0116125 describes such dual canisters in detail.

Bag Filters

Bag filters have been described in the art, including in U.S. Pat. No. 7,318,852 and U.S. Pub. No. 2009/2055226. Dust collectors, also known as bag houses, are generally used to filter particulate material from industrial effluent or off-gas. Once filtered, the cleaned off-gas can be vented to the atmosphere or recycled. Such a bag house dust collector structure generally includes one or more flexible filter banks supported within a cabinet or similar structure. In such a filter cabinet and bank, the filter bag is generally secured within the cabinet and maintained in a position such that effluent efficiently passes through the bag thereby removing entrained particulates. The filter bag, secured within the cabinet, is typically supported by a structure that separates the upstream and downstream air and supports the filter bag to maintain efficient operation.

More specifically, in a so-called "baghouse filter", particulate material is removed from a gaseous stream as the stream is directed through the filter media. In a typical application, the filter media has a generally sleeve-like tubular configuration, with gas flow arranged so as to deposit the particles being filtered on the exterior of the sleeve. In this type of application, the filter media is periodically cleaned by subjecting the media to a pulsed reverse-flow, which acts to dislodge the filtered particulate material from the exterior of the sleeve for collection in the lower portion of the baghouse filter structure. U.S. Pat. No. 4,983,434 illustrates a baghouse filter structure and a prior art filter laminate.

The separation of particulate impurities from industrial fluid streams is often accomplished using fabric filters. These textile based filter media remove particulate from the fluids. When the resistance to flow or pressure drop through the textile caused by accumulation of particulate on the filter becomes significant, the filter must be cleaned, and the particulate cake removed.

It is common in the industrial filtration market to characterize the type of filter bag by the method of cleaning. The most common types of cleaning techniques are reverse air, shaker and pulse jet. Reverse air and shaker techniques are considered low energy cleaning techniques.

The reverse air technique is a gentle backwash of air on a filter bag which collects dust on the interior. The back wash collapses the bag and fractures dust cake which exits the bottom of the bag to a hopper. Shaker mechanisms clean filter cake that collects on the inside of a bag as well. The top of the bag is attached to an oscillating arm which creates a sinusoidal wave in the bag to dislodge the dust cake. Pulse jet cleaning techniques employs a short pulse of compressed air that enters the interior top portion of the filter tube. As the pulse cleaning air passes through the tube venturi it aspirates secondary air and the resulting air mass violently expands the bag and casts off the collected dust cake. The bag will typically snap right back to the cage support and go right back into service collecting particulate.

Of the three cleaning techniques, the pulse jet is the most stressful on the filter media. However, in recent years industrial process engineers have increasingly selected pulse jet baghouses.

The need for high temperature (up to 200° C.), thermally stable, chemically resistant filter media in baghouses narrows the choice of filter media to only a few viable candidates for pulse jet applications. Common high temperature textiles comprise polytetrafluoroethylene (PTFE), fiberglass, or polyimides (polyimides are stable for continuous use to 260° C.). When the effect of high temperature is combined with the effect of oxidizing agents, acids or bases, there is a tendency for fiberglass and polyimide media to fail prematurely. Thus, there is a preference for using PTFE. Commercially available PTFE fabrics are supported needlefelts of PTFE fiber. These felts usually weigh from 20-26 oz/yd$^2$ and are reinforced with a multifilament woven scrim (4-6 oz/yd2). The felts are made up of staple fibers, (usually 6.7 denier/filament, or 7.4 dtex/filament) and 2-6 inches in length. This product works similarly to many other felted media in that a primary dust cake "seasons" the bag. This seasoning, sometimes called in-depth filtration, causes the media to filter more efficiently but has a drawback in that the pressure drop increases across the media during use. Eventually the bag will blind or clog and the bags will have to be washed or replaced. In general, the media suffers from low filtration efficiency, blinding and dimensional instability (shrinkage) at high temperatures.

Another type of structure designed for high temperatures is described in U.S. Pat. No. 5,171,339. A bag filter is disclosed that comprises a bag retainer clothed in a filter bag. The cloth of said filter bag comprises a laminate of a felt of poly(m-phenylene isophthalamide), polyester or polyphenylenesulfide fibers having a thin nonwoven fabric of poly (p-phenylene terephthalamide) fibers needled thereto, the poly(p-phenylene terephthalamide) fabric being positioned at the surface of the filter bag first exposed to the hot particle laden gas stream. The poly(p-phenylene terephthalamide) fabric can have a basis weight of from 1 to 2 oz/yd2.

A two layer product of porous expanded PTFE (ePTFE) membrane laminated to woven porous expanded PTFE fiber fabric has also been used. Commercial success of this product has not been realized due to several reasons, but primarily due to the woven fiber fabric backing not wearing well on the pulse jet cage supports. The woven yarns slide on themselves and create excessive stress on the membrane, resulting in membrane cracks.

Nonwoven fabrics have been advantageously employed for manufacture of filter media. Generally, nonwoven fabrics employed for this type of application have been entangled and integrated by mechanical needle-punching, sometimes referred to as "needle-felting", which entails repeated insertion and withdrawal of barbed needles through a fibrous web structure.

U.S. Pat. No. 4,556,601 discloses a hydroentangled, nonwoven fabric, which may be used as a heavy-duty gas filter.

U.S. Pat. No. 6,740,142 discloses nanofibers for use in baghouse filters. A flexible bag is at least partially covered by a layer having a basis weight of 0.005 to 2.0 grams per square meter (gsm) and a thickness of 0.1 to 3 microns. The layer comprises a polymeric fine fiber with a diameter of about 0.01 to about 0.5 micron, but is limited in basis weight due to the limitations of the process used to produce it.

In some aspects, the filter may comprise a filtration medium including a thermally-stabilized nanoweb layer having a basis weight of greater than about 0.1 gsm, or greater than about 0.5 gsm, or greater than about 5 gsm, or even greater than about 10 gsm and up to about 90 gsm. The filtration medium further comprises a substrate to which the nanoweb is bonded in a face-to-face relationship. Advantageously, the nanoweb layer is positioned on the upstream surface or side of the filter bag, i.e. on the surface which is first exposed to the hot, particle-laden gas stream.

In a further embodiment the filter comprises a composite of a first substrate layer having a thermally-stabilized nanoweb bonded thereto in a face-to-face relationship, the nanoweb being positioned on the upstream side of the filter bag, i.e. at the surface of the filter bag first exposed to the hot, particle-laden gas stream, wherein the nanoweb has a basis weight of greater than about 0.1 gsm, and a second substrate layer bonded to the nanoweb layer. In some cases it is advantageous that the second substrate layer is positioned in between the nanoweb and the first substrate layer, while in other cases it is desirable that the nanoweb layer be positioned between the first and second substrate layers.

Polymers useful for electroblowing or melt blowing nanofiber webs of the present invention are polyamides (PA), and preferably a polyamide selected from the group consisting of polyamide 6, polyamide 6,6, polyamide 6,12, polyamide 11, polyamide 12, polyamide 4,6, a semi-aromatic polyamide, high temperature polyamide and any combination or blend thereof. The polyamides (PA) used in preparing the blending composition of the invention are well known in the art.

Representative polyamides include semicrystalline and amorphous polyamide resins of a molecular weight of at least 5,000 as described, for instance, in U.S. Pat. Nos. 4,410,661; 4,478,978; 4,554,320; and 4,174,358.

In accordance with the invention, polyamides obtained by copolymerization of two of the above polymers, by terpolymerization of the above polymers or their component monomers, e.g., a copolymer of adipic acid, isophthalic acid and hexamethylenediamine, or blended mixtures of polyamides such as a mixture of PA 6, 6 and PA 6 may also be used. Preferably, the polyamides are linear and have melting points or softening points above 200° C.

Such polyamides formed by electrospinning may be used in addition to the inventive polyamide nanofiber layer that is formed by melt spinning. The polyamide used to spin the fibers comprises a thermal stability additive, such as an antioxidant. Suitable antioxidants for use in the invention are any materials that are soluble in the spinning solvent with the polyamide if the polyamide is spun from solution. Examples of such materials are copper halides and hindered phenols. By "hindered phenol" is meant a compound whose molecular structure contains a phenolic ring in which one or both of the carbon atoms cis to the hydroxyl moiety holds an alkyl group. The alkyl group is preferably a tertiary butyl moiety and both adjacent carbon atoms hold a tertiary butyl moiety.

Antioxidants include but are not limited to: phenolic amides such as N,N'-hexamethylene bis(3,5-di-(tert)-butyl-4-hydroxyhydrocinnamamide) (Irganox 1098); amines such as various modified benzenamines (e.g. Irganox 5057); phenolic esters such as ethylenebis(oxyethylene)bis-(3-(5-tert-butyl-4-hydroxy-m-tolyl)-propionate (Irganox 245) (all available from Ciba Specialty Chemicals Corp., Tarrytown, N.Y.); organic or inorganic salts such as mixtures of cuprous iodide, potassium iodide, and zinc salt of octadecanoic acid, available as Polyad 201 (from Ciba Specialty Chemicals Corp., Tarrytown, N.Y.), and mixtures of cupric acetate, potassium bromide, and calcium salt of octadecanoic acid, available as Polyad 1932-41 (from Polyad Services Inc., Earth City, Mo.); hindered amines such as 1,3,5-triazine-2,4,6-triamine,N,N'''-[1,2-ethane-diyl-bis[[[4,6-bis-[butyl (1,2,2,6,6-pentamethyl-4-piperidinyl)amino]-1,3,5-triazine-2-yl]imino]-3,1-propanediyl]] bis[N',N''-dibutyl-N',N''-bis (1,2,2,6,6-pentamethyl-4-piperidinyl) (Chimassorb 119 FL), 1,6-hexanediamine, N,N'-bis(2,2,6,6-tetramethyl-4-piperidinyl)-polymer with 2,4,6-trichloro-1,3,5-triazine, reaction products with N-butyl-1-butanamine an N-butyl-2,2,6,6-tetramethyl-4-piperidinamine (Chimassorb 2020), and poly[[6-[(1,1,3,3-tetramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]) (Chimassorb 944) (all available from Ciba Specialty Chemicals Corp., Tarrytown, N.Y.); polymeric hindered phenols such as 2,2,4 trimethyl-1,2 dihydroxyquinoline (Ultranox 254 from Crompton Corporation, a subsidiary of Chemtura Corporation, Middlebury, Conn., 06749); hindered phosphites such as bis(2,4-di-t-butylphenyl) pentaerythritol diphosphite (Ultranox 626 from Crompton Corporation, a subsidiary of Chemtura Corporation, Middlebury, Conn., 06749); and tris(2,4-di-tert-butyl-phenyl) phosphite (Irgafos 168 from Ciba Specialty Chemicals Corp., Tarrytown, N.Y.); 3-(3,5-di-tert-butyl-4-hydroxyphenyl)propionic acid (Fiberstab PA6, available from Ciba Specialty Chemicals Corp., Tarrytown, N.Y.), and combinations and blends thereof.

The antioxidant agent used as stabilizer may be between 0.01 and 10% by weight relative to the polyamide layer formed by electrospinning and especially between 0.05 and 5% by weight.

The substrate layers of the bag filter may be formed from a variety of conventional fibers including cellulosic fibers such as cotton, hemp or other natural fibers, inorganic fibers including glass fibers, carbon fibers or organic fibers such as polyesters, polyimides, polyamides, polyolefins, or other conventional fibers or polymeric materials and mixtures thereof.

The substrate layers of the filter bag of the invention can be woven or non-woven. In woven bags, the fibers are typically formed into an interlocking mesh of fiber in a typical woven format. Non-woven fabrics are typically made by loosely forming the fibers in no particular orientation and then binding the fibers into a filter fabric. One mode of constructing the elements of the invention includes using a felt media as a substrate. Felts are a compressed, porous, non-woven fabric made by laying discrete natural or synthetic fibers and compressing the fibers into a felt layer using commonly available felt bonding technology that would be known to one skilled in the art.

Fibers are typically used which result in fabrics that exhibit excellent resilience and resistance to the effects of the passage of air and the entrapment of particulates. The fabrics can have stability with respect to chemical particulates, and can be stable with respect to varying temperatures of both the air passing through the bag house and the temperature of the particulate entrained on the filter surface.

The filter structures of the invention are typically maintained in their useful open shape by supporting the substrate plus nanoweb layer composite on a suitable support structure such as a retainer at the neck of a bag, or a support structure can be located in the interior of the bag. Such supports can be formed from linear members in the form of a wound wire or cage-like structure. Alternatively, the support can comprise a perforated ceramic or metal structure that mimics the shape of the bag. If the support structure contacts the filter substrate over a significant fraction of its surface area, the support structure should be permeable to the passage of air through the structure and should provide no incremental increase in pressure drop over the filter bag. Such support structures can be formed such that they contact the entirety of the interior of the filter bag and maintain the filter bag in an efficient filtration shape or confirmation.

A process for combining the nanoweb layers with the substrate to produce the present composite structure is not specifically limited. The nanofibers of the nanoweb layer can be physically entwined in the substrate layer, or they can be bonded by inter-fusion of the fibers of the nanoweb layer with those of the substrate, for example by thermal, adhesive or ultrasonic lamination or bonding.

Thermal methods for bonding the substrate layer to the nanoweb layer or a nanoweb plus substrate layer include calendering. "Calendering" is the process of passing a web through a nip between two rolls. The rolls may be in contact with each other, or there may be a fixed or variable gap between the roll surfaces.

Advantageously, in the calendering process, the nip is formed between a soft roll and a hard roll. The "soft roll" is a roll that deforms under the pressure applied to keep two rolls in a calender together. The "hard roll" is a roll with a surface in which no deformation that has a significant effect on the process or product occurs under the pressure of the process. An "unpatterned" roll is one which has a smooth surface within the capability of the process used to manufacture them. There are no points or patterns to deliberately produce a pattern on the web as it passed through the nip, unlike a point bonding roll. The hard roll in the process of calendering used in the present invention can be patterned or unpatterned.

Adhesive lamination can be carried out in conjunction with calendering or by application of pressure by other means to the laminate in the presence of a solvent based adhesive at low temperatures, for example room temperature. Alternatively a hot melt adhesive can use used at elevated temperatures. One skilled in the art will readily recognize suitable adhesives that can be used in the process of the invention.

Examples of methods of entwining the fibers according to such a physical bonding are needle punch processing and water jet processing, otherwise known as hydroentangling or spun lacing. Needle punching (or needling) consists essentially of tucking a small bundle of individual fibers down through a carded batt of fibers in such large numbers of penetrations that a cohesive textile structure is formed, as disclosed in U.S. Pat. Nos. 3,431,611 and 4,955,116.

For the process of manufacturing the filter of the present invention it is desirable to perform needle punch processing (or water-jet processing) on the high-density layer (substrate) side of the nonwoven fabric. Compared to the case where needle punch processing is performed on the low-density layer (nanoweb) side, needle punch processing on the high-density layer side can suppress collapse or deformation of the pores accompanied by intertwining, as well as undesirable widening of the pore size, thereby suppressing lowering of the initial cleaning efficiency with respect to smaller particles. It is preferable to set the number of needles (the number for penetration) per unit area in the range from about 40 to about 100 perforations/cm2, in order to suppress undesirable widening of the pore diameter, and to perform sufficient intertwining operation. Further, no more than about 25% of the surface area of the low density layer should be perforated.

The as-spun nanoweb may comprises primarily or exclusively nanofibers, advantageously produced by electrospinning, such as classical electrospinning or electroblowing, and in certain circumstances, by meltblowing or other such suitable processes. Classical electrospinning is a technique illustrated in U.S. Pat. No. 4,127,706, wherein a high voltage is applied to a polymer in solution to create nanofibers and nonwoven mats. However, total throughput in electrospinning processes is too low to be commercially viable in forming heavier basis weight nanowebs.

The "electroblowing" process is disclosed in WO 03/080905. A stream of polymeric solution comprising a polymer and a solvent is fed from a storage tank to a series of spinning nozzles within a spinneret, to which a high voltage is applied and through which the polymeric solution is discharged. Meanwhile, compressed air that is optionally heated is issued from air nozzles disposed in the sides of, or at the periphery of the spinning nozzle. The air is directed generally downward as a blowing gas stream which envelopes and forwards the newly issued polymeric solution and aids in the formation of the fibrous web, which is collected on a grounded porous collection belt above a vacuum chamber. The electroblowing process permits formation of commercial sizes and quantities of nanowebs at basis weights in excess of about 1 gsm, even as high as about 40 gsm or greater, in a relatively short time period.

A substrate can be arranged on the collector so as to collect and combine the nanofiber web spun on the substrate. Examples of the substrate may include various nonwoven cloths, such as meltblown nonwoven cloth, needle-punched or spunlaced nonwoven cloth, woven cloth, knitted cloth, paper, and the like, and can be used without limitations so long as a nanofiber layer can be added on the substrate. The nonwoven cloth can comprise spunbond fibers, dry-laid or wet-laid fibers, cellulose fibers, melt blown fibers, glass fibers, or blends thereof. Alternatively, the nanoweb layer can be deposited directly onto the felt substrate.

It can be advantageous to add known-in-the-art plasticizers to the various polymers described above, in order to reduce the Tg of the fiber polymer. Suitable plasticizers will depend upon the polymer to be electrospun or electroblown, as well as upon the particular end use into which the nanoweb will be introduced. For example, nylon polymers can be plasticized with water or even residual solvent remaining from the electrospinning or electroblowing process. Other known-in-the-art plasticizers which can be useful in lowering polymer Tg include, but are not limited to aliphatic glycols, aromatic sulphanomides, phthalate esters, including but not limited to those selected from the group consisting of dibutyl phthalate, dihexl phthalate, dicyclohexyl phthalate, dioctyl phthalate, diisodecyl phthalate, diundecyl phthalate, didodecanyl phthalate, and diphenyl phthalate, and the like. The Handbook of Plasticizers, edited by George Wypych, 2004 Chemtec Publishing, incorporated herein by reference, discloses other polymer/plasticizer combinations which can be used in the present invention.

Liquid Filters

Liquid filter media are often used for filtering microorganisms. Biopharmaceutical manufacturing is constantly looking for ways to streamline operations, combine and eliminate steps, and reduce the time it takes to process each batch of pharmaceutical drug substances. At the same time, market and regulatory pressures are driving biopharmaceutical manufacturers to reduce their costs. Since bacteria, *mycoplasma* and virus removal account for a significant percentage of the total cost of pharmaceutical drug substance purification, approaches that increase a porous membrane's filtration throughput and reduce purification processing time are very much in demand.

With the introduction of new prefiltration media and the corresponding increases in throughput of bacteria, *mycoplasma* and virus retentive filters, the filtration of feed streams is becoming flux-limited. Thus, dramatic improvements in the permeability of bacteria, *mycoplasma* and virus retentive filters will have a direct beneficial impact on the cost of a bacteria, *mycoplasma* and virus filtration step(s).

Filters used in liquid filtration can generally be categorized as either fibrous non-woven media filters or porous film membrane filters.

Porous film membrane liquid filters or other types of filtration media can be used either unsupported or in conjunction with a porous substrate or support. Porous film liquid filtration membranes, which typically have pore sizes smaller than porous fibrous non-woven media, can be used in: (a) microfiltration (MF), wherein particulates filtered from a liquid are typically in the range of about 0.1 micron (µm) to about 10 µm; (b) ultrafiltration (UF), wherein particulates filtered from a liquid, are typically in the range of about 2 nanometers (nm) to about 0.1 µm; and (c) reverse osmosis (RO), wherein particulate matter filtered from a liquid, are typically in the range of about 1 Å to about 1 nm.

Retrovirus-retentive membranes are usually considered to be on the open end of ultrafiltration membranes.

High permeability and high reliable retention are two parameters desired in a liquid filtration membrane. There is, however, a trade-off between these two parameters, and for the same type of liquid filtration membrane, greater retention can be achieved by sacrificing permeability. The inherent limitations of conventional processes for making liquid filtration membranes prevent membranes from exceeding a certain threshold in porosity, and thus limits the magnitude of permeability that can be achieved at any given pore size.

Fibrous non-woven liquid filtration media include, but are not limited to, non-woven media formed from spunbonded, melt blown or spunlaced continuous fibers; hydroentangled non-woven media formed from carded staple fiber and the like, and/or combinations thereof. Typically, fibrous non-woven media filters used in liquid filtration have pore sizes generally greater than about 1 µm.

Non-woven materials are widely used in the manufacture of filtration products. Pleated membrane cartridges usually include non-woven materials as a drainage layer (for example, see U.S. Pat. Nos. 6,074,869, 5,846,438, and 5,652,050, each assigned to Pall Corporation; and U.S. Pat. No. 6,598,749 assigned to Cuno Inc, now 3M Purification Inc.)

Non-woven microporous materials can also be used as a supporting screen for an adjacent porous membrane layer located thereon, such as Biomax® ultrafiltration membranes by EMD Millipore Corporation, of Billerica, Mass.

Non-woven microporous materials can also be used as supporting skeletons to increase the strength of a porous membrane located on the non-woven microporous structure, such as Milligard™ filters also available from EMD Millipore Corporation.

Non-woven microporous materials can also be used for "coarse prefiltration" to increase the capacity of a porous membrane placed downstream of the non-woven microporous material, by removing suspended particles having diameters that are generally greater than about 1 µm. The porous membrane usually provides a critical biosafety barrier or structure having a well-defined pore size or molecular weight cut-off. Critical filtration is characterized by expected and validatable assurance of a high degree of removal (typically >99.99%, as defined by specified tests) of microorganisms and viral particles. Critical filtration is routinely relied upon to ensure sterility of liquid drug and liquid biopharmaceutical formulations at multiple manufacturing stages, as well as at point of use.

Melt-blown and spunbonded fibrous media are often referred to as "traditional" or "conventional" non-wovens. Fibers in these traditional non-wovens are usually at least about 1,000 nm in diameter, therefore the effective pore sizes in traditional non-wovens are greater than about one micron. The methods of manufacturing traditional non-wovens typically lead to highly inhomogeneous fiber mats.

Historically, the random nature of conventional non-woven mat formation, such as by melt-blowing and spun-bonding, has led to the general assumption that non-woven mats are unsuitable for any critical filtration of liquid streams, and as such, filtration devices incorporating conventional non-wovens mats typically use these mats for prefiltration purposes only in order to increase the capacity of a porous critical filtration membrane placed downstream of the conventional non-wovens mats.

Another type of non-woven includes electronspun nanofiber non-woven mats, which, like "traditional" or "conventional" non-wovens have been generally assumed unsuitable for the critical filtration of liquid streams. (See for example, Bjorge et al., Performance assessment of electrospun nanofibers for filter applications, Desalination, 249, (2009), 942-948).

Electrospun polymeric nanofiber mats are highly porous, wherein the "pore" size is approximately linearly proportional to the fiber diameter, and the porosity is relatively independent of the fiber diameter. The porosity of an electrospun nanofiber mat usually falls in the range of about 85% to 90%, resulting in a nanofiber mat that demonstrates dramatically improved permeability when compared to immersion cast membranes having a similar thickness and pore size rating. The porosity advantages of electrospun polymeric nanofiber mats over porous membranes becomes amplified in the smaller pore size ranges typically required for virus filtration, because of the reduced porosity of UF membranes discussed supra.

Electrospun nanofiber non-woven mats are produced by spinning polymer solutions or melts using electric potential rather than meltblown, wetlaid or extrusion manufacturing processes used in making conventional or traditional non-wovens. The fiber diameters typically obtained by electrospinning are in the range of 10 nm to 1,000 nm, and are one to three orders of magnitude smaller than conventional or traditional non-wovens.

Electrospun nanofiber mats are formed by putting a dissolved or molten polymer material adjacent to a first electrode and applying an electrical potential such that the dissolved or molten polymer material is drawn away from the first electrode toward a second electrode as a fiber. In the process of manufacturing electrospun nanofiber mats, the fibers are not forced to lay down in mats by blown hot air or other mechanical means that can lead to a very broad pore size distribution. Rather, electrospun nanofibers form a highly uniform mat because of the mutual electrical repulsion between the electrospun nanofibers.

WO 2010/107503, assigned to EMD Millipore Corporation, teaches nanofiber mats having a specific thickness and fiber diameter offer an improved combination of liquid permeability and microorganism retention. The thinnest sample taught is 55 µm thick with permeability of 4,960 lmh/psi, however neither the method to determine retention assurance nor the achieved level of assurance is described. Generally, nanofiber mats offer 2-10 times better permeability than their porous membrane counterparts of comparable retention, this is thought to be a consequence of the nanofiber mats having a higher porosity (~90% vs. 70-80% for a typical wet casting porous membrane).

Electrospun nanofiber mats can be manufactured by depositing fibers on a conventional spun-bonded non-woven fabric (examples of a face to face interface of a non-woven and a nanofiber layer are taught in WO 2009/010020 assigned to Elmarco s.r.o.; and in US Pub. App. No. 200910199717 assigned to Clarcor Inc., each incorporated herein by reference in their entirety). In each of these approaches, the roughness of the surface of the supporting non-woven fabric may propagate into the nanofiber layer causing potential non-uniformity of the nanofiber structure, thereby potentially compromising retention characteristics.

U.S. Pat. No. 7,585,437 issued to Jirsak et al. teaches a nozzle-free method for producing nanofibers from a polymer solution using electrostatic spinning and a device for carrying out the method.

WO 2003/080905 assigned to Nano Technics Co. LTD., incorporated herein by reference in its entirety, teaches an electroblowing process, wherein a stream of polymeric solution comprising a polymer and a solvent is fed from a storage tank to a series of spinning nozzles within a spinneret, to which a high voltage is applied and through which the polymeric solution is discharged. Compressed air, which may optionally be heated, is released from air nozzles disposed in the sides of, or at the periphery of, the spinning nozzle. The compressed air is directed generally downward as a blowing gas stream envelopes and forwards the newly issued polymeric solution, thereby aiding in the formation of a nanofibrous web, which is collected on a grounded porous collection belt located above a vacuum chamber.

U.S. Pub. No. 2004/0038014 to Schaefer et al. teaches a nonwoven filtration mat comprising one or more layers of a thick collection of fine polymeric microfibers and nanofibers formed by electrostatic spinning for filtering contaminants.

U.S. Pub. No. 2009/0199717 to Green teaches a method of forming electrospun fiber layers on a substrate layer, a significant amount of the electrospun fibers have fibers with a diameter of less than 100 nanometers (nm).

Bjorge et al., in Desalination 249 (2009) 942-948, teach electrospun Nylon nanofiber mats having a nanofiber diameter of about 50 nm to 100 nm, and a thickness of about 120 μm. The measured bacteria LRV for non-surface treated fibers is 1.6-2.2. Bjorge et al. purportedly conclude that bacteria removal efficiency of nanofiber electrospun mats is unsatisfactory.

Gopal et al., in Journal of Membrane Science 289 (2007) 210-219, teach electrospun polyethersulfone nanofiber mats, wherein the nanofibers have a diameter of about 470 nm. During liquid filtration, the nanofiber mats act as a screen to filter out particles above 1 micron (μm), and as a depth filter (e.g., prefilter) for particles under 1 micron.

Aussawasathien et al., in Journal of Membrane Science, 315 (2008) 11-19, teach electrospun nanofibers having a diameter of about 30 nm to 110 nm used in the removal of polystyrene particles having a diameter of about 0.5 μm to 10 μm.

One reason why researches investigated collecting electrode properties is to control the orientation of the collected nanofibers on that electrode. Li et al., in Nano Letters, vol. 5, no. 5 (2005) 913-916, described introducing an insulating gap into the collecting electrode and the effects of the area and the geometrical shape of that introduced insulating gaps. They demonstrated that assembly and alignment of the nanofibers could be controlled by varying the collecting electrode pattern.

A number of methods have been published that focus on geometrical surface properties, such as roughness. For example, US Pub. No. 2011/0305872 describes changing surface roughness of a substrate by grafting a polymer layer, in order to change binding properties of biologicals on that substrate. An optical profilometry method was described to determine surface roughness of the substrate using Olympus LEXT OLS4000 laser confocal microscope.

For critical filtration applications achieving high microorganism retention by itself is not enough but doing so in a reliable way with high assurance is required. In order to predict retention assurance statistical methods are often used, like censored data regression, to analyze lifetime data for reliability, where lifetimes are truncated. (Blanchard, (2007), Quantifying Sterilizing Membrane Retention Assurance, BioProcess International, v. 5, No. 5, pp. 44-51)

U.S. Pub. No. 2014/0166945 discloses a liquid filter comprising a porous polymeric nanofiber layer on a support, wherein at least on the surface of the support facing the polymeric nanofiber layer, the root mean square height of the surface is less than about 70 micrometers. This publication discloses a variety of polymers that may be used for the nanofiber layer and for the support.

The electrospun nanofibers may be prepared from a broad range of polymers and polymer compounds, including thermoplastic and thermosetting polymers. Suitable polymers include, but are not limited to, nylon, polyimide, aliphatic polyamide, aromatic polyamide, polysulfone, cellulose, cellulose acetate, polyether sulfone, polyurethane, poly(urea urethane), polybenzimidazole (PBI), polyetherimide, polyacrylonitrile (PAN), poly(ethylene terephthalate), polypropylene, polyaniline, poly(ethylene oxide), poly(ethylene naphthalate), poly(butylene terephthalate), styrene butadiene rubber, polystyrene, poly(vinyl chloride), poly(vinyl alcohol), poly(vinylidene fluoride), poly(vinyl butylene), polymethylmethacrylate (PMMA), copolymers, derivative compounds and blends and/or combinations thereof.

Non-limiting examples of single or multilayered porous substrates or supports include smooth non-wovens. In other non-limiting examples the smooth non-woven support has a substantially uniform thickness. Smooth non-wovens are produced from a variety of thermoplastic polymers, including polyolefins, polyesters, polyamides, etc.

The homogeneity of the non-woven substrate of the composite filtration medium that captures or collects the electrospun nanofibers may at least partially determine the properties in the resulting nanofiber layer of the final composite filtration structure. For example, the smoother the surface of the substrate used to collect the electrospun nanofibers, the more uniform the resulting nanofiber layer structure.

Smoothness of the supporting nonwoven pertains to geometrical smoothness, or lack of rough surface features that have dimensions greater than one fiber diameter of the non-woven, as well as low hairiness, i.e. a small number of fibers and/or loops that protrude beyond the surface. Geometrical smoothness can be easily measured by a number of common techniques, for example mechanical and optical profilometry, visible light reflectivity (gloss metering) and other techniques known to those skilled in the art.

In some aspects, an electrospun nanofiber layer is bonded to a smooth non-woven support. Bonding may be accomplished by methods well known in the art, including but not limited to thermal calendering between heated smooth nip rolls, ultrasonic bonding, and through gas bonding. Bonding the electrospun nanofiber layer to the non-woven support increases the strength of the composite, and the compression resistance of the composite, such that the resulting composite filtration medium is capable of withstanding forces associated with forming the composite filtration platform into useful filter shapes and sizes, or when installing the composite filtration platform into a filtration device.

In other embodiments of the composite liquid filtration platform, the physical properties of the porous electrospun nanofiber layer such as thickness, density, and the size and shape of the pores may be affected depending on the bonding methods used between the nanofiber layer and the smooth nonwoven support. For instance, thermal calendaring can be used to reduce the thickness and increase the density and reduce the porosity of the electrospun nanofiber layer, and reduce the size of the pores. This in turn decreases the flow rate through the composite filtration medium at a given applied differential pressure.

In general, ultrasonic bonding will bond to a smaller area of the electrospun nanofiber layer than thermal calendaring, and therefore has a lesser effect on thickness, density and pore size electrospun nanofiber layer.

Hot gas or hot air bonding generally has minimal effect on the thickness, density and pore size of the electrospun nanofiber layer, therefore this bonding method may be preferable in applications in which maintaining higher fluid flow rate is desired.

When thermal calendering is used, care must be taken not to over-bond the electrospun nanofiber layer, such that the nanofibers melt and no longer retain their structure as individual fibers. In the extreme, over-bonding will result in the nanofibers melting completely such that a film is formed. One or both of the nip rolls used is heated to a temperature of between about ambient temperature, e.g., about 25° C. and about 300° C. The porous nanofiber medium and/or porous support or substrate, can be compressed between the nip rolls at a pressure ranging from about 0 lb/in to about 1000 lb/in (178 kg/cm).

Calendering conditions, e.g., roll temperature, nip pressure and line speed, can be adjusted to achieve the desired solidity. In general, application of higher temperature, pressure, and/or residence time under elevated temperature and/or pressure results in increased solidity.

Other mechanical steps, such as stretching, cooling, heating, sintering, annealing, reeling, unreeling, and the like, may optionally be included in the overall process of forming, shaping and making the composite filtration medium as desired.

Breathing Filters

U.S. Pub. No. 2014/0097558 discloses that various types of breathing filters are known in the art. Personal protection equipment (PPE), specifically disposable face masks, may be required to conform to certain regulations during design and manufacture. The user's ability and ease of breathing while wearing the mask may be considered, as well as the fit and the comfort of the user who may wear the mask. Because of the disposable nature of the mask, a low cost manufacturing process may be desired. Certain regulatory standards may need to be met, such as EN149:2001 for Europe or 42 CFR part 84 for US or ISO 17420. PPE under these regulations are class III products according to PPE directive in Europe or other parts of the world. PPE, such as disposable masks or reusable cartridges, may comprise filtration media, which may be made of melt-blown fibers and/or micro glass material. Filtration by a mask is accomplished when particles in the air are trapped in the matrix of the fibers contained in the filtration media of the mask.

Nanofibers formed by electrospinning a polymer solution may be functionalized by the addition of another material to the polymer solution. The additional functionalizing material may be operable to remove gases and may comprise one or more chemicals that may capture gases (where the gases might be volatile organic chemicals (VOCs), acid vapors, carbon dioxide ($CO_2$), nitrogen monoxide (NO), nitrogen dioxide ($NO_2$), ozone ($O_3$), hydrogen cyanide (HCN), arsine ($AsH_3$), hydrogen fluoride (HF), chlorine dioxide ($ClO C_2$), ethylene oxide ($C_2H_4O$), formaldehyde ($CH_2O$), methyl bromide ($CH_3Br$), and/or phosphine (PH3)). In an embodiment, the functionalized material may comprise one of a biocide (i.e. a chemical substance or microorganism which can deter, render harmless, or exert a controlling effect on any harmful organism by chemical or biological means), a virucide (i.e. a physical or chemical agent that deactivates or destroys viruses) and/or a bactericide (i.e. a substance that kills bacteria, for example disinfectants, antiseptics, or antibiotics). In other embodiments, a functionalized nanofiber may be operable to remove humidity, control temperature, indicate end of service life, indicate clogged material, and/or provide a fresh odor inside the mask.

In one embodiment, the nanofiber nonwoven product (e.g. meltblown nanofiber) may comprise a functionalize material, e.g., biocide, virucide, and/or bactericide. The functionalize material may include zinc in a zinc compound and phosphorus in a phosphorus compound. In some aspects, the zinc compound is embedded in or dispersed within the nanofiber nonwoven product used in the filter media.

The nanofiber nonwoven product may comprise zinc (e.g., in a zinc compound), e.g., zinc or a zinc compound, dispersed therein. In one embodiment, the nanofiber nonwoven product comprises zinc in an amount ranging from 1 to 30,000 wppm, e.g., from 5 wppm to 20,000 wppm, from 5 wppm to 17,500 wppm, from 5 wppm to 17,000 wppm, from 5 wppm to 16,500 wppm, from 5 wppm to 16,000 wppm, from 5 wppm to 15,500 wppm, from 5 wppm to 15,000 wppm, from 5 wppm to 12,500 wppm, from 5 wppm to 10,000 wppm, from 5 wppm to 5000 wppm, from 5 wppm to 4000 wppm, e.g., from 5 wppm to 3000 wppm, from 5 wppm to 2000 wppm, from 5 wppm to 1000 wppm, from 5 wppm to 500 wppm, from 10 wppm to 20,000 wppm, from 10 wppm to 17,500 wppm, from 10 wppm to 17,000 wppm, from 10 wppm to 16,500 wppm, from 10 wppm to 16,000 wppm, from 10 wppm to 15,500 wppm, from 10 wppm to 15,000 wppm, from 10 wppm to 12,500 wppm, from 10 wppm to 10,000 wppm, from 10 wppm to 5000 wppm, from 10 wppm to 4000 wppm, from 10 wppm to 3000 wppm, from 10 wppm to 2000 wppm, from 10 wppm to 1000 wppm, from 10 wppm to 500 wppm, from 50 wppm to 20,000 wppm, from 50 wppm to 17,500 wppm, from 50 wppm to 17,000 wppm, from 50 wppm to 16,500 wppm, from 50 wppm to 16,000 wppm, from 50 wppm to 15,500 wppm, from 50 wppm to 15,000 wppm, from 50 wppm to 12,500 wppm, from 50 wppm to 10,000 wppm, from 50 wppm to 5000 wppm, from 50 wppm to 4000 wppm, from 50 wppm to 3000 wppm, from 50 wppm to 2000 wppm, from 50 wppm to 1000 wppm, from 50 wppm to 500 wppm, from 100 wppm to 20,000 wppm, from 100 wppm to 17,500 wppm, from 100 wppm to 17,000 wppm, from 100 wppm to 16,500 wppm, from 100 wppm to 16,000 wppm, from 100 wppm to 15,500 wppm, from 100 wppm to 15,000 wppm, from 100 wppm to 12,500 wppm, from 100 wppm to 10,000 wppm, from 100 wppm to 5000 wppm, from 100 wppm to 4000 wppm, from 100 wppm to 3000 wppm, from 100 wppm to 2000 wppm, from 100 wppm to 1000 wppm, from 100 wppm to 500 wppm, from 200 wppm to 20,000 wppm, from 200 wppm to 17,500 wppm, from 200 wppm to 17,000 wppm, from 200 wppm to 16,500 wppm, from 200 wppm to 16,000 wppm, from 200 wppm to 15,500 wppm, from 200 wppm to 15,000 wppm, from 200 wppm to 12,500 wppm, from 200 wppm to 10,000 wppm, from 200 wppm to 5000 wppm, from 200 wppm to 4000 wppm, from 200 wppm to 3000 wppm, from 200 wppm to 2000 wppm, from 200 wppm to 1000 wppm, or from 200 wppm to 500 wppm. The amount of the zinc compound present in the nanofiber nonwoven product may be discussed in relation to the ionic zinc content. In one embodiment, the nanofiber nonwoven product comprises ionic zinc, e.g., $Zn^{2+}$.

The zinc of the nanofiber nonwoven product is present in or provided via a zinc compound, which may vary widely. The zinc compound may comprise zinc oxide, zinc ammonium adipate, zinc acetate, zinc ammonium carbonate, zinc stearate, zinc phenyl phosphinic acid, or zinc pyrithione, or combinations thereof. In some embodiments, the zinc compound comprises zinc oxide, zinc ammonium adipate, zinc acetate, or zinc pyrithione, or combinations thereof. In some embodiments, the zinc compound comprises zinc oxide, zinc stearate, or zinc ammonium adipate, or combinations thereof. In some aspects, the zinc is provided in the form of zinc oxide. In some aspects, the zinc is not provided via zinc phenyl phosphinate and/or zinc phenyl phosphonate.

In some cases, the use of zinc provides for processing and or end use benefits. Other antiviral agents, e.g., copper or silver, may be used, but these often include adverse effects (e.g., on the relative viscosity of the polymer composition, toxicity, and health or environmental risk). In some situations, the zinc does not have adverse effects on the relative viscosity of the nanofiber nonwoven product. Also, the zinc, unlike other antiviral agents, e.g., silver, does not present toxicity issues (and in fact may provide health advantages, such as immune system support). In addition, as noted herein, the use of zinc provides for the reduction or elimination of leaching into other media and/or into the environment. This both prevents the risks associated with introducing zinc into the environment and allows the polymer composition to be reused—zinc provides surprising "green" advantages over conventional, e.g., silver-containing, compositions.

In addition to the zinc, the functionalize material may comprise phosphorus (in a phosphorus compound), e.g., phosphorus or a phosphorus compound is dispersed within the nanofiber nonwoven product. In one embodiment, the nanofiber nonwoven product comprises phosphorus in an amount of less than or equal to 1 wt. % and ranging from 50 wppm to 10000 wppm, e.g., from 50 wppm to 5000 wppm, from 50 wppm to 2500 wppm, from 50 wppm to 2000 wppm, from 50 wppm to 800 wppm, 100 wppm to 750 wppm, 100 wppm to 1800 wppm, from 100 wppm to 10000 wppm, from 100 wppm to 5000 wppm, from 100 wppm to 2500 wppm, from 100 wppm to 1000 wppm, from 100 wppm to 800 wppm, from 200 wppm to 10000 wppm, 200 wppm to 5000 wppm, from 200 wppm to 2500 wppm, from 200 ppm to 800 wppm, from 300 wppm to 10000 wppm, from 300 wppm to 5000 wppm, from 300 wppm to 2500 wppm, from 300 wppm to 500 wppm, from 500 wppm to 10000 wppm, from 500 wppm to 5000 wppm, or from 500 wppm to 2500 wppm.

The phosphorus of the nanofiber nonwoven product is present in or provided via a phosphorus compound, which may vary widely. The phosphorus compound may comprise bezene phosphinic acid, diphenylphosphinic acid, sodium phenylphosphinate, phosphorous acid, benzene phosphonic acid, calcium phenylphosphinate, potassium B-pentylphosphinate, methylphosphinic acid, manganese hypophosphite, sodium hypophosphite, monosodium phosphate, hypophosphorous acid, dimethylphosphinic acid, ethylphosphinic acid, diethylphosphinic acid, magnesium ethylphosphinate, triphenyl phosphite, diphenylmethyl phosphite, dimethylphenyl phosphite, ethyldiphenyl phosphite, phenylphosphonic acid, methylphosphonic acid, ethylphosphonic acid, potassium phenylphosphonate, sodium methylphosphonate, calcium ethylphosphonate, and combinations thereof. In some embodiments, the phosphorus compound comprises phosphoric acid, benzene phosphinic acid, or benzene phosphonic acid, or combinations thereof. In some embodiments, the phosphorus compound comprises benzene phosphinic acid, phosphorous acid, or manganese hypophosphite, or combinations thereof. In some aspects, the phosphorus compound may comprise benzene phosphinic acid.

In one embodiment, the molar ratio of the phosphorus to the zinc is greater than 0.01:1, e.g., greater than 0.05:1, greater than 0.1:1, greater than 0.15:1, greater than 0.25:1, greater than 0.5:1, or greater than 0.75:1. In terms of ranges, the molar ratio of the phosphorus to the zinc in the nanofiber nonwoven product may range from 0.01:1 to 15:1, e.g., from 0.05:1 to 10:1, from 0.1:1 to 9:1, from 0.15:1 to 8:1, from 0.25:1 to 7:1, from 0.5:1 to 6:1, from 0.75:1 to 5:1 from 0.5:1 to 4:1, or from 0.5:1 to 3:1. In terms of upper limits, the molar ratio of zinc to phosphorus in the polymer composition may be less than 15:1, e.g., less than 10:1, less than 9:1, less than 8:1, less than 7:1, less than 6:1, less than 5:1, less than 4:1, or less than 3:1. In some cases, phosphorus is bound in the polymer matrix along with zinc.

It has been determined that a specific amount of the zinc compound and the phosphorus compound can be mixed in a polymer composition, e.g., polyamide composition, in finely divided form, such as in the form of granules, flakes and the like, to provide a polymer composition that can be subsequently formed, e.g., extruded, molded or otherwise drawn, into the nanofiber nonwoven product and various products (e.g., high-contact products, surface layers of high-contact products) by conventional methods to produce products having substantially improved antimicrobial activity. The zinc and phosphorus are employed in the polymer composition in the aforementioned amounts to provide a nanofiber nonwoven product with improved antimicrobial activity retention (near-permanent).

The filtration layer may be formed directly on the support layer rather than being formed in isolation. The filtration layer may contain one or more types of fibers, made from the same or different polymeric fiber-forming materials. A majority of the fibers in the filtration layer are formed from fiber-forming materials capable of accepting satisfactory electret charge and maintaining adequate charge separation. Preferred polymeric fiber-forming materials are non-conductive resins having a volume resistivity of 1014 ohm-centimeters or greater at room temperature (22° C.). The resin may have a volume resistivity of about 1016 ohm-centimeters or greater. Resistivity of the polymeric fiber-forming material may be measured according to standardized test ASTM D 257-93. Some examples of polymers which may be used include thermoplastic polymers containing polyolefins such as polyethylene, polypropylene, polybutylene, poly(4-methyl-1-pentene) and cyclic olefin copolymers, and combinations of such polymers. Other polymers which may be used but which may be difficult to charge or which may lose charge rapidly include polycarbonates, block copolymers such as styrene-butadiene-styrene and styrene-isoprene-styrene block copolymers, polyesters such as polyethylene terephthalate, polyamides, polyurethanes, and other polymers that will be familiar to those having ordinary skill in the art. Some or all of the filtration layer fibers may if desired be made from multicomponent fibers, including splittable fibers. Suitable multicomponent (e.g., bicomponent) fibers include side-by-side, sheath-core, segmented pie, islands in the sea, tipped and segmented ribbon fibers. If splittable fibers are employed, splitting may be carried out or encouraged using a variety of techniques that will be familiar to those having ordinary skill in the art including carding, air jets, embossing, calendering, hydroentangling or needle punching. The filtration layer preferably is prepared from monocomponent fibers of poly-4-methyl-1 pentene or polypropylene, or from bicomponent fibers of poly-4-methyl-1 pentene and polypropylene in a layered or core-sheath configuration, e.g., with poly-4-methyl-1 pentene or polypropylene on the outer surface. Most preferably, the filtration layer is prepared from polypropylene homopolymer monocomponent fibers because of the ability of polypropylene to retain electric charge, particularly in moist environments. Additives may be added to the polymer to enhance filtration performance, electret charging capability, mechanical properties, aging properties, coloration, surface properties or other characteristics of interest. Representative additives include fillers, nucleating agents (e.g., MILLAD™ 3988 dibenzylidene sorbitol, commercially available from Milliken Chemical), electret charging enhancement additives (e.g., tristearyl melamine, and various light stabilizers such as CHIMASSORB™ 119 and CHIMASSORB 944 from Ciba Specialty Chemicals), cure initiators, stiffening agents (e.g., poly(4-methyl-1-pentene)), surface active agents and surface treatments (e.g., fluorine atom treatments to improve filtration performance in an oily mist environment as described in U.S. Pat. Nos. 6,398,847 B1, 6,397,458 B1, and 6,409,806 B1 to Jones et al.). The types and amounts of such additives will be familiar to those having ordinary skill in the art. For example, electret charging enhancement additives are generally present in an amount less than about 5 wt. % and more typically less than about 2 wt. %. The polymeric fiber-forming material also preferably is substantially free from components such as antistatic agents that could significantly increase electrical conductivity or otherwise interfere with the fiber's ability to accept and hold electrostatic charge.

The filtration layer may have a variety of basis weights, fiber sizes, thicknesses, pressure drops and other characteristics, and by itself may be sufficiently fragile so as not to be roll-to-roll processable. The filtration layer may, for example, have a basis weight in the range of about 0.5 to about 300 g/m$^2$ (gsm), about 0.5 to about 100 gsm, about 1 to about 50 gsm, or about 2 to about 40 gsm. Relatively low basis weights, e.g., of about 2, 5, 15, 25 or 40 gsm are preferred for the filtration layer. The fibers in the filtration layer may have, for example, a median fiber size less than about 10 µm, less than about 5 µm or less than about 1 µm. The filtration layer thickness may, for example, be about 0.1 to about 20 mm, about 0.2 to about 10 mm, or about 0.5 to about 5 mm. Nanofiber filtration layers applied at very low basis weights to some support layers (e.g., rough-textured support layers) may not change the overall media thickness. The filtration layer basis weight and thickness can be controlled or adjusted, for example, by changing the collector speed or polymer throughput.

The support layer is sufficiently robust so that the filtration layer may be formed on the support layer and the resulting media may be further converted as needed using roll-to-roll processing equipment. The support layer may be formed from a variety of materials, and may have a variety of basis weights, thicknesses, pressure drops and other characteristics. For example, the support layer may be a nonwoven web, woven fabric, knit fabric, open cell foam or perforated membrane. Nonwoven fibrous webs are preferred support layers. Suitable fibrous precursors for making such nonwoven webs include the polymeric fiber-forming materials discussed above and other polymeric fiber-forming materials that do not readily accept or hold and electrostatic charge. The support layer may also be formed from natural fibers or from blends of synthetic and natural fibers. If made from a nonwoven web, the support layer may, for example, be formed from molten thermoplastic polymer using meltblowing, meltspinning or other suitable web processing techniques, be formed from natural fibers or from blends of synthetic and natural fibers using carding or deposition from a Rando-Webber machine, or be formed using other techniques that will be familiar to those having ordinary skill in the art. If made from a woven web or knit fabric, the support layer may, for example, be formed from microdenier continuous filament or staple fiber yarns (viz., yarns having a denier per filament (dpf) less than about 1) and processed into a woven or knit support fabric using suitable processing techniques that will be familiar to those having ordinary skill in the art. The support layer may, for example, have a basis weight in the range of about 5 to about 300 gsm, more preferably about 40 to about 150 gsm. The thickness of the support layer may, for example, be about 0.2 to about 40 mm, about 0.2 to about 20 mm, about 0.5 to about 5 mm or about 0.5 to about 1.5 mm.

In addition to the polyamide nanofiber layer, additional layers may be added to the disclosed media if desired. Representative additional layers will be familiar to persons having ordinary skill in the art, and include protective layers (e.g., anti-shedding layers, anti-irritation layers, and other cover layers), reinforcing layers and sorbent layers. Sorbent particles (e.g., activated carbon particles or alumina particles) may also be introduced into the media using methods that will be familiar to persons having ordinary skill in the art.

Hydrocharging of the disclosed multilayer media may be carried out using a variety of techniques including impinging, soaking or condensing a polar fluid onto the media, followed by drying, so that the media becomes charged. Representative patents describing hydrocharging include the above-mentioned U.S. Pat. Nos. 5,496,507, and 5,908,598; 6,375,886; 6,406,657; 6,454,986; and 6,743,464. Preferably water is employed as the polar hydrocharging liquid, and the media preferably is exposed to the polar hydrocharging liquid using jets of the liquid or a stream of liquid droplets provided by any suitable spray means. Devices useful for hydraulically entangling fibers are generally useful for carrying out hydrocharging, although the operation is carried out at lower pressures in hydrocharging than generally used in hydroentangling. U.S. Pat. No. 5,496,507 describes an exemplary apparatus in which jets of water or a stream of water droplets are impinged upon the media at a pressure sufficient to provide the subsequently-dried media with a filtration-enhancing electret charge. The pressure necessary to achieve optimum results may vary depending on the type of sprayer used, the type of polymer from which the filtration layer is formed, the thickness and density of the media, and whether pretreatment such as corona charging was carried out before hydrocharging. Generally, pressures in the range of about 69 to about 3450 kPa are suitable. Preferably, the water used to provide the water droplets is relatively pure. Distilled or deionized water is preferable to tap water.

The disclosed media may be subjected to other charging techniques before or after hydrocharging including electrostatic charging (e.g., as described in U.S. Pat. Nos. 4,215, 682, 5,401,446 and 6,119,691), tribocharging (e.g., as described in U.S. Pat. No. 4,798,850) or plasma fluorination (e.g., as described in U.S. Pat. No. 6,397,458 B1). Corona charging followed by hydrocharging and plasma fluorination followed by hydrocharging are preferred combination charging techniques.

Additional breathing filters are described, for example, in Fibrous air filtration webs are described, for example, in U.S. Pat. Nos. 4,011,067; 4,215,682; 4,592,815; 4,729,371; 4,798,850; 5,401,466; 5,496,507; 6,119,691; 6,183,670; 6,315,806 6,397,458; 6,554,881; 6,562,112 B2; 6,627,563; 6,673,136; 6,716,274; 6,743,273; and 6,827,764; and in Tsai et al., Electrospinning Theory and Techniques, 14th Annual International TANDEC Nonwovens Conference, Nov. 9-11, 2004. Other fibrous webs are described, for example, in U.S. Pat. Nos. 4,536,361 and 5,993,943.

Some exemplary mask configurations are disclosed in U.S. Application No. 63/013,205, which is incorporated herein by reference.

The filter structure of the present disclosure may comprise any combination of the first layer, the second layer, and (optionally) the third layer, described above. By way of example and without limiting the scope of the disclosure, several configurations are described herein.

In one embodiment, the filter structure comprises a first layer, a second layer, and a third layer. The first layer comprises a spunbond nonwoven fabric formed from PA-6,6 and having an average fiber diameter of 30 to 50 microns and a basis weight of 15 to 20 g/m². The second layer comprises a meltblown nonwoven fabric comprising electrically charged polypropylene (PP) and having an average fiber diameter less than 15 microns and a basis weight of 15-20 g/m². The third layer comprises a spunbond nonwoven fabric formed from PA-6,6 and having an average fiber diameter of 30 to 50 microns and a basis weight of 25 to 35 g/m².

In one embodiment, the filter structure comprises a first layer, a second layer, and a third layer. The first layer comprises a spunbond nonwoven fabric formed from PA-6,6 and having an average fiber diameter of 30 to 50 microns and a basis weight of 15 to 20 g/m². The second layer comprises a plurality polyamide nanofibers having an average fiber diameter less than 1 micron and a basis weight of about 18 g/m². The third layer comprises a spunbond nonwoven fabric formed from PA-6,6 and having an average fiber diameter of 30 to 50 microns and a basis weight of 25 to 35 g/m².

In one embodiment, the filter structure comprises a first layer, a second layer, and a third layer. The first layer comprises a spunbond nonwoven fabric formed from PA-6,6 and having an average fiber diameter of 30 to 50 microns and a basis weight of 15 to 20 g/m². The second layer comprises a meltblown nonwoven fabric comprising electrically charged PP and having an average fiber diameter less than 15 microns and a basis weight of 20-25 g/m². The third layer comprises a spunbond nonwoven fabric formed from PA-6,6 and having an average fiber diameter of 30 to 50 microns and a basis weight of 25 to 35 g/m².

In one embodiment, the filter structure comprises a first layer, a second layer, and a third layer. The first layer comprises melt spun PA-6,6 having an average fiber diameter of 1 to 5 microns and a basis weight of 15 to 20 g/m². The second layer comprises a plurality polyamide nanofibers having an average fiber diameter of less than 1 microns and a basis weight of about 22 g/m². The third layer comprises a spunbond nonwoven fabric formed from PA-6,6 and having an average fiber diameter of 30 to 50 microns and a basis weight of 25 to 35 g/m².

In one embodiment, the filter structure comprises a first layer, a second layer, and a third layer. The first layer comprises a spunbond nonwoven fabric formed from PA-6,6 and having an average fiber diameter of 30 to 50 microns and a basis weight of 15 to 20 g/m². The second layer comprises a meltblown nonwoven fabric comprising electrically charged PP and having an average fiber diameter less than 15 microns and a basis weight of 30-35 g/m². The third layer comprises a spunbond nonwoven fabric formed from PA-6,6 and having an average fiber diameter of 30 to 50 microns and a basis weight of 25 to 35 g/m².

In one embodiment, the filter structure comprises a first layer, a second layer, and a third layer. The first layer comprises melt spun PA-6,6 having an average fiber diameter of 30 to 50 microns and a basis weight of 10 to 15 g/m². The second layer comprises a meltblown nonwoven fabric comprising electrically charged PP and having an average fiber diameter less than 15 microns and a basis weight of 30-35 g/m². The third layer comprises melt spun PA-6,6 having an average fiber diameter of 1 to 5 microns and a basis weight of 15 to 20 g/m².

In one embodiment, the filter structure comprises a first layer, a second layer, and a third layer. The first layer comprises melt spun PA-6,6 having an average fiber diameter of 1 to 5 microns and a basis weight of 10 to 15 g/m². The second layer comprises a plurality polyamide nanofibers having an average fiber diameter less than 1 micron and a basis weight of about 33 g/m². The third layer comprises a spunbond nonwoven fabric formed from PA-6,6 and having an average fiber diameter of 30 to 50 microns and a basis weight of 25 to 35 g/m².

In one embodiment, the filter structure comprises a first layer, a second layer, and a third layer. The first layer comprises melt spun PA-6,6 having an average fiber diameter of 1 to 5 microns and a basis weight of 10 to 15 g/m². The second layer comprises a plurality polyamide nanofibers having an average fiber diameter less than 1 micron and a basis weight of about 33 g/m². The third layer comprises melt spun PA-6,6 having an average fiber diameter of 1 to 5 microns and a basis weight of 15 to 20 g/m².

In one embodiment, the filter structure comprises a first layer, a second layer, and a third layer. The first layer comprises a spunbond nonwoven fabric formed from PA-6,6 and having an average fiber diameter of 30 to 50 microns and a basis weight of 15 to 20 g/m². The second layer comprises a two-ply meltblown nonwoven fabric comprising electrically charged PP and having an average fiber diameter less than 15 microns and a basis weight of 25-30 g/m². The third layer comprises a spunbond nonwoven fabric formed from PA-6,6 and having an average fiber diameter of 30 to 50 microns and a basis weight of 25 to 35 g/m².

In one embodiment, the filter structure comprises a first layer, a second layer, and a third layer. The first layer comprises melt spun PA-6,6 having an average fiber diameter of 1 to 5 microns and a basis weight of 10 to 15 g/m². The second layer comprises a two-ply meltblown nonwoven fabric comprising electrically charged PP and having an average fiber diameter less than 15 microns and a basis weight of 25-30 g/m². The third layer comprises a spunbond nonwoven fabric formed from PA-6,6 and having an average fiber diameter of 30 to 50 microns and a basis weight of 25 to 35 g/m².

In one embodiment, the filter structure comprises a first layer, a second layer, and a third layer. The first layer comprises melt spun PA-6,6 having an average fiber diameter of 1 to 5 microns and a basis weight of 10 to 15 g/m². The second layer comprises a two-ply meltblown nonwoven fabric comprising electrically charged PP and having an average fiber diameter less than 15 microns and a basis weight of 25-30 g/m². The third layer comprises melt spun PA-6,6 having an average fiber diameter of 1 to 5 microns and a basis weight of 15 to 20 g/m².

By way of further example, several configurations are illustrated in the following table.

EXEMPLARY CONFIGURATIONS

Exemplary Configurations

| First Layer | Second Layer | Third Layer |
|---|---|---|
| Spunbond polypropylene | Meltblown polypropylene | Spunbond polypropylene |
| Spunbond polypropylene | Polyamide nanofiber; Spunbond polyamide (10 g/m$^2$) | Spunbond polypropylene |
| Spunbond polypropylene | Polyethylene terepthalate/cellulose | Spunbond polypropylene |
| Spunbond polypropylene | Polyamide nanofiber; Meltblown polypropylene | Spunbond polypropylene |
| Spunbond polypropylene | Polyamide nanofiber; Spunbond polyamide (10 g/m$^2$) | Spunbond polypropylene |
| Spunbond polypropylene | Polyamide nanofiber; Spunbond polyamide (34 g/m$^2$) | Spunbond polypropylene |
| Spunbond polyamide (34 g/m$^2$) | Polyamide nanofiber | Spunbond polypropylene |
| Spunbond polypropylene | Polyamide nanofiber; Spunbond polyamide (10 g/m$^2$) | Spunbond polyamide (34 g/m$^2$) |
| Spunbond polypropylene | Polyamide nanofiber; Spunbond polyamide (34 g/m$^2$) | Spunbond polyamide (34 g/m$^2$) |
| Spunbond polypropylene | Polyamide nanofiber | Spunbond polyamide (34 g/m$^2$) |
| Spunbond polyamide (34 g/m$^2$) | Polyamide nanofiber | Spunbond polyamide (34 g/m$^2$) |
| Spunbond polyamide (34 g/m$^2$) | Polyamide nanofiber; Spunbond polyamide (10 g/m$^2$) | Spunbond polyamide (34 g/m$^2$) |
| Spunbond polyamide (34 g/m$^2$) | Polyamide nanofiber; Spunbond polyamide (10 g/m$^2$) | Spunbond polyamide (34 g/m$^2$) |
| Spunbond polyamide (34 g/m$^2$) | Polyamide nanofiber | Spunbond polyamide (34 g/m$^2$) |

EMBODIMENTS

Embodiment 1

A nanofiber nonwoven product comprising polyamide nanofibers, wherein the product has a relative viscosity from 2 to 330, and wherein the nanofibers have an average diameter from 100 to 1000 nanometers.

Embodiment 2

The nanofiber nonwoven product according to Embodiment 1, wherein the melt point of the product is 225° C. or greater.

Embodiment 3

The nanofiber nonwoven product according to Embodiment 1 or 2, wherein no more than 20% of the nanofibers have a diameter of greater than 700 nanometers.

Embodiment 4

The nanofiber nonwoven product according to any of Embodiments 1-3, wherein the polyamide comprises nylon 66 or nylon 6/66.

Embodiment 5

The nanofiber nonwoven product according to any of Embodiments 1-4, wherein the polyamide is a high temperature nylon.

Embodiment 6

The nanofiber nonwoven product according to any of Embodiments 1-5, wherein the polyamide comprises N6, N66, N6T/66, N612, N6/66, N6I/66, N66/6I/6 T, N11, and/or N12, wherein "N" means Nylon.

Embodiment 7

The nanofiber nonwoven product according to any of Embodiments 1-6, wherein the product has an Air Permeability Value of less than 600 CFM/ft$^2$.

Embodiment 8

The nanofiber nonwoven product according to any of Embodiments 1-7, wherein the product has a basis weight of 150 GSM or less.

Embodiment 9

The nanofiber nonwoven product according to any of Embodiments 1-8, wherein the product has a TDI of at least 20 ppm.

Embodiment 10

The nanofiber nonwoven product according to any of Embodiments 1-9, wherein the product has an ODI fof at least 1 ppm.

Embodiment 11

The nanofiber nonwoven product according to any of Embodiments 1-10, wherein the product is free of solvent.

Embodiment 12

The nanofiber nonwoven product according to any of Embodiments 1-10, wherein the product comprises less than 5000 ppm solvent.

Embodiment 13

The nanofiber nonwoven product according to any of Embodiments 1-12, wherein at least 1% of the nanofibers have a diameter of at least 700 nm.

Embodiment 14

The nanofiber nonwoven product according to any of Embodiments 1-13, wherein the polyamide precursor had a moisture content of at least 5 ppm.

Embodiment 15

The nanofiber nonwoven product according to any of Embodiments 1-14, wherein the polyamide precursor had a moisture content of no more than 3 wt. %.

Embodiment 16

The nanofiber nonwoven product according to any of Embodiments 1-14, wherein the polyamide precursor had an RV from 2 to 330.

Embodiment 17

The nanofiber nonwoven product according to Embodiment 16, wherein the RV of the nanofiber nonwoven product is reduced as compared to the RV of the polyamide precursor.

Embodiment 18

The nanofiber nonwoven product according to Embodiment 16, wherein the RV of the nanofiber nonwoven product stays the same or is increased as compared to the RV of the polyamide precursor.

Embodiment 19

A nanofiber nonwoven product comprising a polyamide which is spun into nanofibers with an average diameter from 100 to 1000 nanometers and formed into said nonwoven product, wherein the polyamide has a relative viscosity from 2 to 330.

Embodiment 20

The nanofiber nonwoven product according to Embodiment 19, wherein the melt point of the product is 225° C. or greater.

Embodiment 21

The nanofiber nonwoven product according to Embodiment 19 or 20, wherein no more than 20% of the nanofibers have a diameter of greater than 700 nanometers.

Embodiment 22

The nanofiber nonwoven product according to any of Embodiments 19-21, wherein the polyamide comprises nylon 66 or nylon 6/66.

Embodiment 23

The nanofiber nonwoven product according to any of Embodiments 19-22, wherein the polyamide is a high temperature nylon.

Embodiment 24

The nanofiber nonwoven product according to an of Embodiments 19-23, wherein the polyamide comprises N6, N66, N6T/66, N612, N6/66, N6I/66, N66/6I/6 T, N11, and/or N12, wherein "N" means Nylon.

Embodiment 25

The nanofiber nonwoven product according to any of Embodiments 19-24, wherein the product has an Air Permeability Value of less than 600 CFM/ft$^2$.

Embodiment 26

The nanofiber nonwoven product according to any of Embodiments 19-25, wherein the product has a basis weight of 150 GSM or less.

Embodiment 27

The nanofiber nonwoven product according to any of Embodiments 19-26, wherein the product has a TDI of at least 20 ppm.

Embodiment 28

The nanofiber nonwoven product according to any of Embodiments 19-27, wherein the product has an ODI of at least 1 ppm.

Embodiment 29

The nanofiber nonwoven product according to any of Embodiments 19-28, wherein the product is free of solvent.

Embodiment 30

The nanofiber nonwoven product according to any of Embodiments 19-29, wherein the product comprises less than 5000 ppm solvent.

Embodiment 31

The nanofiber nonwoven product according to any of Embodiments 10-30, wherein at least 1% of the nanofibers have a diameter of at least 700 nm.

Embodiment 32

The nanofiber nonwoven product according to any of Embodiments 19-31, wherein the polyamide has a moisture content of at least 5 ppm.

Embodiment 33

The nanofiber nonwoven product according to any of Embodiments 19-32 wherein the polyamide has a moisture content of no more than 3 wt. %.

Embodiment 34

The nanofiber nonwoven product according to any of Embodiments 19-33 wherein the product has an RV from 2 to 330.

Embodiment 35

The nanofiber nonwoven product according to Embodiment 34, wherein the RV of the nanofiber nonwoven product is reduced as compared to the RV of the polyamide precursor.

Embodiment 36

The nanofiber nonwoven product according to Embodiment 34, wherein the RV of the nanofiber nonwoven product stays the same or is increased as compared to the RV of the polyamide precursor.

Embodiment 37

A method of making a nanofiber nonwoven product, the method comprising: (a) providing a polyamide composition, wherein the polyamide has a relative viscosity from 2 to 330; (b) spinning the polyamide composition into a plurality of nanofibers having an average fiber diameter from 100 to 1000 nanometers; and (c) forming the nanofibers into the nanofiber nonwoven product, wherein the polyamide nanofiber layer has an average nanofiber diameter from 100 to 1000 nanometers and a relative viscosity from 2 to 330.

Embodiment 38

The method of making the nanofiber nonwoven product according to Embodiment 37, wherein the polyamide composition is melt spun by way of melt-blowing through a die into a high velocity gaseous stream.

Embodiment 39

The method of making the nanofiber nonwoven product according to Embodiment 37 or 38, wherein the polyamide composition is melt-spun by 2-phase propellant-gas spinning, including extruding the polyamide composition in liquid form with pressurized gas through a fiber-forming channel.

Embodiment 40

The method of making the nanofiber nonwoven product according to any of Embodiments 37-39, wherein the nanofiber nonwoven product is formed by collecting the nanofibers on a moving belt.

Embodiment 41

The method of making the nanofiber nonwoven product according to any of Embodiments 37-40, wherein the polyamide nanofiber layer has a basis weight of 150 GSM or less.

Embodiment 42

The method of making the nanofiber nonwoven product according to any of Embodiments 37-41, wherein the relative viscosity of the polyamide in the nanofiber nonwoven product is reduced as compared to the polyamide composition prior to spinning and forming the product.

Embodiment 43

The method of making the nanofiber nonwoven product according to any of Embodiments 37-41, wherein the relative viscosity of the polyamide in the nanofiber nonwoven product is the same or increased as compared to the polyamide composition prior to spinning and forming the product.

Embodiment 44

The method of making the nanofiber nonwoven product according to any of Embodiments 37-43, wherein the production rate of the method of steps (a)-(c) is at least 5% greater than an electrospinning or solution spinning production rate.

Embodiment 45

The method of making the nanofiber nonwoven product according to any of Embodiments 37-44, wherein the melt point of the product is 225° C. or greater.

Embodiment 46

The method of making the nanofiber nonwoven product according to any of Embodiments 37-45, wherein no more than 20% of the nanofibers have a diameter of greater than 700 nanometers.

Embodiment 47

The method of making the nanofiber nonwoven product according to any of Embodiments 37-46, wherein the polyamide comprises nylon 66 or nylon 6/66.

Embodiment 48

The method of making the nanofiber nonwoven product according to any of Embodiments 37-47, wherein the polyamide is a high temperature nylon.

Embodiment 49

The method of making the nanofiber nonwoven product according to any of Embodiments, 37-48 wherein the polyamide comprises N6, N66, N6T/66, N612, N6/66, N6I/66, N66/6I/6 T, N11, and/or N12, wherein "N" means Nylon.

Embodiment 50

The method of making the nanofiber nonwoven product according to any of Embodiments 37-49, wherein the product has an Air Permeability Value of less than 600 CFM/ft$^2$.

Embodiment 51

The method of making the nanofiber nonwoven product according to any of Embodiments 37-50, wherein the product has a basis weight of 150 GSM or less.

Embodiment 52

The method of making the nanofiber nonwoven product according to any of Embodiments 37-51, wherein the product has a TDI of at least 20 ppm.

Embodiment 53

The method of making the nanofiber nonwoven product according to any of Embodiments 37-52, wherein the product has an ODI of at least 1 ppm.

Embodiment 54

The method of making the nanofiber nonwoven product according to any of Embodiments 37-53, wherein the product is free of solvent.

Embodiment 55

The method of making the nanofiber nonwoven product according to any of Embodiments 37-54, wherein the product comprises less than 5000 ppm solvent.

Embodiment 56

The method of making the nanofiber nonwoven product according to any of Embodiments 37-55, wherein at least 1% of the nanofibers have a diameter of at least 700 nm.

Embodiment 57

The method of making the nanofiber nonwoven product according to any of Embodiments, 37-56 wherein the polyamide precursor had a moisture content of at least 5 ppm.

Embodiment 58

The method of making the nanofiber nonwoven product according to any of Embodiments 37-57, wherein the polyamide precursor had a moisture content of no more than 3 wt. %.

Embodiment 59

The method of making the nanofiber nonwoven product according to any of Embodiments 37-57, wherein the polyamide precursor had a moisture content from 10 ppm to 5 wt. %.

Embodiment 60

A nanofiber nonwoven product comprising a polyamide composition formed into said nonwoven product, wherein the product has at least one of the following: (i) a TDI from 20 to 4000 ppm, (ii) an ODI from 1 to 200 ppm, (iii) an average nanofiber diameter from 100 to 1000 nanometers, (iv) a polyamide comprising nylon 6,6, and (v) a polyamide composition RV from 2 to 330.

Embodiment 61

A nanofiber nonwoven product comprising a nylon 66 polyamide which is melt spun into nanofibers and formed into said nonwoven product, wherein the product has a TDI of at least 20 ppm and an ODI of at least 1 ppm.

Embodiment 62

A nanofiber nonwoven product comprising a nylon 66 polyamide which is melt spun into nanofibers and formed into said nonwoven product, wherein no more than 20% of the nanofibers have a diameter of greater than 700 nanometers.

Embodiment 63

The nanofiber nonwoven product according to any of Embodiments 60-62, wherein the melt point of the product is 225° C. or greater.

Embodiment 64

The nanofiber nonwoven product according to any of Embodiments 60-61 and 63, wherein no more than 20% of the nanofibers have a diameter of greater than 700 nanometers.

Embodiment 65

The nanofiber nonwoven product according to any of Embodiments 60-64, wherein the product has an Air Permeability Value of less than 600 CFM/ft2.

Embodiment 66

The nanofiber nonwoven product according to any of Embodiments 60-65, wherein the product has a basis weight of 150 GSM or less.

Embodiment 67

The nanofiber nonwoven product according to any of Embodiments 62-66, wherein the product has a TDI of at least 20 ppm.

Embodiment 68

The nanofiber nonwoven product according to any of Embodiments 62-67, wherein the product has an ODI of at least 1 ppm.

Embodiment 69

The nanofiber nonwoven product according to any of Embodiments 60-68, wherein the product is free of solvent.

Embodiment 70

The nanofiber nonwoven product according to any of Embodiments 60-68, wherein the product comprises less than 5000 ppm solvent.

Embodiment 71

The nanofiber nonwoven product according to any of Embodiments 60-70, wherein the polyamide has a moisture content of at least 5 ppm.

Embodiment 72

The nanofiber nonwoven product according to any of Embodiments 60-71, wherein the polyamide has a moisture content of no more than 3 wt. %.

Embodiment 73

The nanofiber nonwoven product according to any of Embodiments 60-72, wherein the product has an RV from 2 to 330.

Embodiment 74

The nanofiber nonwoven product according to Embodiment 73, wherein the RV of the nanofiber nonwoven product is reduced as compared to the RV of the poly amide precursor.

Embodiment 75

The nanofiber nonwoven product according to Embodiment 73, wherein the RV of the nanofiber nonwoven product stays the same or is increased as compared to the RV of the polyamide precursor.

The present disclosure is further understood by the following non-limiting examples.

EXAMPLES

Example 1

Utilizing the (melt) spin procedures and apparatus as described in U.S. Pat. No. 8,668,854 (shown generally in FIG. 1), Nylon 66 polyamide was spun onto a moving drum to produce nonwoven webs. The process employed an extruder with a high compression screw, operating at 20 RPM, with a temperature profile of 245° C., 255° C., 265° C., and 265° C. The (precursor) polyamide temperature was 252° C. and nitrogen was used as the gas. Two nonwoven webs were produced (Samples 1 and 2), each having different basis weights. Sample 2 with the higher basis weight was made by the same process, but the nanofibers were spun onto a scrim. In this instance, the scrim was merely used for adding integrity to the inventive nanofiber web. The polyamide had an RV of 7.3 (before spinning). To ensure the constant viscosity of the low RV polyamide would remain essentially constant, the polyamide was prepared using an excess of about 5% adipic acid.

The nonwoven webs were characterized for average fiber diameter, basis weight, air permeability in accordance with the Hassan et al. article noted above. Water vapor transmission rate was also measured (g/m²/24 hr) according to ASTM E96, Procedure B (2016).

Figure 3:
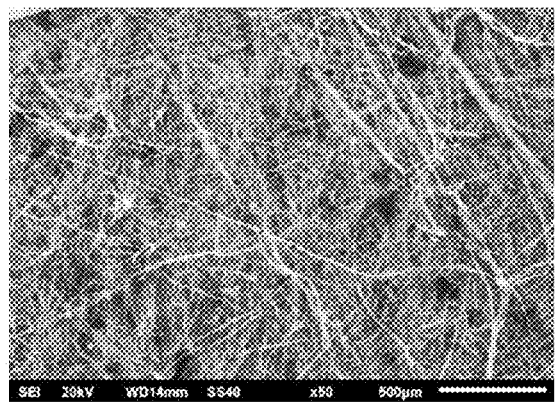
FIG. 3 is a photomicrograph of a nanofiber nylon 66 melt spun into a nonwoven having an RV of 7.3 at a magnification of 50×.
Figure 4:
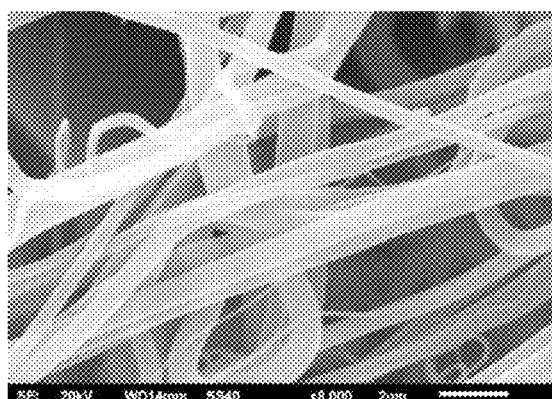
FIG. 4 is a photomicrograph of a nanofiber of a grade from FIG. 3 of nylon 66 melt spun into a nonwoven having an RV of 7.3 at a magnification of 8000×.

The results are shown in Table 1, and the nonwoven mats are shown in the photomicrographs of FIGS. 3 and 4. The nanofibers of the nonwoven mats had an average fiber diameter ranging from 470 nm to 680 nm (575 nm average).

TABLE 1

Example 1: Precursor Polyamide and Product Properties

| Sample | PA RV | Fiber diameter, nm | Basis weight, GSM | Air permeability (CFM/ft$^2$) | WVTR g/m$^2$/24 hr | TDI (ppm) | ODI (ppm) | Final RV |
|---|---|---|---|---|---|---|---|---|
| 1 | 7.3 | 680 | 68 | 182.8 | 1140 | 56 | 12 | 10 |
| 2 | 7.3 | 470 | 118 | 182.8 | 1056 | 48 | 8 | 9.9 |

As shown in Table 1, the use of the processes disclosed herein provided for a melt spun nanofiber nonwoven web, the nanofibers of which had a fiber diameter averaging 570 for the RV of 7.3. Air Permeability was about 182.8 CFM/ft², while water vapor transmission rate averaged about 1100 g/m²/24 hrs. Such fiber diameters and performance characteristics have not been achieved using conventional polyamide precursors and/or processes. Without being bound by theory, it is believed that the use of the low RV polyamide composition (and/or nitrogen) was the main reason the TDI and ODI results were so low.

Example 2

Figure 5:
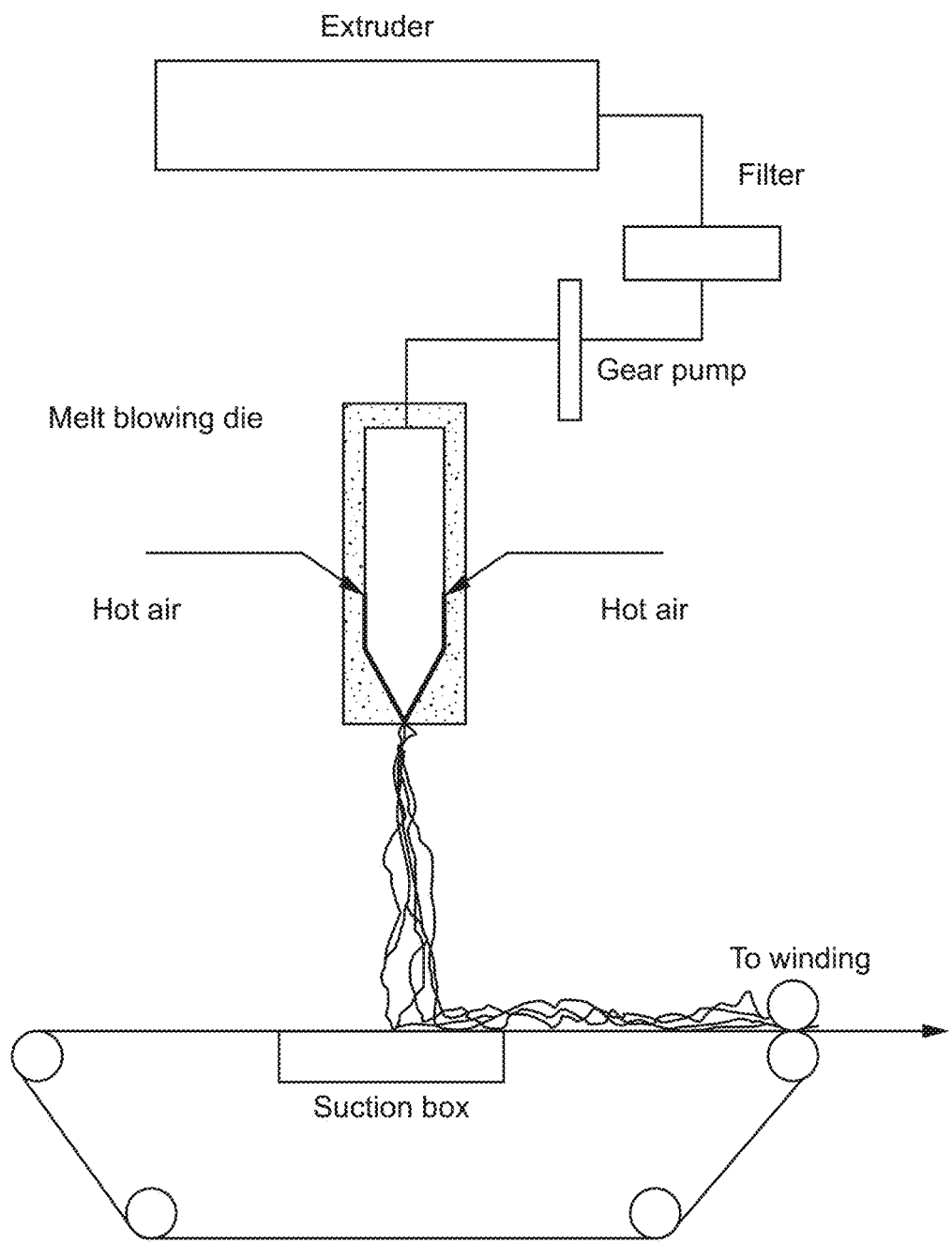
FIG. 5 is a schematic diagram of a melt blowing process in connection with embodiments of the present disclosure.
Figure 6:
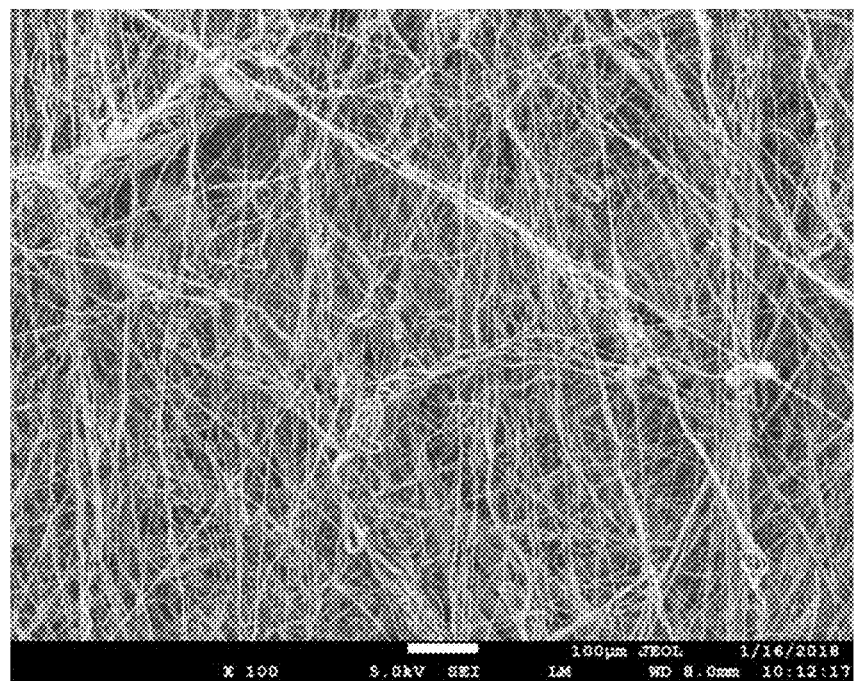
FIG. 6 is a photomicrograph of a nanofiber of nylon 66 with an RV of 36 at a magnification of 100×.

Nylon 66 polyamide having an RV of 36 was melt spun and pumped to melt blown dies (utilizing the melt spin pack described in U.S. Pat. No. 7,300,272 and illustrated in FIG. 5) to produce nonwoven nanofiber webs. In the various samples, the moisture levels of nylon 66 ranged from about 0.2% to about 1.0% (as shown in Table 2). An extruder with three zones was used, and the extruder operated at temperatures ranging from 233° C. to 310° C. The die temperature ranged from 286° C. to 318° C. Heated air was used as the gas. The nanofibers were deposited onto a 10 gsm thermally bonded, nylon spunbond scrim commercially available from Cerex Advanced Fabrics, Inc. under the trademark PBN-II®. Of course, other spunbond fabrics can be used, for example, a polyester spun bond fabric, a polypropylene spunbond fabric, a nylon melt blown fabric or other woven, knit, needlepunched, or other nonwoven fabrics. No solvents or adhesives were used during the melt spinning or deposition processes, and neither the polyamide or the resultant product contained solvent.

Various fabrics were made with webs of nanofibers. The properties and performance characteristics of several specific samples are summarized in Table 2.

TABLE 2

Example 2: Precursor Polyamide and Product Properties

| Sample | Product RV | Average Fiber diameter, (microns) | Basis weight, (gsm) | Nanofiber layer thickness (microns) | Air permeability (CFM/ft$^2$) | Mean pore size diameter (microns) | Mean pore size pressure (PSI) | Filtration Efficiency (%) |
|---|---|---|---|---|---|---|---|---|
| 3 | 27.45 | 0.374 | 3.0 | N/A | 187.20 | 10.123 | 0.653 | 24.69 |
| 4 | 25.17 | 0.595 | 21.2 | N/A | 21.86 | 5.001 | 1.320 | 76.70 |
| 5 | 28.27 | 0.477 | 1.0 | N/A | 1002.00 | 84.123 | 0.81 | 2.71 |
| 6 | 22.93 | 0.5765 | 2.8 | 44.8 | 353.8 | 19.95 | 0.358 | 10.38 |
| 7 | 24.11 | 0.6008 | 7.3 | 60 | 757.2 | 7.85 | 0.919 | 40.68 |
| 8 | 23.91 | 0.4900 | 10.1 | 88 | 52.9 | 5.89 | 1.12 | 52.6 |
| 9 | 23.80 | 0.5950 | 13.2 | 101.5 | 75.72 | 7.185 | 1.235 | 66.00 |

As indicated in Table 2, the disclosed process surprisingly yields nanofibers and nonwoven mats having synergistic combinations of features. The nanofiber nonwoven mats were successfully made using the above described process, in various basis weights with a wide range of properties. Process settings can be adjusted to provide nanofiber fabrics with a variety of properties as required for the application as illustrated in Table 2.

Example 3

A nylon 66 polyamide composition with an RV in the range of 34 to 37 was used with the pack described in U.S. Pat. No. 7,300,272 to make nanofibers with an RV of about 16.8. This is a reduction in RV from polyamide composition to fabric of about 17.2 to 20.2 RV units. The polyamide composition contained about 1% moisture by weight and was run on a small extruder with three zones ranging in temperature from 233 to 310° C. A die temperature of about 308° C. was used. No solvents or adhesives were used during the melt spinning or deposition processes, and neither the polyamide or the resultant product contained solvents or adhesive.

Example 4

A nylon 66 polyamide composition with an RV in the range of 34 to 37 with the pack described in U.S. Pat. No. 7,300,272 to make nanofibers with an RV of about 19.7. This is a reduction in RV from polyamide composition to fabric of about 14.3 to 17.3 RV units. The polyamide composition contained 1% moisture by weight and was run on a small extruder with three zones ranging in temperature from 233 to 310 C. A die temperature of about 277° C. was used. No solvents or adhesives were used during the melt spinning or deposition processes, and neither the polyamide or the resultant product contained solvent or adhesive.

Example 5

A nylon 66 polyamide composition with an RV in the range of 34 to 37 was used with 2% nylon 6 blended in. The pack described in U.S. Pat. No. 7,300,272 was used to make nanofibers with an RV of about 17.1. This is a reduction in RV from polyamide composition to fabric of about 16.9 to 19.9 RV units. The polyamide composition contained 1% moisture by weight and was run on a small extruder with three zones ranging in temperature from 233 to 310° C. A die temperature of about 308° C. was used. No solvents or adhesives were used during the melt spinning or deposition processes, and neither the polyamide or the resultant product contained solvent or adhesive.

Example 6

Seven polyamide compositions with varied RV's were provided as shown below in Table 3. The pack described in U.S. Pat. No. 7,300,272 was used to make nanofibers with RV values as reported below. Samples were made on a small extruder with a high residence time. Initially, Samples 10 and 11 were made by feeding more than enough chips into the feed hopper of the extruder. In order to reduce the transition time between items, the extruder and die (or pack) were starved of polyamide composition after Sample 11. This example shows that a wide variety of nylon copolymers can be used to make nylon nanofibers with fiber diameters in the 0.53 to 0.68 micron range. Fiber diameters may be changed by changing process parameters, polymer formulations, or polymer types (copolymers). Based on the way the samples were created, it is difficult to draw conclusions on the degradation indices of these fabrics other than Samples 10 and 11. Samples 10 and 11 indicate that the addition of nylon 6 decreased the thermal degradation of the final nanofiber fabric. Comparing these samples to sample 16 also shows that adding nylon 6 decreases the fiber diameter. Sample 13 shows that the RV was reduced from 303.1 to 33.3. This is a reduction of 269.8 units or an 89% reduction in RV.

TABLE 3

Example 6: Precursor Polyamide and Product Properties

| Sample | Components | PA RV | % Nylon 6,6 | Moisture (%) | Fiber Diameter (microns) | Product RV | ODI (ppm) | TDI (ppm) |
|---|---|---|---|---|---|---|---|---|
| 10 | Nylon 66/ nylon 6 | 39.2 | 16 | 0.0810 | 0.531 | 29.7 | 75 | 798 |
| 11 | Nylon 66/ nylon 6 | 33.0 | 23 | 0.077 | 0.540 | 35.9 | 142 | 169 |
| 12 | Nylon 66 | 123.7 | 100 | 0.0351 | 0.588 | 39.1 | 182 | 1613 |
| 13 | Nylon 66 | 303.1 | 100 | 0.0177 | 0.638 | 33.3 | 208 | 1792 |
| 14 | Nylon 66/ nylon 6I | 43.6 | 85 | 0.087 | 0.588 | 26.1 | 172 | 2232 |
| 15 | Nylon 66/ nylon 6T | 44.8 | 65 | 0.0422 | N/A | N/A | 224 | 2383 |
| 16 | Nylon 66 | 36 | 100 | 0.022 | 0.684 | 15.2 | 1430 | >4000 |

Example 7

Figure 7:
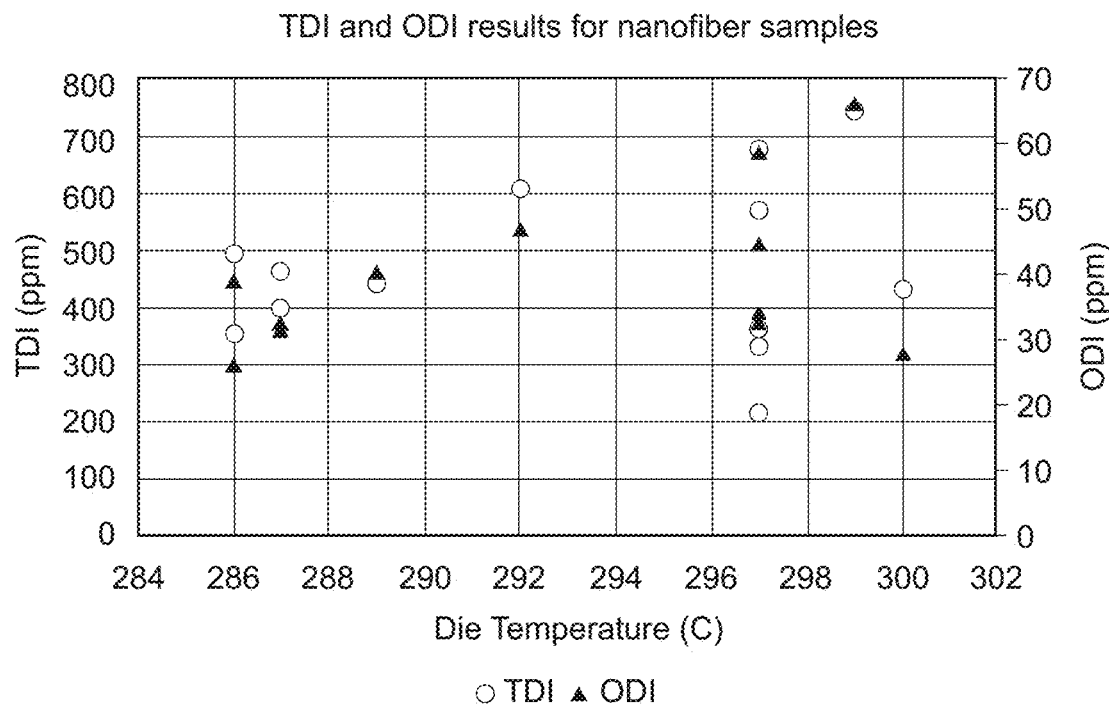
FIG. 7 is a graph comparing thermal degradation index and oxidative degradation index values for nanofiber samples as a function of die temperature.
Figure 8:
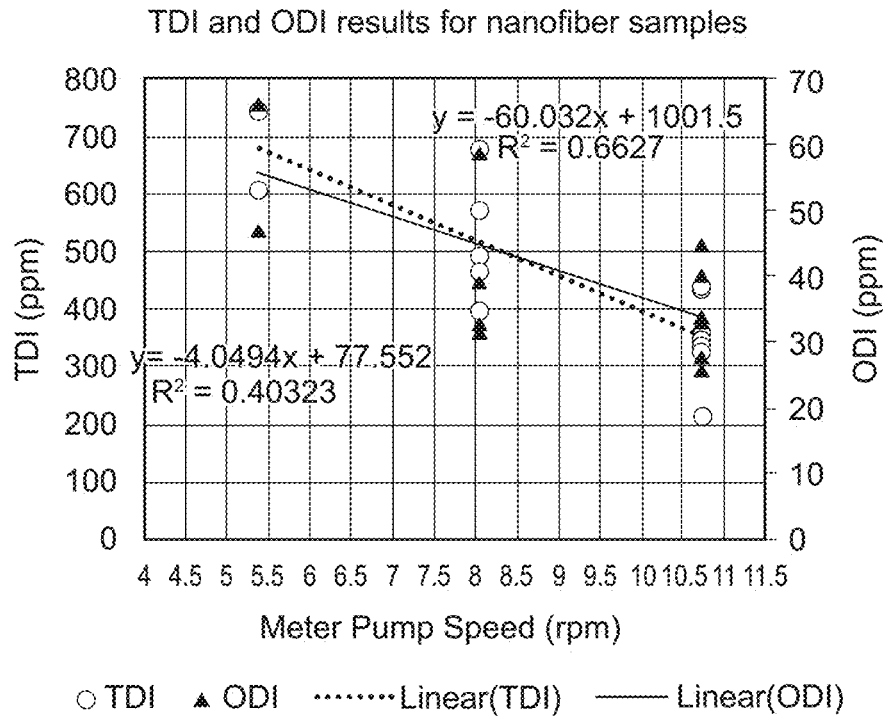
FIG. 8 is a graph comparing thermal degradation index and oxidative degradation index values for nanofiber samples as a function of meter pump speed.

A series of examples were run to test nanofiber samples for TDI and ODI as a function of die temperature. The same nylon 66 polyamide composition with an RV in the range of 34 to 37 that was used in example 3 was run in each of these samples. These samples were made on a slightly larger extruder and a much larger die (pack) with a much smaller residence time than those in Table 3 with the same polyamide composition as that used to make sample 16. The die temperature, basis weight, and flake moisture were varied. Table 4 below shows the conditions and results. The results are also shown in the graphs in FIGS. 7 and 8. As shown in Table 4 below, changing process variables does not dramatically change the ODI, illustrating a robust process for oxidative degradation. As shown in FIG. 8, as the meter pump speed decreased, the ODI and TDI generally increased with the TDI increasing at a higher percentage than the ODI. When compared to Sample 16 in Table 3, these samples show that the ODI and the TDI were lowered as this equipment used to run the nanofiber nonwoven fabric was designed for a lower residence time.

TABLE 4

Example 7: TDI and ODI Values

| Sample | Moisture (%) | Basis Weight (gsm) | Die Temperature (° C.) | Meter Pump Speed (rpm) | TDI (ppm) | ODI (ppm) |
|---|---|---|---|---|---|---|
| 16 | 0.2 | 13.20 | 299 | 5.37 | 745 | 66 |
| 17 | 0.2 | 18.40 | 292 | 5.37 | 608 | 47 |
| 18 | 0.3 | 3.7 | 297 | 8.05 | 572 | 59 |
| 19 | 0.2 | 3.2 | 297 | 8.05 | 676 | 59 |
| 20 | 0.2 | 6.2 | 297 | 10.73 | 214 | 34 |
| 21 | 0.2 | 11 | 297 | 10.73 | 364 | 33 |
| 22 | 0.2 | 11 | 297 | 10.73 | 333 | 45 |
| 23 | 0.2 | 4.4 | 287 | 8.05 | 398 | 33 |
| 24 | 0.2 | 6.1 | 286 | 10.73 | 354 | 26 |
| 25 | 0.2 | 8 | 286 | 8.05 | 492 | 39 |
| 26 | 0.3 | 4.1 | 287 | 8.05 | 464 | 32 |
| 27 | 0.3 | 6 | 300 | 10.73 | 433 | 28 |
| 28 | 0.3 | 6 | 289 | 10.73 | 441 | 40 |

Example 8

Nylon 66 polyamide having an RV of 36 was melt spun and pumped to melt blown dies (utilizing the melt spin pack described in U.S. Pat. No. 7,300,272 and illustrated in FIG. 5) to produce nonwoven nanofiber webs. The moisture level of nylon 66 was about 0.22%. An extruder with three zones was used, and the extruder operated at temperatures ranging from 233° C. to 310° C. The die temperature was 295° C. Heated air was used as the gas. The nanofibers were deposited onto a 10 gsm thermally bonded, nylon spunbond scrim commercially available from Cerex Advanced Fabrics, Inc. under the trademark PBN-II®. Of course, other spunbond fabrics can be used, for example, a polyester spun bond fabric, a polypropylene spunbond fabric, a nylon melt blown fabric or other woven, knit, needlepunched, or other nonwoven fabrics. No solvents or adhesives were used during the melt spinning or deposition processes, and neither the polyamide or the resultant product contained solvent or adhesive. The collector belt speed was set to make a fabric with a nylon 6,6 nanofiber layer of 82 gsm basis weight. This fabric had an efficiency of 97.9%, a pressure drop of 166.9 Pascals and a penetration of 2.1% as measured using the TSI 3160 previously discussed. This fabric had a mean flow pore diameter average of 5.8 microns with a range from 3.2 to 8 microns. The air permeability of this fabric was 8.17 cfm/square foot. The thickness of the nanofiber layer was 625 microns.

Example 9 (Comparative)

Nylon 66 polyamide was melt spun into nonwoven samples 29 and 30 utilizing a centrifugal spinning process where polymer fibers are formed by spinning the melt through a rotating spinneret. Description of the centrifugal spinning process is seen in U.S. Pat. No. 8,658,067; WO 2012/109251; U.S. Pat. No. 8,747,723 to Marshall et al., and U.S. Pat. No. 8,277. This process produced nylon nanofiber fibers with extraordinarily high TDI and ODI indices. These results are much greater than the samples in Example 7 made with the melt blown process described herein.

TABLE 5

Nanofiber fabrics made with centrifugal spinning process

| Sample | Fabric RV | TDI (ppm) | ODI (ppm) |
|---|---|---|---|
| 29 | 22 | 3759 | 1739 |
| 30 | 14.2 | 4378 | 3456 |

Example 10

Three to six layers of nanofiber nonwoven fabric were combined to create a media with a higher basis weight and thickness. Each layer included a web of nylon 6,6 nanofibers on a 10 gsm nylon spunbond scrim available under the tradename "PBN-II" from Cerex Advanced Fabrics, Inc. in Cantonment, Fla. Four different webs were used with different basis weights (13.3, 21.2, 13.2, and 20.2) as reported in Table 2. Table 2 shows the basis weight, filtration efficiency as measured using a TSI 8130 with a challenge fluid of 0.3 micron, mean flow pore size, and the average pressure drop (PD) as measured by the TSI 8130. Two samples were measured to report an average for mean flow pore size, efficiency and pressure drop.

The fabrics had basis weights ranging between 13.2 gsm and 127.2 gsm and mean flow pore sizes ranging between 3.9 to 5.8 microns and filtration efficiencies as measured by the TSI instrument as described previously, ranging between 63.5% to 80.2%.

TABLE 6

| Layers | Basis Weight (gsm) | Mean Flow Pore size (microns) Ave. | Sample 1 | Sample 2 | Efficiency (%) Ave. | Sample 1 | Sample 2 | Pressure Drop (Pa) Ave. | Sample 1 | Sample 2 | Average Penetration (%) |
|---|---|---|---|---|---|---|---|---|---|---|---|
| 1 | 13.3 | 5.8 | | | 63.5 | | | 37.7 | | | 36.5 |
| 3 | 39.9 | 4.7 | 4.5 | 4.8 | 69 | 72.2 | 65.8 | 47.3 | 49.6 | 45.1 | 31 |
| 4 | 53.2 | 5.1 | 5.1 | 5.1 | 67.5 | 68.9 | 66.1 | 47.9 | 51.4 | 44.5 | 32.5 |
| 5 | 66.5 | 5.1 | 5.4 | 4.7 | 66.7 | 65.8 | 67.5 | 46.9 | 43.5 | 50.3 | 33.3 |
| 6 | 79.8 | 5.2 | 4.8 | 5.6 | 65 | 67.6 | 62.3 | 45.1 | 49.1 | 41.2 | 35 |
| 1 | 21.2 | 5 | | | 76.7 | | | 56.1 | | | 23.3 |
| 3 | 63.6 | 3.9 | 3.8 | 4 | 79.5 | 81.1 | 77.8 | 75.9 | 82.2 | 69.6 | 20.5 |
| 4 | 84.8 | 4.1 | 4.2 | 4 | 79.4 | 77.7 | 81.2 | 70 | 63.6 | 76.4 | 20.6 |
| 5 | 106 | 4.3 | 4 | 4.6 | 76.1 | 78.3 | 73.8 | 46.4 | 66.6 | 26.2 | 23.9 |
| 6 | 127.2 | 4.3 | 4.3 | 4.4 | 80.2 | 81.1 | 79.3 | 74.5 | 80.3 | 68.7 | 19.8 |
| 1 | 13.2 | 5.4 | | | 66 | | | 41.4 | | | 34 |
| 3 | 39.6 | 4.8 | 4.6 | 5 | 65.6 | 64.7 | 66.6 | 45.7 | 49.9 | 41.6 | 34.4 |

TABLE 6-continued

| Layers | Basis Weight (gsm) | Mean Flow Pore size (microns) | | | Efficiency (%) | | | Pressure Drop (Pa) | | | Average Penetration (%) |
|---|---|---|---|---|---|---|---|---|---|---|---|
| | | Ave. | Sample 1 | Sample 2 | Ave. | Sample 1 | Sample 2 | Ave. | Sample 1 | Sample 2 | |
| 4 | 52.8 | 5 | 4.5 | 5.5 | 65.7 | 65.7 | 65.8 | 46.1 | 51.7 | 40.5 | 34.3 |
| 5 | 66 | 4.6 | 4.4 | 4.7 | 65.2 | 65 | 65.5 | 46 | 51.1 | 40.9 | 34.8 |
| 6 | 79.2 | 4.8 | 5.1 | 4.4 | 65.9 | 65.8 | 66 | 46.9 | 41.3 | 52.6 | 34.1 |
| 1 | 20.2 | 5 | | | 73.8 | | | 52.1 | | | 26.2 |
| 4 | 80.8 | 5.2 | 4.2 | 6.3 | 76.9 | 74.3 | 79.5 | 74.3 | 66.9 | 81.7 | 23.1 |
| 5 | 101 | 4.6 | 4.8 | 4.5 | 76.4 | 78.2 | 74.6 | 74.3 | 81.3 | 67.4 | 23.6 |
| 6 | 121.2 | 4.9 | 4.5 | 5.3 | 79.1 | 80.4 | 77.8 | 76 | 71.8 | 80.1 | 20.9 |

Example 11—Bacterial and Particle Filtration Efficiency Tests

Two sample filters were prepared using webs of polyamide 66 nanofibers. Filter 1 had a basis weight of 8.2 gsm, and its nanofibers had an average fiber diameter of 612 nm and an median fiber diameter of 440 nm. Air permeability was 72.1 cfm/ft$^2$, mean flow pore diameter was 7.2, and bubble point was 28.1 microns. Filter 2 had a basis weight of 11.1 gsm, and its nanofibers had an average fiber diameter of 621 nm and an median fiber diameter of 469 nm. Air permeability was 39.2 cfm/ft$^2$, mean flow pore diameter was 5.9, and bubble point was 25.7 microns. The thickness of each filter was approximately 20 mm. Each filter had dimensions of about 174 mm by about 178 mm.

Filter 1 and Filter 2 were tested for Bacterial Filtration Efficiency (BFE) and Particle Filtration Efficiency (PFE). Filter 1 and Filter 2 were compared against a standard filter made of three layers of polypropylene-spunbond/meltblown/Spunbond.

The BFE test was performed to determine the filtration efficiency of the test filters by comparing the bacterial control counts upstream of the test filter to the bacterial counts downstream. A suspension of *Staphylococcus aureus* was aerosolized using a nebulizer and delivered to the test article at a constant flow rate (28.3 L/m) and fixed air pressure (2.8×103 CFU). The conditioning parameters were 85%±5% relative humidity and 21° C.±5° C. for a minimum of 4 hours. The challenge delivery was maintained at 1.7-3.0×10$^3$ colony forming units (CFU) with a mean particle size (MPS) of 3.0±0.3 μm. The aerosols were drawn through a six stage, viable particle, Andersen sampler for collection. This test method complies with ASTM F2101-19 and EN 14683:2019, Annex B.

The pressure drop (delta P) test was performed to determine the breathability of test filter articles by measuring the differential air pressure on either side of the test article using a manometer, at a constant flow rate. The delta P test complies with EN 14683:2019, Annex C and ASTM F2100-19.

The PFE testing was performed to evaluate the non-viable particle filtration efficiency (PFE) of the test filter articles (11.1 gsm, 8.2 gsm, and standard). Monodispersed polystyrene latex spheres (PSL) were nebulized (atomized), dried, and passed through the test filter article. The particles that passed through the test filter article were enumerated using a laser particle counter.

A one-minute count was performed, with the test filter in the system. A one-minute control count was performed, without a test filter article in the system, before and after each test article and the counts were averaged. Control counts were performed to determine the average number of particles delivered to the test filter article. The filtration efficiency was calculated using the number of particles penetrating the test filter article compared to the average of the control values.

The procedure employed the basic particle filtration method described in ASTM F2299, with some exceptions; notably the procedure incorporated a non-neutralized challenge. In real use, particles carry a charge, thus this challenge represents a more natural state. The non-neutralized aerosol is also specified in the FDA guidance document on surgical face masks.

The results of the BFE and PFE testing are shown in Table 3. The results shown in Table 3 are average results. For 8.2 gsm meltblown polyamide and polypropylene standard, 5 samples were averaged. For 11.1 and 11.1 gsm meltblown polyamide four samples were averaged.

Both the 11.1 gsm and 8.2 gsm meltblown polyamide 66 nanofiber demonstrated favorable PFE that were analogous with the standard. Advantageously, the 11.1 gsm also excelled in BFE while improving (decreasing) the delta P over the standard. This is a marked and unexpected improvement. Similarly, although the BFE was slightly lower, the 8.2 gsm meltblown polyamide 66 nanofiber demonstrated a significantly lower delta P. The meltblown nanofibers of the present invention can provide functional efficiencies with improved performance over the polypropylene standard.

TABLE 7

| | Meltblown Polyamide 66 Nanofibers | | Polypropylene |
|---|---|---|---|
| | 11.1 gsm | 8.2 gsm | Standard |
| BFE | 97.2% | 86.4% | 97.3% |
| PFE | 97.5% | 94.5% | 98.1% |
| delta P (mm H$_2$O/cm$^2$) | 2.95 | 1.22 | 3.82 |

While the disclosure has been described in detail, modifications within the spirit and scope of the disclosure will be readily apparent to those of skill in the art. Such modifications are also to be considered as part of the present disclosure. In view of the foregoing discussion, relevant knowledge in the art and references discussed above in connection with the Background, the disclosures of which are all incorporated herein by reference, further description is deemed unnecessary. In addition, it should be understood from the foregoing discussion that aspects of the disclosure and portions of various embodiments may be combined or interchanged either in whole or in part. Furthermore, those of ordinary skill in the art will appreciate that the foregoing description is by way of example only, and is not intended to limit the disclosure. Finally, all patents, publications, and applications referenced herein are incorporated by reference in their entireties.

What is claimed is:

1. A filter product comprising one or more layers of a nanofiber nonwoven product, comprising polyamide nanofibers, wherein the polyamide of the nanofibers comprises at least one of N6, N66, N6T/66, N612, N6/66, N6I/66, N66/6I/6T, N11, N12, or combinations thereof, wherein "N" means Nylon, wherein the polyamide of the nanofibers have a relative viscosity from 4 to 330, and wherein the nanofibers have an average diameter from 100 to 950 nanometers.

2. The filter product according to claim 1, wherein the melt point of the nanofiber nonwoven product is 225° C. or greater.

3. The filter product according to claim 1, wherein no more than 20% of the nanofibers have a diameter of greater than 700 nanometers.

4. The filter product according to claim 1, wherein the polyamide of the nanofibers comprises nylon 66 or nylon 6/66.

5. The filter product according to claim 1, wherein the nanofiber nonwoven product has an Air Permeability Value of less than 600 CFM/ft$^2$.

6. The filter product according to claim 1, wherein the nanofiber nonwoven product has a basis weight of 150 GSM or less.

7. The filter product according to claim 1, wherein the nanofiber nonwoven product has a TDI of at least 20 ppm and an ODI of at least 1 ppm.

8. The filter product according to claim 1, wherein the nanofiber nonwoven product is free of solvent.

9. The filter product according to claim 1, further comprising a scrim layer and/or support layer.

10. The filter product according to claim 1, wherein the filter is an air filter, an oil filter, a bag filter, a liquid filter, or a breathing filter.

11. The filter product according to claim 1, comprising three or more layers of a nanofiber nonwoven product.

12. The filter product according to claim 1, wherein the nanofiber nonwoven product comprises from 1 wppm to 30,000 wppm of zinc and less than or equal to 1 wt. % of a phosphorus compound.

13. A breathing filter product comprising:
a support layer; and
one or more layers of a nanofiber nonwoven product disposed on the support layer, wherein the nanofiber nonwoven product comprises polyamide nanofibers, wherein the nanofibers have an average diameter from 100 to 950 nanometers, and wherein the nanofiber nonwoven product has a TDI of at least 20 ppm and an ODI of at least 1 ppm.

14. The breathing filter according to claim 13, wherein the polyamide of the nanofibers comprises at least one of N6, N66, N6T/66, N612, N6/66, N6I/66, N66/6I/6T, N11, N12, or combinations thereof, wherein "N" means Nylon.

15. The breathing filter according to claim 13, wherein the polyamide of the nanofibers have a relative viscosity from 4 to 330.

16. The breathing filter according to claim 13, wherein the nanofibers have an average diameter from 300 to 700 nanometers.

17. The breathing filter according to claim 13, wherein the pressure drop of the nanofiber nonwoven product is from 0.5 to 10 mm H$_2$O.

18. The breathing filter according to claim 13, wherein the nanofiber nonwoven product is free of solvent.

19. The breathing filter according to claim 13, wherein the nanofiber nonwoven product comprises from 1 wppm to 30,000 wppm of zinc and less than or equal to 1 wt. % of a phosphorus compound.

* * * * *